United States Patent
Nakazawa et al.

(10) Patent No.: US 11,971,045 B2
(45) Date of Patent: Apr. 30, 2024

(54) TURBO COMPRESSOR

(71) Applicant: DAIKIN INDUSTRIES, LTD., Osaka (JP)

(72) Inventors: Yuji Nakazawa, Osaka (JP); Atsushi Sakawaki, Osaka (JP); Hirofumi Higashi, Osaka (JP); Taiichi Nose, Osaka (JP); Takaaki Ono, Osaka (JP); Yusuke Irino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 370 days.

(21) Appl. No.: 16/608,709

(22) PCT Filed: May 8, 2018

(86) PCT No.: PCT/JP2018/017747
§ 371 (c)(1),
(2) Date: Oct. 25, 2019

(87) PCT Pub. No.: WO2018/207767
PCT Pub. Date: Nov. 15, 2018

(65) Prior Publication Data
US 2021/0115929 A1    Apr. 22, 2021

(30) Foreign Application Priority Data

May 9, 2017    (JP) .................. 2017-093328
May 9, 2017    (JP) .................. 2017-093329
(Continued)

(51) Int. Cl.
*F04D 27/02*    (2006.01)
*F04D 17/10*    (2006.01)
(Continued)

(52) U.S. Cl.
CPC ......... *F04D 27/0261* (2013.01); *F04D 17/10* (2013.01); *F04D 25/0606* (2013.01);
(Continued)

(58) Field of Classification Search
CPC .. F04D 17/10; F04D 25/0606; F04D 27/0261; F04D 29/051; F04D 29/058;
(Continued)

(56) References Cited

U.S. PATENT DOCUMENTS 4,720,649 A * 1/1988 Habermann ........ F16C 32/0468
                                                    310/216.011
6,043,580 A    3/2000 Vogel et al.
(Continued)

FOREIGN PATENT DOCUMENTS

CN    103758766 A    4/2014
EP    1 770 284 A2    4/2007
(Continued)

OTHER PUBLICATIONS

International Search Report, issued in PCT/JP2018/017747, dated Aug. 14, 2018.
(Continued)

Primary Examiner — Devon C Kramer
Assistant Examiner — Joseph S. Herrmann
(74) Attorney, Agent, or Firm — Birch, Stewart, Kolasch & Birch, LLP

(57) ABSTRACT

A drive support unit of a turbo compressor includes at least one bearingless motor. The at least one bearingless motor includes a rotor-stator pair constituted by a rotor and a stator, and is configured to rotationally drive a drive shaft and to support a radial load of the drive shaft in a contactless manner. Accordingly, it is possible to provide a turbo compressor to which a bearingless motor is applied.

14 Claims, 46 Drawing Sheets

(30) Foreign Application Priority Data

May 9, 2017 (JP) ................................ 2017-093338
May 9, 2017 (JP) ................................ 2017-093339

(51) Int. Cl.
| | |
|---|---|
| *F04D 25/06* | (2006.01) |
| *F04D 29/051* | (2006.01) |
| *F04D 29/058* | (2006.01) |
| *F16C 32/04* | (2006.01) |
| *F25B 1/053* | (2006.01) |
| *H02K 7/09* | (2006.01) |
| *H02K 7/14* | (2006.01) |
| *H02P 25/024* | (2016.01) |

(52) U.S. Cl.
CPC ......... *F04D 29/051* (2013.01); *F04D 29/058* (2013.01); *F16C 32/04* (2013.01); *F16C 32/048* (2013.01); *F25B 1/053* (2013.01); *H02K 7/09* (2013.01); *H02K 7/14* (2013.01); *H02P 25/024* (2016.02)

(58) Field of Classification Search
CPC .... F16C 32/00; F16C 32/0406; F16C 32/044; F16C 32/0444; F16C 32/0463; F16C 32/0474; F16C 32/048; F16C 32/0489; F16C 32/049; F16C 32/0497; F16C 32/0446; F16C 32/0493; F16C 32/04; F25B 1/053; H02K 7/09; H02K 7/14; H02P 25/024; H02P 21/0003
USPC .......................................... 310/90.5
See application file for complete search history.

(56) References Cited

U.S. PATENT DOCUMENTS

| | | | | |
|---|---|---|---|---|
| 6,559,567 B2* | 5/2003 | Schob | ............... | H02K 7/09 310/156.01 |
| 6,727,618 B1* | 4/2004 | Morrison | ............ | F16C 32/0493 310/166 |
| 6,745,767 B2* | 6/2004 | Kullik | ................ | F04D 29/051 128/204.19 |
| 7,412,841 B2* | 8/2008 | Ueda | ................. | F25B 1/053 62/228.3 |
| 7,456,537 B1* | 11/2008 | Kascak | ................ | H02P 25/16 310/90.5 |
| 9,086,070 B2* | 7/2015 | Powell | ................. | F04D 27/0284 |
| 9,863,431 B2* | 1/2018 | Da Silva | ................. | H02K 7/09 |
| 2013/0343927 A1 | 12/2013 | Ramdane et al. | | |
| 2014/0023534 A1 | 1/2014 | Ramdane et al. | | |
| 2014/0219820 A1* | 8/2014 | Koki | .................. | F04D 25/06 417/19 |
| 2015/0010383 A1* | 1/2015 | Sun | ................... | F04D 29/462 415/13 |
| 2015/0167687 A1* | 6/2015 | Kurihara | ............ | F04D 29/056 415/229 |
| 2015/0233422 A1* | 8/2015 | Irino | ................... | F16C 32/0461 310/90.5 |
| 2017/0298985 A1* | 10/2017 | Brakensiek | ............ | D01H 4/12 |
| 2019/0211834 A1* | 7/2019 | Hasegawa | ............ | F25B 1/053 |

FOREIGN PATENT DOCUMENTS

| | | | |
|---|---|---|---|
| EP | 2 677 176 A1 | 12/2013 | |
| EP | 2677176 A1 * | 12/2013 | .......... F16C 32/0495 |
| JP | 11-513558 A | 11/1999 | |
| JP | 2014-5833 A | 1/2014 | |
| JP | 2014-7951 A | 1/2014 | |
| JP | 2014-241725 A | 12/2014 | |
| JP | 2016-114114 A | 6/2016 | |
| WO | WO 97/13986 A1 | 4/1997 | |
| WO | WO 2010/137766 A1 | 12/2010 | |

OTHER PUBLICATIONS

Written Opinion of the International Searching Authority, issued in PCT/JP2018/017747, dated Aug. 14, 2018.

Extended European Search Report dated Oct. 30, 2020 in corresponding European Application No. 18798224.4.

* cited by examiner

FIG.2
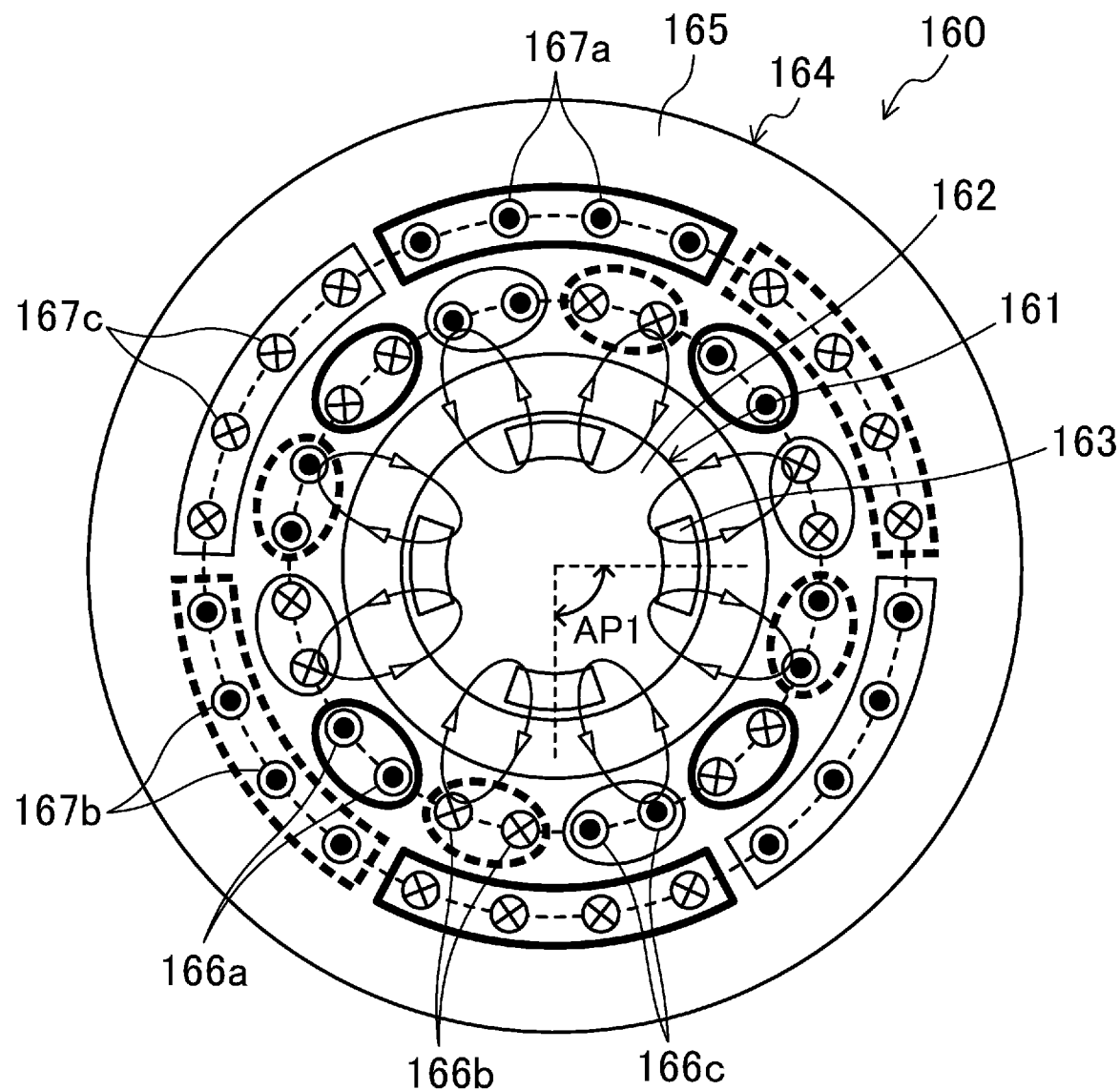
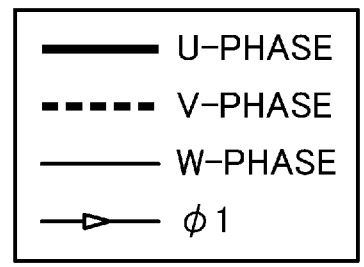

FIG.15
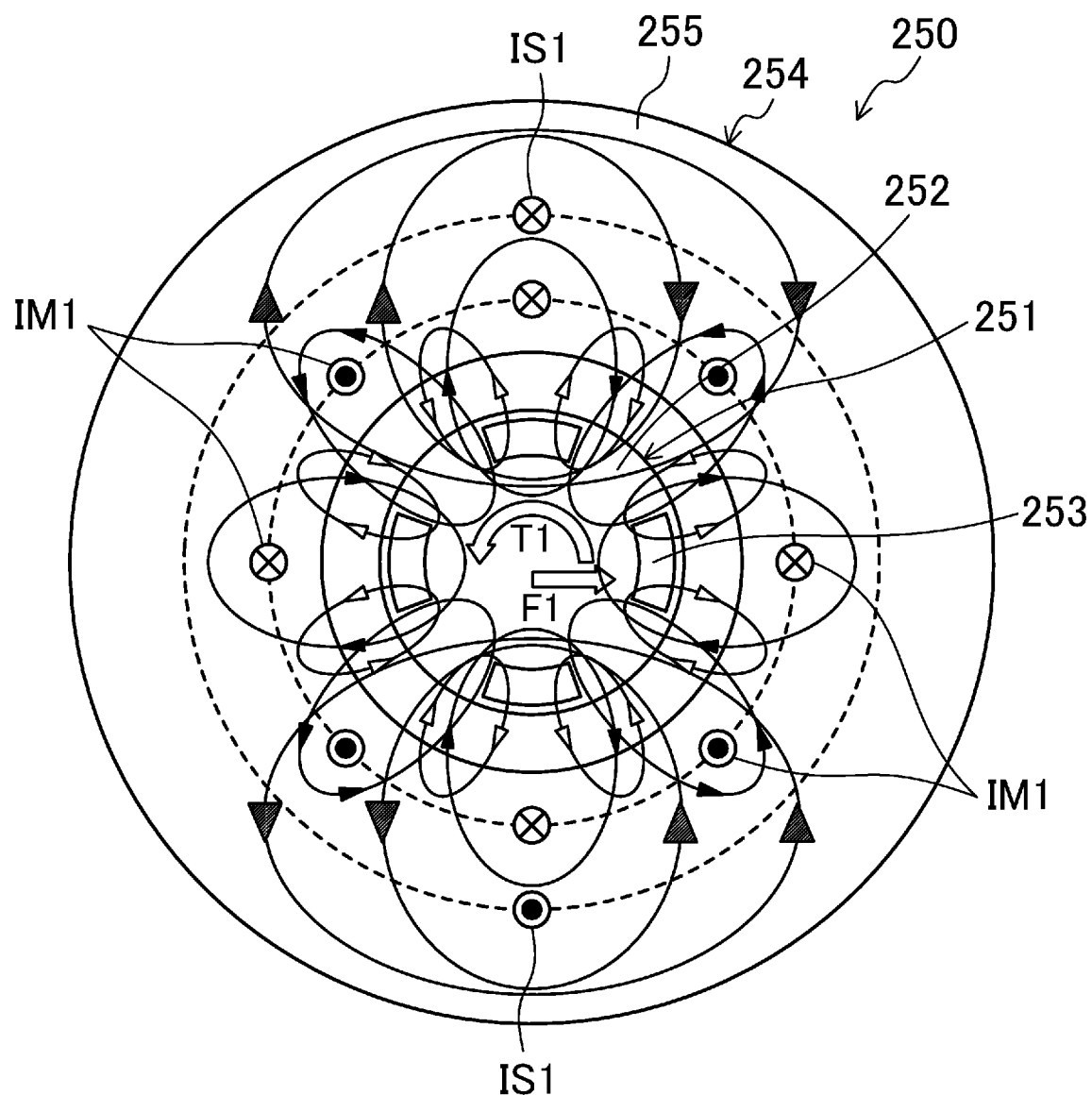
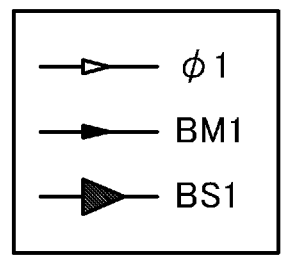

FIG.18
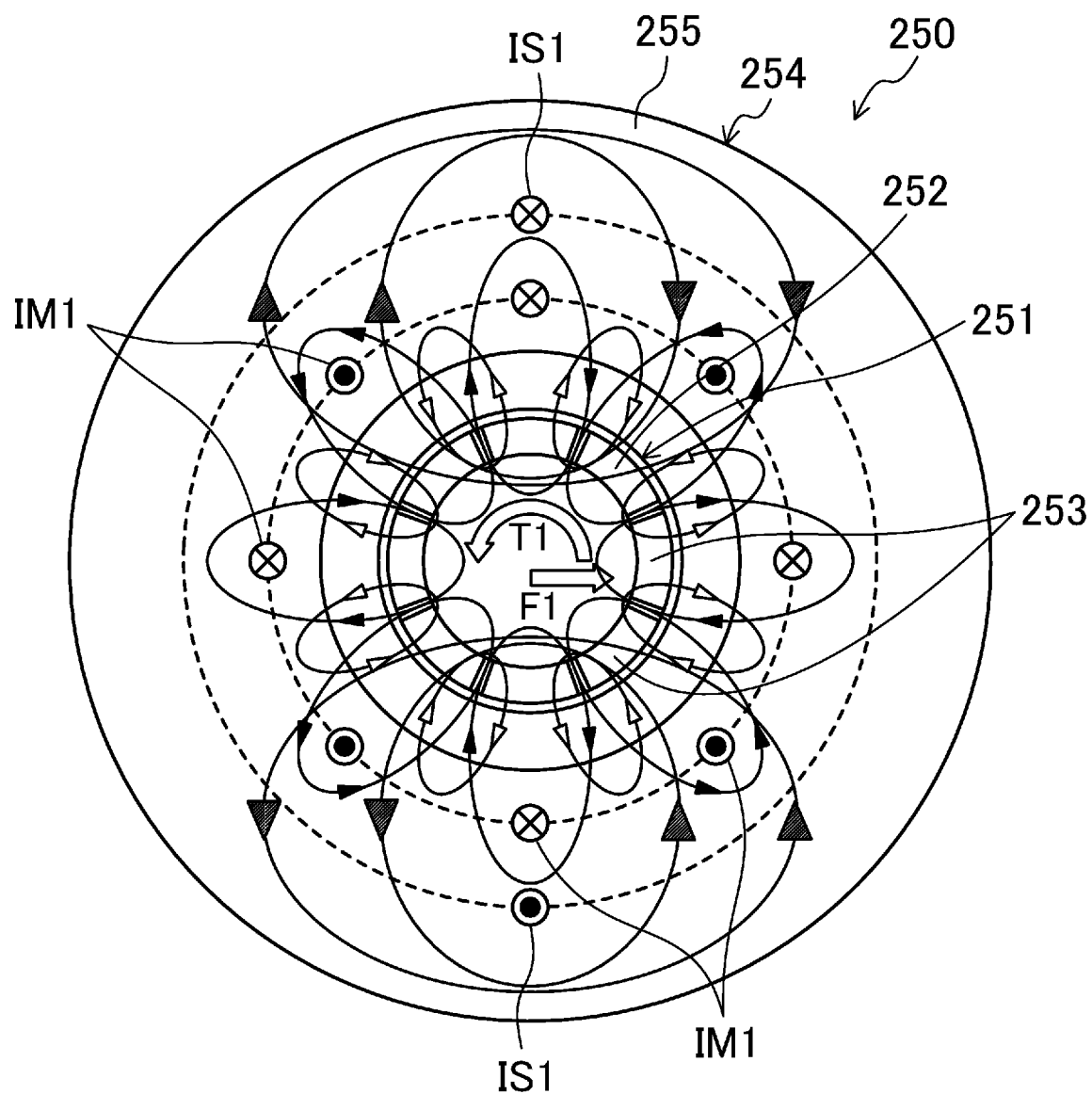
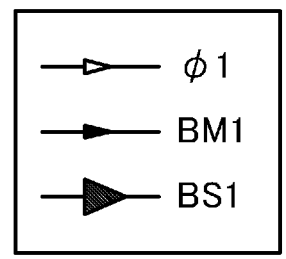

FIG.21
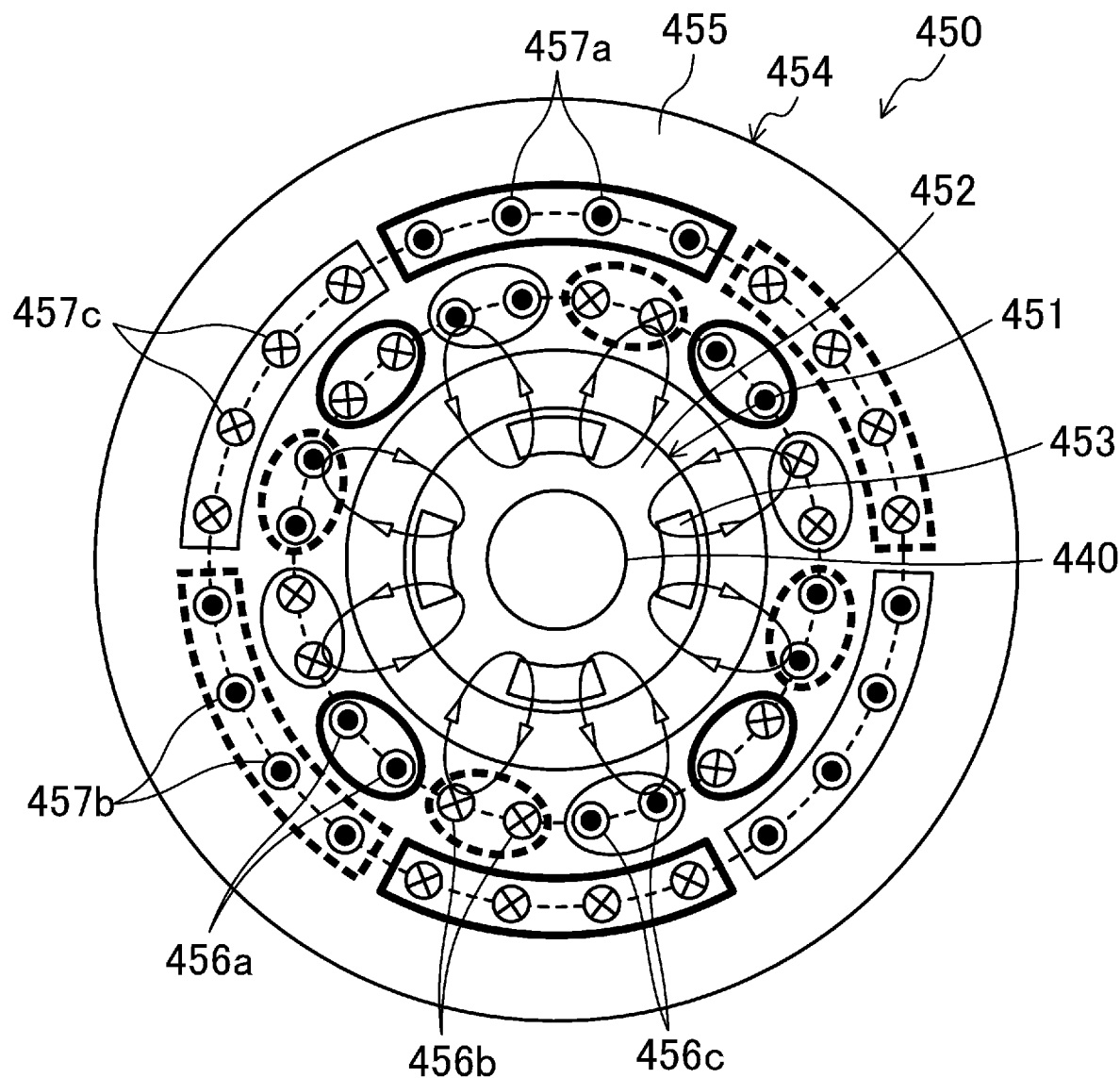
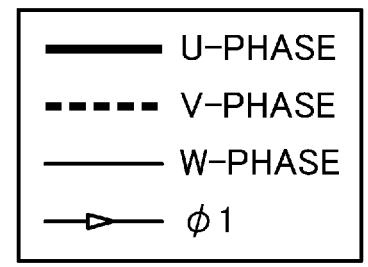

FIG.26
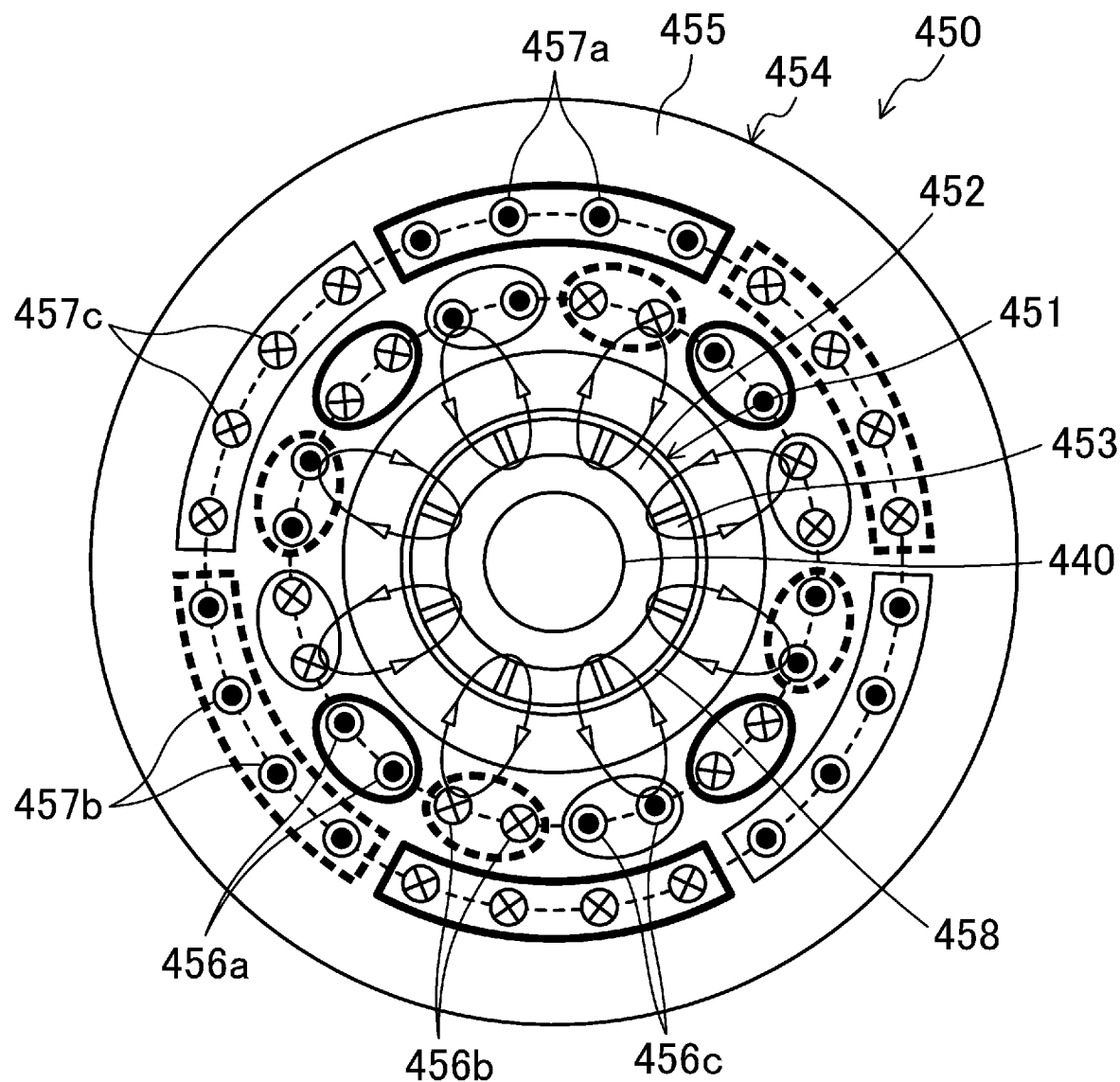
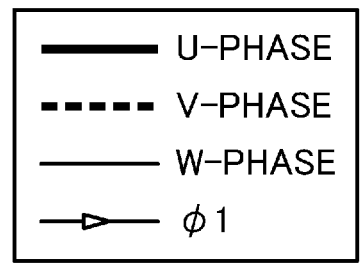

FIG.29
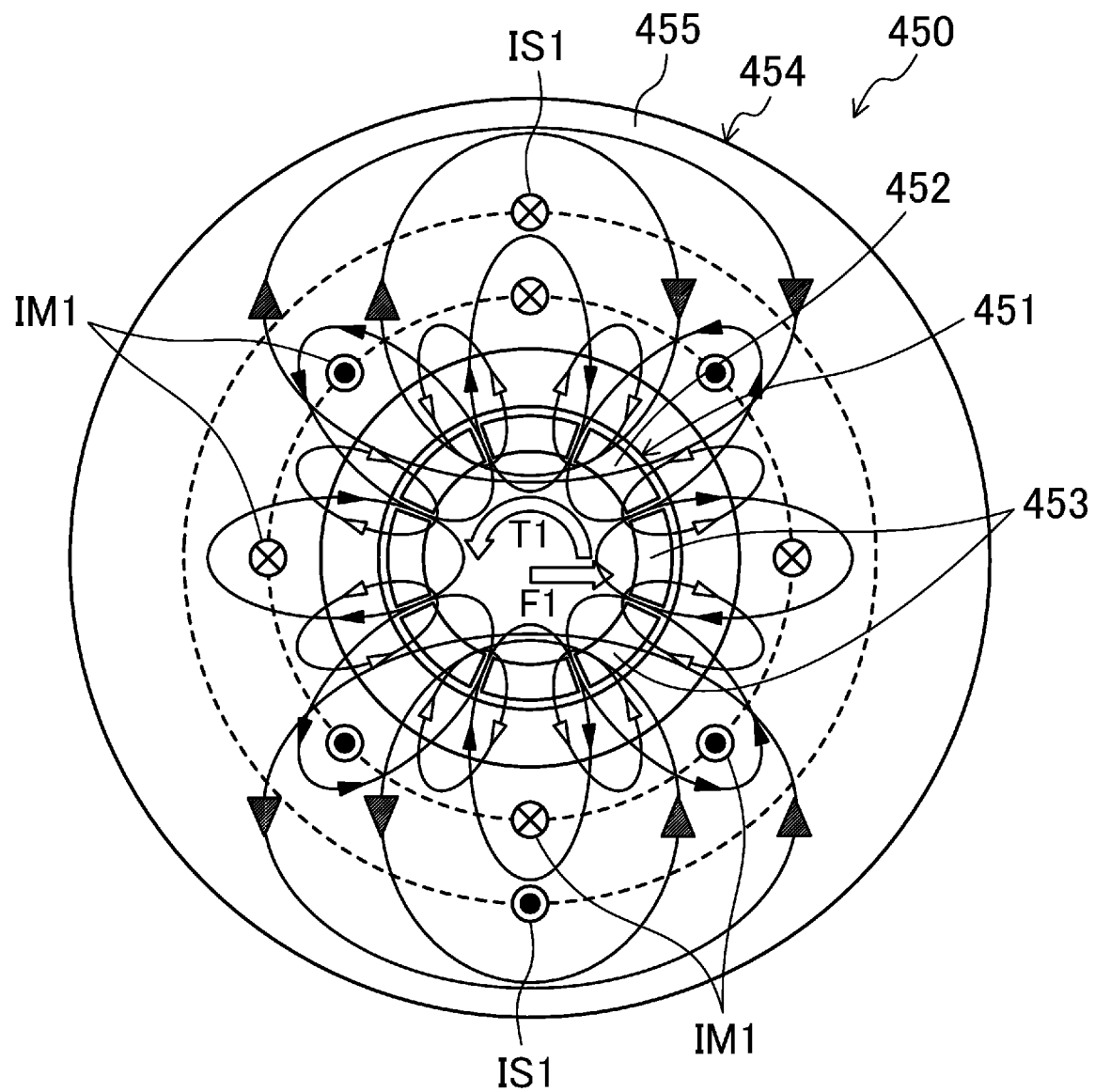
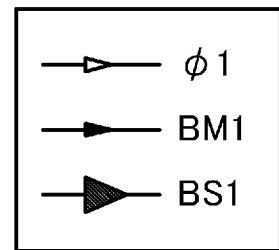

FIG.32
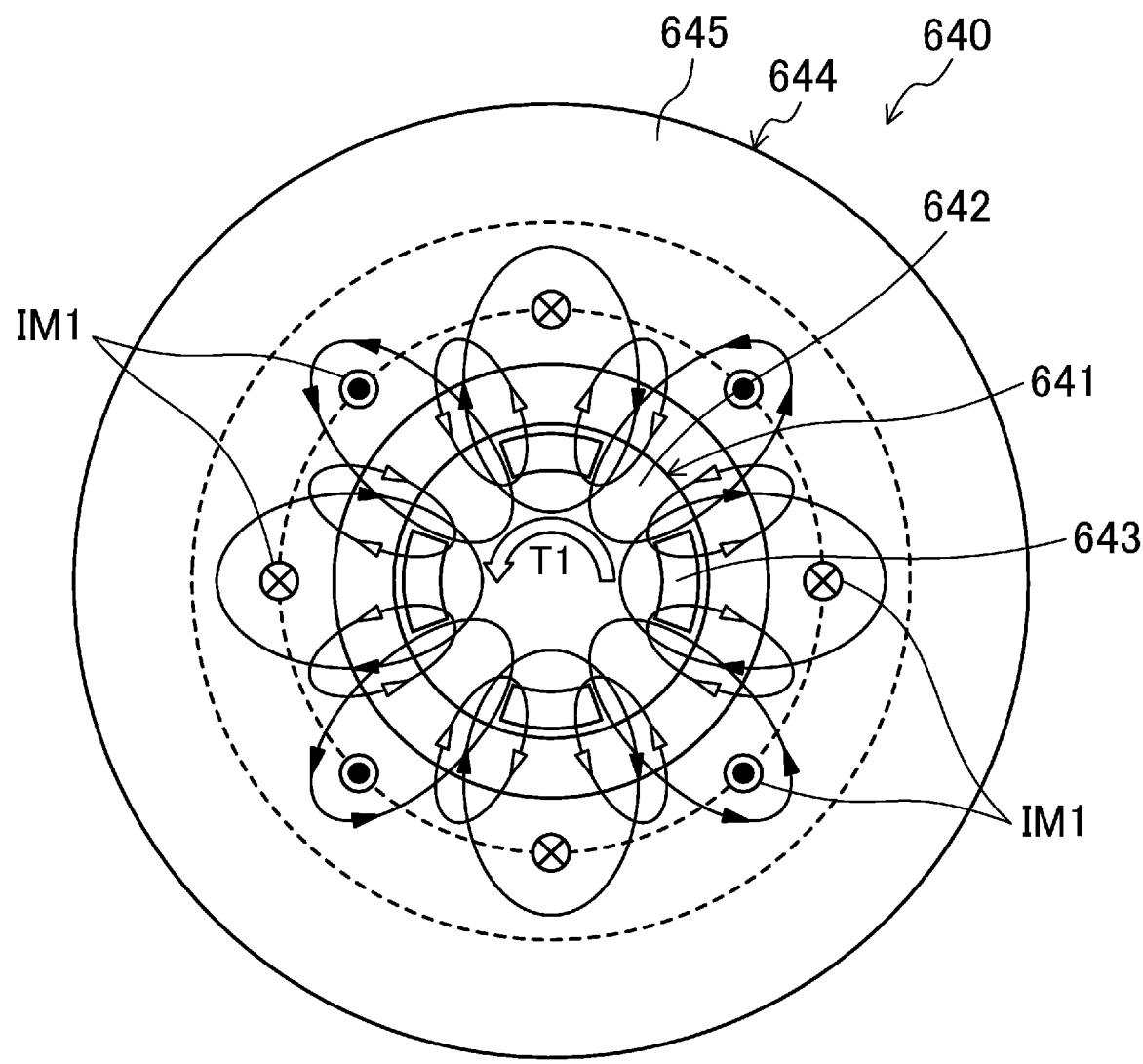
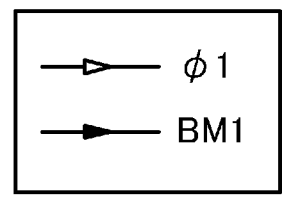

FIG.34
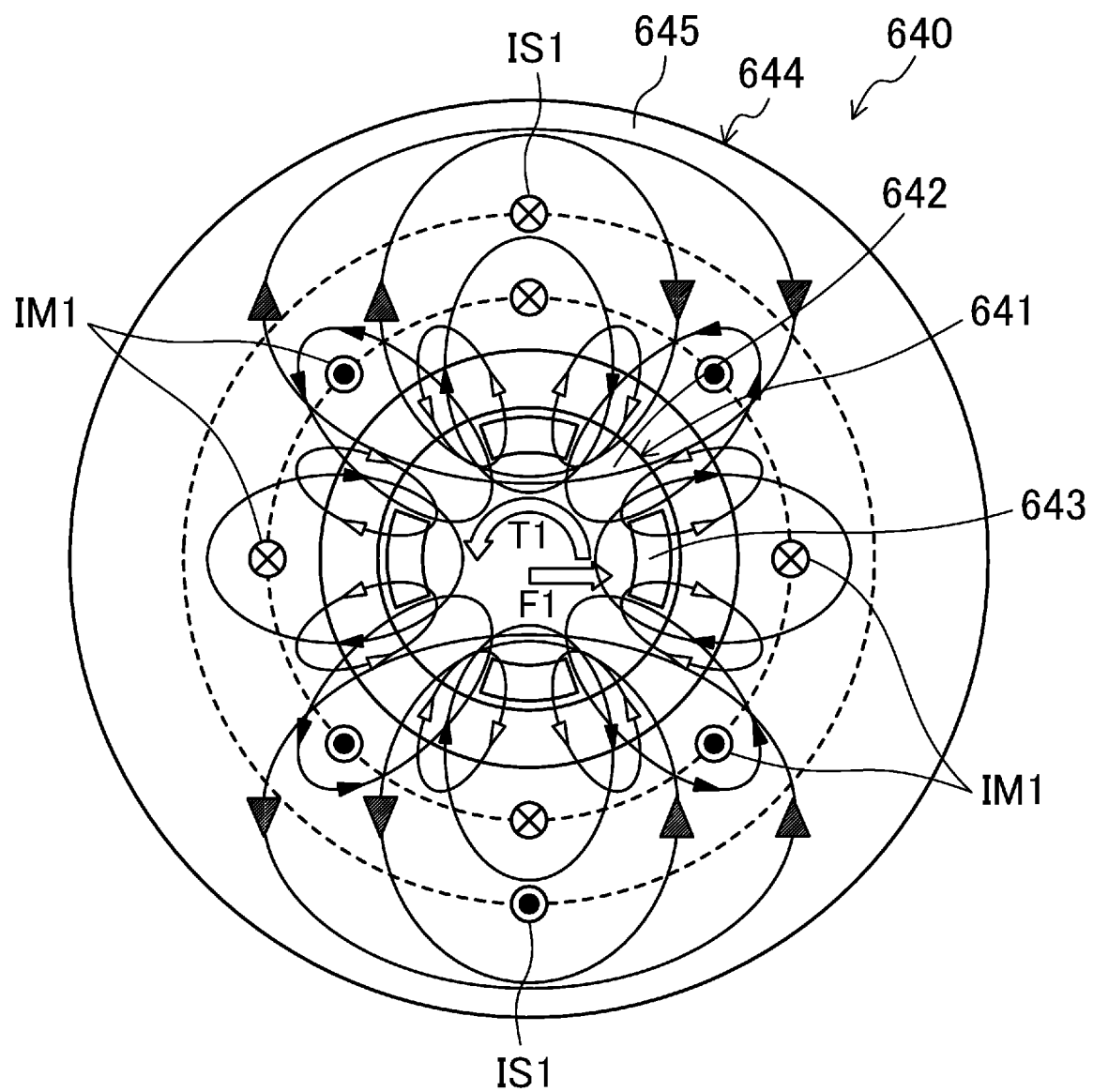
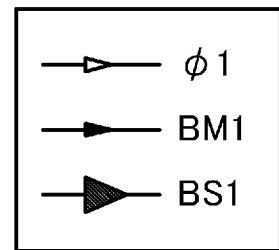

TURBO COMPRESSOR

BACKGROUND OF THE INVENTION

1. Field of the Invention

The present invention relates to a turbo compressor.

2. Description of the Related Art

Turbo compressors are known in the related art which include an impeller and a drive shaft attached to the impeller (for example, Japanese Unexamined Patent Application Publication No. 2016-114114). A turbo compressor described in Japanese Unexamined Patent Application Publication No. 2016-114114 includes an electric motor for rotationally driving an impeller and a drive shaft, two radial magnetic bearings that support the radial load of the drive shaft in a contactless manner by using an electromagnetic force, and one thrust magnetic bearing that controls the axial position of the drive shaft in a contactless manner by using an electromagnetic force. The two radial magnetic bearings are arranged such that one of the two radial magnetic bearings is placed on either side of the electric motor.

A bearingless motor defined as a "motor with a magnetically integrated magnetic-bearing function" has been studied and commercialized in recent years (for example, Japanese Unexamined Patent Application Publication No. 2014-241725). The bearingless motor is applied to a ventricular assist device or the like, for example.

In applications such as the ventricular assist device described above, the working fluid is a liquid having less compressibility than a gas, and thus the so-called surging phenomenon is less likely to occur. Commercialization of the bearingless motor is hitherto limited to applications in which the surging phenomenon is less likely to occur. An example of application of a bearingless motor to a device that uses a gas (gas refrigerant) as a working fluid and that operates in an operating region where the surging phenomenon can occur, such as an air-conditioning turbo compressor, and commercialization of such a device has not hitherto been found.

SUMMARY OF THE INVENTION

In view of the foregoing situation, it is an object of the present invention to provide a turbo compressor to which a bearingless motor is applied.

A turbo compressor according to a first aspect of the present disclosure is a turbo compressor (101, 210, 410, 601, 701, 812) for compressing refrigerant, the turbo compressor being disposed in a refrigerant circuit that performs a refrigeration cycle. The turbo compressor (101, 210, 410, 601, 701, 812) includes an impeller (120, 221, 421, 603a, 720, 821), a drive shaft (130, 240, 440, 605, 730, 831), and a drive support unit (160, 170, 180, 250, 260, 450, 460, 621, 640, 760, 770, 780, 782, 784, 787, 840, 850) through which a current in a predetermined current range flows to generate an electromagnetic force, the drive support unit being configured to rotationally drive the drive shaft (130, 240, 440, 605, 730, 831) by using the electromagnetic force and to support a radial load of the drive shaft (130, 240, 440, 605, 730, 831) in a contactless manner by using the electromagnetic force. The drive support unit (160, 170, 180, 250, 260, 450, 460, 621, 640, 760, 770, 780, 782, 784, 787, 840, 850) includes at least one bearingless motor (160, 170, 250, 450, 640, 760, 770, 840, 850). The at least one bearingless motor includes a rotor-stator pair constituted by a rotor (161, 171, 251, 451, 641, 761, 771, 841, 851) and a stator (164, 174, 254, 454, 644, 762, 772, 844, 854), and is configured to rotationally drive the drive shaft (130, 240, 440, 605, 730, 831) and to support the radial load of the drive shaft (130, 240, 440, 605, 730, 831) in a contactless manner.

In the first aspect, when it is not necessary to generate a large driving torque in the bearingless motor (160, 170, 250, 450, 640, 760, 770, 840, 850) to rotationally drive the impeller (120, 221, 421, 603a, 720, 821) and the drive shaft (130, 240, 440, 605, 730, 831), a magnetic circuit formed by the rotor (161, 171, 251, 451, 641, 761, 771, 841, 851) and the stator (164, 174, 254, 454, 644, 762, 772, 844, 854) can be effectively utilized to generate a support force for supporting the radial load of the drive shaft (130, 240, 440, 605, 730, 831). In the first aspect, on the other hand, when it is not necessary to generate a large support force in the bearingless motor (160, 170, 250, 450, 640, 760, 770, 840, 850) to support the radial load of the drive shaft (130, 240, 440, 605, 730, 831), the magnetic circuit formed by the rotor (161, 171, 251, 451, 641, 761, 771, 841, 851) and the stator (164, 174, 254, 454, 644, 762, 772, 844, 854) can be effectively utilized to rotationally drive the impeller (120, 221, 421, 603a, 720, 821) and the drive shaft (130, 240, 440, 605, 730, 831).

A turbo compressor according to a second aspect of the present disclosure is the turbo compressor according to the first aspect, wherein a magnetic flux generated in the drive support unit (160, 170, 180) to rotationally drive the impeller (120) and the drive shaft (130) is represented by a driving magnetic flux BM, and a magnetic flux generated in the drive support unit (160, 170, 180) to support the radial load of the drive shaft (130) is represented by a supporting magnetic flux BS. The turbo compressor according to the second aspect further includes a power source (191) that allows a current to flow through the drive support unit (160, 170, 180), and a controller (190) that controls the power source (191) so that, when the turbo compressor (101) operates in a rotating-stall generation region and a surging region, a ratio of current IS for generating the supporting magnetic flux BS to current IM for generating the driving magnetic flux BM is increased, compared to during normal operation, when compared at the same rotational speed.

The second aspect addresses an increase in the radial load of the drive shaft (130) in the rotating-stall generation region and the surging region, compared to during normal operation, when compared at the same rotational speed. That is, when the turbo compressor (101) operates in the rotating-stall generation region and the surging region, the ratio of the current IS for generating the supporting magnetic flux BS to the current IM for generating the driving magnetic flux BM is increased, compared to during normal operation. Accordingly, the turbo compressor (101) may be operated without failure even in the rotating-stall generation region and the surging region.

A turbo compressor according to a third aspect of the present disclosure is the turbo compressor according to the first aspect, wherein a magnetic flux generated in the drive support unit (160, 170, 180) to rotationally drive the impeller (120) and the drive shaft (130) is represented by a driving magnetic flux BM, and a magnetic flux generated in the drive support unit (160, 170, 180) to support the radial load of the drive shaft (130) is represented by a supporting magnetic flux BS. The turbo compressor according to the third aspect further includes a power source (191) that allows a current to flow through the drive support unit (160, 170, 180), and a controller (190) that controls the power source (191) so that, when the turbo compressor (101) operates in a rotating-stall generation region and a surging region, a ratio of current IS for generating the supporting magnetic flux BS to current IM for generating the driving magnetic flux BM is increased as a refrigerant volumetric flow rate decreases, when compared at the same rotational speed.

The third aspect addresses an increase in the radial load of the drive shaft (130) as the refrigerant volumetric flow rate decreases, when the turbo compressor (101) operates in the rotating-stall generation region and the surging region, when compared at the same rotational speed. That is, when the turbo compressor (101) operates in the rotating-stall generation region and the surging region, the ratio of the current IS for generating the supporting magnetic flux BS to the current IM for generating the driving magnetic flux BM is increased as the refrigerant volumetric flow rate decreases, when compared at the same rotational speed. Accordingly, the turbo compressor (101) may be operated without failure even in the rotating-stall generation region and the surging region.

A turbo compressor according to a fourth aspect of the present disclosure is the turbo compressor according to the first aspect, wherein when a magnetic flux generated in the drive support unit (160, 170, 180) to rotationally drive the impeller (120) and the drive shaft (130) is represented by a driving magnetic flux BM, a magnetic flux generated in the drive support unit (160, 170, 180) to support the radial load of the drive shaft (130) is represented by a supporting magnetic flux BS, a maximum value of a sum of the driving magnetic flux BM and the supporting magnetic flux BS in a predetermined operating region of the turbo compressor (101) is represented by (BM+BS)max, a magnetic flux generated in the drive support unit (160, 170, 180) to generate a driving torque corresponding to a maximum torque load in the predetermined operating region is represented by BMmax, a magnetic flux generated in the drive support unit (160, 170, 180) to support a maximum radial load of the drive shaft (130) in the predetermined operating region is represented by BSmax, and a magnetic flux generated in the drive support unit (160, 170, 180) when the current flowing through the drive support unit (160, 170, 180) is equal to an upper limit of the predetermined current range is represented by Bmax, the drive support unit (160, 170, 180) is configured such that a relationship given by (BM+BS)max≤Bmax<BMmax+BSmax is satisfied.

In a general concept that makes it possible to simultaneously generate both a maximum driving torque and a maximum radial load support force in the drive support unit (160, 170, 180), the drive support unit (160, 170, 180) is configured such that the magnetic flux Bmax generated in the drive support unit (160, 170, 180) when the current flowing through the drive support unit (160, 170, 180) is equal to the upper limit of the predetermined current range becomes equal to BMmax+BSmax (Bmax=BMmax+BSmax).

In the fourth aspect, in contrast, the drive support unit (160, 170, 180) is configured such that the magnetic flux Bmax generated in the drive support unit (160, 170, 180) when the current flowing through the drive support unit (160, 170, 180) is equal to the upper limit of the predetermined current range becomes greater than or equal to (BM+BS)max and less than BMmax+BSmax((BM+BS)max≤Bmax<BMmax+BSmax). Accordingly, it is possible to reduce the size of the stator (164, 174) and the rotor (161, 171) of the bearingless motor (160, 170), compared to a case where, for example, the drive support unit (160, 170, 180) is configured on the basis of the general concept.

This is based on a fact discovered by the inventors of the present invention that in the turbo compressor (101) for use in a refrigeration apparatus, an operating region in which a maximum driving torque is required (that is, a region in which the load torque is maximum) and an operating region in which a maximum radial load support force is required (that is, a region in which the radial load of the drive shaft (130) is maximum) are different. That is, since there is no need to simultaneously generate the maximum driving torque and the maximum radial load support force in the drive support unit (160, 170, 180), according to the fourth aspect, the drive support unit (160, 170, 180) is configured such that a relationship given by (BM+BS)max≤Bmax<BMmax+BSmax is satisfied. With this configuration, it is possible to reduce the size of the drive support unit (160, 170, 180) without impairing the functionality and reliability of the turbo compressor (101).

A turbo compressor according to a fifth aspect of the present disclosure is the turbo compressor according to the first aspect, wherein the drive support unit (160, 170, 180) includes a coil (166a to 166c, 167a to 167c, 176a to 176c, 177a to 177c, 184) through which a current in the predetermined current range flows, and wherein when a magnetic flux generated in the drive support unit (160, 170, 180) to rotationally drive the impeller (120) and the drive shaft (130) is represented by a driving magnetic flux BM, a magnetic flux generated in the drive support unit (160, 170, 180) to support the radial load of the drive shaft (130) is represented by a supporting magnetic flux BS, a magnetic flux generated in the drive support unit (160, 170, 180) to generate a driving torque corresponding to a maximum torque load in a predetermined operating region of the turbo compressor (101) is represented by BMmax, and a current flowing through the coil (166a to 166c, 167a to 167c, 176a to 176c, 177a to 177c, 184) when the driving torque corresponding to the maximum torque load is generated is represented by a maximum torque current IBMmax, a magnetic flux generated in the drive support unit (160, 170, 180) to support a maximum radial load of the drive shaft (130) in the predetermined operating region is represented by BSmax, and a current flowing through the coil (166a to 166c, 167a to 167c, 176a to 176c, 177a to 177c, 184) when the maximum radial load of the drive shaft (130) is supported is represented by a maximum support force current IBSmax, and a magnetic flux generated in the drive support unit (160, 170, 180) by causing a current obtained by adding together the maximum torque current IBMmax and the maximum support force current IBSmax to flow through the coil (166a to 166c, 167a to 167c, 176a to 176c, 177a to 177c, 184) is represented by BMSmax, the drive support unit (160, 170, 180) is configured such that a relationship given by BMSmax<BMmax+BSmax is satisfied.

In a general concept that makes it possible to simultaneously generate both the maximum load torque and the maximum radial load support force in the drive support unit (160, 170, 180), the drive support unit (160, 170, 180) is configured such that the magnetic flux BMSmax generated in the drive support unit (160, 170, 180) by causing a current obtained by adding together the maximum torque current IBMmax and the maximum support force current IBSmax to flow through the coil (166a to 166c, 167a to 167c, 176a to 176c, 177a to 177c, 184) becomes equal to BMmax+BSmax (BMSmax=BMmax+BSmax).

In the fifth aspect, in contrast, the drive support unit (160, 170, 180) is configured such that the magnetic flux BMSmax generated in the drive support unit (160, 170, 180) by causing a current obtained by adding together the maximum torque current IBMmax and the maximum support force current IBSmax to flow through the coil (166*a* to 166*c*, 167*a* to 167*c*, 176*a* to 176*c*, 177*a* to 177*c*, 184) becomes less than BMmax+BSmax (BMSmax<BMmax+BSmax). Accordingly, it is possible to reduce the size of the stator (164, 174) and the rotor (161, 171) of the bearingless motor (160, 170), compared to a case where, for example, the drive support unit (160, 170, 180) is configured on the basis of the general concept.

This is based on a fact discovered by the inventors of the present invention that in the turbo compressor (101) for use in a refrigeration apparatus, an operating region in which a maximum driving torque is required and an operating region in which a maximum radial load support force is required are different. That is, since there is no need to simultaneously generate the maximum driving torque and the maximum radial load support force in the drive support unit (160, 170, 180), according to the fifth aspect, the drive support unit (160, 170, 180) is configured such that a relationship given by BMSmax<BMmax+BSmax is satisfied. With this configuration, it is possible to reduce the size of the drive support unit (160, 170, 180) without impairing the functionality and reliability of the turbo compressor (101).

A turbo compressor according to a sixth aspect of the present disclosure is the turbo compressor according to the first aspect, further including a power source (191) that allows a current to flow through the drive support unit (160, 170, 180), and a controller (190) that controls the power source (191) so that, when the turbo compressor operates in a surging region or when a rotation of the drive shaft (130) is stopped under normal operation, only a current for supporting the radial load of the drive shaft (130) in a contactless manner flows through the drive support unit (160, 170, 180), but a current that contributes to a driving torque does not flow through the drive support unit (160, 170, 180).

In the sixth aspect, when the turbo compressor operates in the surging region or when the rotation of the drive shaft (130) is stopped under normal operation (that is, when the generation of a torque is not required), only a current for supporting the radial load of the drive shaft (130) flows through the drive support unit (160, 170, 180). This enables the turbo compressor (101) to be efficiently operated in the case described above.

A turbo compressor according to a seventh aspect of the present disclosure is the turbo compressor according to any one of the first to sixth aspects, wherein the drive support unit (160, 170, 180) includes only the at least one bearingless motor (160, 170).

In the seventh aspect, only the bearingless motor (160, 170) can support the radial load of the drive shaft (130) in a contactless manner.

A turbo compressor according to an eighth aspect of the present disclosure is the turbo compressor according to any one of the first to sixth aspects, wherein the drive support unit (160, 170, 180) includes the at least one bearingless motor (160, 170), and a magnetic bearing (180) arranged side-by-side with the at least one bearingless motor (160, 170) in an axial direction of the drive shaft (130), the magnetic bearing including a plurality of electromagnets and configured to support the radial load of the drive shaft (130) in a contactless manner.

In the eighth aspect, the bearingless motor (160, 170) and the magnetic bearing (180) can support the radial load of the drive shaft (130) in a contactless manner.

A turbo compressor according to a ninth aspect of the present disclosure is the turbo compressor according to the eighth aspect, wherein the magnetic bearing (260) is arranged at a position on which a larger radial load than the radial load supported by the at least one bearingless motor (250) is exerted in the axial direction of the drive shaft (240).

In the ninth aspect, the radial load supported by the magnetic bearing (260) is larger than the radial load supported by the bearingless motor (250). That is, the magnetic bearing (260) is arranged at a position at which the radial load of the drive shaft (240) is relatively large, and the bearingless motor (250) is arranged at a position at which the radial load of the drive shaft (240) is relatively small. In the bearingless motor (250), the electromagnetic force is distributed as a support force (a force for supporting the drive shaft (240) in a contactless manner) and a driving force (a force for rotationally driving the drive shaft (240)), whereas in the magnetic bearing (260), all of the electromagnetic force can be distributed as a support force. Thus, the magnetic bearing (260) is capable of generating a larger support force than the bearingless motor (250).

A turbo compressor according to a tenth aspect of the present disclosure is the turbo compressor according to the ninth aspect, wherein the impeller (220) is connected to one end of the drive shaft (240), and wherein the magnetic bearing (260) is arranged at a position closer to the impeller (220) than the at least one bearingless motor (250) in the axial direction of the drive shaft (240).

In the tenth aspect, as the position in the axial direction of the drive shaft (240) becomes closer to the one end of the drive shaft (240) (that is, the impeller (220)), the radial load of the drive shaft (240) at this position tends to increase. Accordingly, the magnetic bearing (260) is arranged at a position closer to the impeller (220) than the bearingless motor (250) in the axial direction of the drive shaft (240). With this configuration, the magnetic bearing (260) can be arranged at a position at which the radial load of the drive shaft (240) is relatively large, and the bearingless motor (250) can be arranged at a position at which the radial load of the drive shaft (240) is relatively small.

A turbo compressor according to an eleventh aspect of the present disclosure is the turbo compressor according to the ninth or tenth aspect, wherein the at least one bearingless motor (250) is configured as a surface permanent magnet (SPM) bearingless motor.

In the eleventh aspect, the bearingless motor (250) is configured as an SPM bearingless motor. Note that the number of permanent magnets (253) in the SPM bearingless motor (250) is larger than the number of permanent magnets (253) in the consequent-pole bearingless motor (250). With this configuration, the SPM bearingless motor (250) has a higher magnetic flux density in terms of a magnet magnetic flux φ1 than the consequent-pole bearingless motor (250). Accordingly, the SPM bearingless motor (250) can generate a greater driving torque (T1) than the consequent-pole bearingless motor (250).

A turbo compressor according to a twelfth aspect of the present disclosure is the turbo compressor according to the eighth aspect, wherein the at least one bearingless motor (450) is arranged at a position on which a larger radial load than the radial load supported by the magnetic bearing (460) is exerted in the axial direction of the drive shaft (440).

In the twelfth aspect, the bearingless motor (450) is arranged at a position at which the radial load of the drive shaft (440) is relatively large, and the magnetic bearing (460) is arranged at a position at which the radial load of the drive shaft (440) is relatively small. That is, the magnetic bearing (460) is arranged at a position on which a smaller radial load than the radial load supported by the bearingless motor (450) is exerted. The electromagnetic force generated in the magnetic bearing (460) depends on the size (in particular, the axial length or rotor diameter) of the magnetic bearing (460), and the electromagnetic force generated in the magnetic bearing (460) tends to increase as the size of the magnetic bearing (460) increases. Accordingly, arranging the magnetic bearing (460) at a position on which a smaller radial load than the radial load supported by the bearingless motor (450) is exerted can reduce the size (in particular, the axial length or rotor diameter) of the magnetic bearing (460), compared to arranging the magnetic bearing (460) at a position on which a larger radial load than the radial load supported by the bearingless motor (450) is exerted.

In the turbo compressor (410) disposed in the refrigerant circuit (510) and configured to compress refrigerant, furthermore, the operating region in which the load torque of the drive shaft (440) (a torque necessary to rotationally drive the drive shaft (440)) is maximum and the operating region in which the radial load of the drive shaft (440) is maximum are different, and the load torque of the drive shaft (440) is relatively small in an operating region in which the radial load of the drive shaft (440) is relatively large (in particular, the operating region in which the radial load of the drive shaft (440) is maximum). Accordingly, in an operating region in which the radial load of the drive shaft (440) is relatively large, the electromagnetic force of the bearingless motor (450) can be sufficiently distributed as a support force (a force for supporting the drive shaft (440) in a contactless manner).

A turbo compressor according to a thirteenth aspect of the present disclosure is the turbo compressor according to the twelfth aspect, wherein the impeller (421) is connected to one end of the drive shaft (440), and the at least one bearingless motor (450) is arranged at a position closer to the impeller (421) than the magnetic bearing (460) in the axial direction of the drive shaft (440).

In the thirteenth aspect, as the position in the axial direction of the drive shaft (440) becomes closer to the one end of the drive shaft (440) (that is, the impeller (421)), the radial load of the drive shaft (440) at this position tends to increase. Accordingly, the bearingless motor (450) is arranged at a position closer to the impeller (421) than the radial magnetic bearing (460) in the axial direction of the drive shaft (440). With this configuration, in the turbo compressor (410) in which the impeller (421) is connected to one end of the drive shaft (440), the bearingless motor (450) can be arranged at a position at which the radial load of the drive shaft (440) is relatively large, and the radial magnetic bearing (460) can be arranged at a position at which the radial load of the drive shaft (440) is relatively small.

A turbo compressor according to a fourteenth aspect of the present disclosure is the turbo compressor according to the twelfth or thirteenth aspect, wherein the at least one bearingless motor (450) is configured as a consequent-pole bearingless motor or an interior permanent magnet (IPM) bearingless motor.

In the fourteenth aspect, the consequent-pole bearingless motor (450) has a lower magnetic resistance for the magnetic path of the supporting magnetic flux BS1 than the SPM bearingless motor (450). Accordingly, the consequent-pole bearingless motor (450) is capable of generating a larger support force than the SPM bearingless motor (450). In addition, the IPM bearingless motor (450) has a lower magnetic resistance for the magnetic path of the supporting magnetic flux BS1 than the SPM bearingless motor (450). Accordingly, the IPM bearingless motor (450) is capable of generating a larger support force than the SPM bearingless motor (450).

A turbo compressor according to a fifteenth aspect of the present disclosure is the turbo compressor according to the eighth aspect, wherein the magnetic bearing (621) is arranged on each of both sides of the at least one bearingless motor (640) in the axial direction, and is configured to apply a combined electromagnetic force (F) to the drive shaft (605) by using the plurality of electromagnets (671 to 678), and wherein the magnetic bearings (621) on both sides of the at least one bearingless motor (640) generate combined electromagnetic forces (F) having phases opposite to each other.

In the fifteenth aspect, two magnetic bearings (621) are arranged on both sides of the bearingless motor (640), and apply electromagnetic forces having opposite phases to the drive shaft (605). That is, these magnetic bearings (621) allow an electromagnetic force to act in the tilt direction of the drive shaft (605). In addition, the bearingless motor (640) can support a load in the radial direction. This can reduce the load in the radial direction imposed on the magnetic bearings (621), and can consequently reduce the size of the magnetic bearings (621).

A turbo compressor according to a sixteenth aspect of the present disclosure is the turbo compressor according to the fifteenth aspect, wherein each of the electromagnets (671 to 678) of one of the magnetic bearings (621) is connected to one of the electromagnets (671 to 678) of the other magnetic bearing (621) that generates an electromagnetic force having a phase opposite to a phase of an electromagnetic force generated by the electromagnet (671 to 678) of the one of the magnetic bearings (621).

In the sixteenth aspect, a single controller can simultaneously control the two magnetic bearings (621).

A turbo compressor according to a seventeenth aspect of the present disclosure is the turbo compressor according to the fifteenth or sixteenth aspect, wherein the at least one bearingless motor (640) is used to control a displacement in a translational direction, and the magnetic bearing (621) is used to control a displacement in a tilt direction.

A turbo compressor according to an eighteenth aspect of the present disclosure is the turbo compressor according to the seventeenth aspect, further including separate controllers for the at least one bearingless motor (640) and for the magnetic bearing (621).

A turbo compressor according to a nineteenth aspect of the present disclosure is the turbo compressor according to any one of the fifteenth to eighteenth aspects, wherein the number of turns of a coil of each of the electromagnets (671 to 678), a magnitude of a current that flows through each coil, a magnetic resistance of a magnetic circuit, and a size of each of the electromagnets are set such that one of the magnetic bearings (621) located closer to the impeller (603a) generates a larger combined electromagnetic force (F) than the other magnetic bearing (621).

A turbo compressor according to a twentieth aspect of the present disclosure is the turbo compressor according to the nineteenth aspect, wherein the number of turns of the coil of each of the electromagnets (671 to 678) of the magnetic bearing (621) located closer to the impeller (603a) is larger than the number of turns of the coil of each of the electromagnets (671 to 678) of the other magnetic bearing (621).

In the twentieth aspect, the combined electromagnetic forces (F) of the magnetic bearings (621) are adjusted in accordance with the numbers of turns of the coils (665).

A turbo compressor according to a twenty-first aspect of the present disclosure is the turbo compressor according to the nineteenth or twentieth aspect, wherein the magnetic bearing (621) located closer to the impeller (603a) has a larger axial length than the other magnetic bearing (621).

In the twenty-first aspect, the combined electromagnetic forces (F) of the magnetic bearings (621) are adjusted in accordance with the axial lengths of the magnetic bearings (621).

A turbo compressor according to a twenty-second aspect of the present disclosure is the turbo compressor according to any one of the nineteenth to twenty-first aspects, wherein a portion of the drive shaft (605) facing the magnetic bearing (621) located closer to the impeller (603a) has a larger diameter than a portion of the drive shaft (605) facing the other magnetic bearing (621).

In the twenty-second aspect, the combined electromagnetic forces (F) of the magnetic bearings (621) are adjusted in accordance with the diameters of portions of the drive shaft (605) facing the magnetic bearings (621).

A turbo compressor according to a twenty-third aspect of the present disclosure is the turbo compressor according to any one of the first to twenty-second aspects, wherein the drive support unit (760, 770, 780, 782, 784, 787) includes a gas bearing (780, 782, 784, 787) that is embedded in the at least one bearingless motor (760, 770) and that supports the radial load of the drive shaft (730) in a contactless manner.

In the twenty-third aspect, the bearingless motor (760, 770) and the gas bearing (780, 782, 784, 787) support the radial load of the drive shaft (730) in a contactless manner. With this configuration, the radial load imposed on the bearingless motor (760, 770) can be reduced, compared to a case where the radial load of the drive shaft (730) is supported only by the bearingless motor (760, 770), and the driving torque output of the bearingless motor (760, 770) can be increased by an amount corresponding to the amount of reduction of the radial load. In addition, since the gas bearing (780, 782, 784, 787) is embedded in the bearingless motor (760, 770), a rotating system can be reduced in size, compared to a case where the gas bearing (780, 782, 784, 787) is provided on a stand-alone basis. Accordingly, the region in which the turbo compressor (701) can be operated safely can be expanded.

A turbo compressor according to a twenty-fourth aspect of the present disclosure is the turbo compressor according to the twenty-third aspect, wherein the stator (762, 772) of the at least one bearingless motor (760, 770) has wound therearound a coil (763, 773) through which a current in the predetermined current range flows, and wherein at least a portion of the gas bearing (780, 782, 784, 787) overlaps a coil end portion (764, 774) of the stator (762, 772) in a radial direction of the drive shaft (730).

In the twenty-fourth aspect, at least a portion of the gas bearing (780, 782, 784, 787) overlaps the coil end portion (764, 774) in the radial direction of the drive shaft (730). With this configuration, the entire size of a rotating system including the gas bearing (780, 782, 784, 787), the bearingless motor (760, 770), and the drive shaft (730) can be reduced.

A turbo compressor according to a twenty-fifth aspect of the present disclosure is the turbo compressor according to the twenty-fourth aspect, wherein the gas bearing (780, 782, 784, 787) is constituted by a sleeve (780, 782, 784, 787) that fits into a molding resin (765, 775) of the coil end portion (764, 774).

A turbo compressor according to a twenty-sixth aspect of the present disclosure is the turbo compressor according to any one of the twenty-third to twenty-fifth aspects, wherein the gas bearing (780, 782) is a dynamic-pressure gas bearing.

A turbo compressor according to a twenty-seventh aspect of the present disclosure is the turbo compressor according to any one of the twenty-third to twenty-fifth aspects, wherein the gas bearing (784, 787) is a static-pressure gas bearing.

A turbo compressor according to a twenty-eighth aspect of the present disclosure is the turbo compressor according to any one of the first to twenty-seventh aspects, further including an armature winding (846a to 846c, 856a to 856c) and a support winding (847a to 847c, 857a to 857c) that are provided on the stator (844, 854) of the at least one bearingless motor (840, 850), a power source (861, 862) that applies a voltage to the armature winding (846a to 846c, 856a to 856c) and the support winding (847a to 847c, 857a to 857c), and a controller (860) that controls the power source (861, 862) so that one of an armature voltage VA, which is a voltage applied to the armature winding (846a to 846c, 856a to 856c), and a support current IS, which is a current flowing through the support winding (847a to 847c, 857a to 857c), is increased and the other of the armature voltage VA and the support current IS is decreased.

In the twenty-eighth aspect, increasing one of the armature voltage VA and the support current IS and decreasing the other of the armature voltage VA and the support current IS can adjust the armature voltage VA and the support current IS within the range of the power supply capacity of the power source (861, 862) in accordance with the operating status of the turbo compressor (812).

A turbo compressor according to a twenty-ninth aspect of the present disclosure is the turbo compressor according to the twenty-eighth aspect, wherein the controller (860) controls the power source (861, 862) so that the armature voltage VA is increased and the support current IS is decreased or so that the support current IS is increased and the armature voltage VA is decreased.

In the twenty-ninth aspect, it is possible to decrease the support current IS or the armature voltage VA while maintaining the radial support force.

A turbo compressor according to a thirtieth aspect of the present disclosure is the turbo compressor according to the twenty-eighth or twenty-ninth aspect, wherein the controller (860) controls the power source (861, 862) so that the armature voltage VA is increased and the support current IS does not exceed a predetermined first upper limit.

In the thirtieth aspect, it is possible to increase a radial support force caused by the armature current IA, which is a current flowing through the armature winding (846a to 846c, 856a to 856c), while preventing the support current IS from exceeding the first upper limit. This is effective particularly when the radial support force is increased with the support current IS reaching the first upper limit or reaching near the first upper limit.

A turbo compressor according to a thirty-first aspect of the present disclosure is the turbo compressor according to any one of the twenty-eighth to thirtieth aspects, wherein the controller (860) controls the power source (861, 862) so that the support current IS is increased and the armature voltage VA does not exceed a predetermined second upper limit.

In the thirty-first aspect, it is possible to prevent the armature voltage VA from exceeding the second upper limit. However, for example, an increase in the rotational speed of the bearingless motor (840, 850) may reduce the radial support force caused by the armature current IA. To address this, the support current IS is increased, and a radial support force caused by the increased support current IS can compensate for the reduction in the radial support force.

A turbo compressor according to a thirty-second aspect of the present disclosure is the turbo compressor according to any one of the twenty-eighth to thirty-first aspects, wherein the controller (860) controls the power source (861, 862) so that the armature voltage VA is decreased and the support current IS is increased or so that the support current IS is decreased and the armature voltage VA is increased.

In the thirty-second aspect, it is possible to increase the support current IS or the armature voltage VA while maintaining the radial support force.

A turbo compressor according to a thirty-third aspect of the present disclosure is the turbo compressor according to any one of the twenty-eighth to thirty-second aspects, wherein the controller (860) controls the power source (861, 862) so that the armature voltage VA is decreased and the support current IS exceeds a predetermined first lower limit.

In the thirty-third aspect, the support current IS can exceed the first lower limit. Thus, for example, heat generated in the support winding (847a to 847c, 857a to 857c) can be utilized, as necessary.

A turbo compressor according to a thirty-fourth aspect of the present disclosure is the turbo compressor according to any one of the twenty-eighth to thirty-third aspects, wherein the controller (860) controls the power source (861, 862) so that the support current IS is decreased and the armature voltage VA exceeds a predetermined second lower limit.

In the thirty-fourth aspect, the armature voltage VA can exceed the second lower limit. Thus, for example, heat generated in the armature winding (846a to 846c, 856a to 856c) can be utilized, as necessary.

A turbo compressor according to a thirty-fifth aspect of the present disclosure is the turbo compressor according to any one of the twenty-eighth to thirty-fourth aspects, wherein the turbo compressor (812) is disposed in a refrigerant circuit (811) that performs a refrigeration cycle, and is configured to compress refrigerant by using the impeller (821), and wherein when the turbo compressor (812) operates in a rotating-stall generation region or a surging region, the controller (860) controls the power source (861, 862) so that the armature voltage VA is increased and the support current IS does not exceed a predetermined first upper limit.

In the thirty-fifth aspect, when the turbo compressor (812) operates in the rotating-stall generation region (C) or the surging region (D), that is, when the load torque of the bearingless motor (840, 850) is small whereas the required radial support force is large, the radial support force caused by the armature current IA can be increased. Thus, even if the support current IS is kept less than or equal to the first upper limit, the increase in the armature current IA can increase the radial support force of the bearingless motor (840, 850).

A refrigeration apparatus (900) according to a thirty-sixth aspect of the present disclosure includes a heat source unit (910) including the turbo compressor (101, 210, 410, 601, 701, 812) according to any one of the first to thirty-fifth aspects, and at least one utilization unit (921).

In the thirty-sixth aspect, the turbo compressor (101, 210, 410, 601, 701, 812) in the heat source unit (910) is operated to perform air-conditioning of a space where the utilization unit (921) is placed, for example.

A refrigeration apparatus according to a thirty-seventh aspect of the present disclosure is the refrigeration apparatus according to the thirty-sixth aspect, wherein the at least one utilization unit (921) includes a plurality of utilization units (921), and wherein the plurality of utilization units (921) perform air-conditioning of a plurality of air-conditioning-target spaces.

In the thirty-seventh aspect, the plurality of utilization units (921) perform air-conditioning of a plurality of air-conditioning-target spaces.

According to the first aspect, it is possible to provide a turbo compressor including a drive support unit that includes at least one bearingless motor.

According to the second and third aspects, it is possible to operate the turbo compressor without failure even in the rotating-stall generation region and the surging region.

According to the fourth and fifth aspects, it is possible to reduce the size of the stator and the rotor of the bearingless motor, compared to a case where, for example, the drive support unit is configured on the basis of the general concept.

According to the sixth aspect, it is possible to efficiently operate the turbo compressor when the turbo compressor operates in the surging region or when the rotation of the drive shaft is stopped under normal operation.

According to the ninth aspect, rotational driving and contactless supporting of the drive shaft are performed using the bearingless motor and the magnetic bearing. This makes it possible to reduce the size of the drive support unit, compared to a case where a motor that performs only rotational driving of the drive shaft and a magnetic bearing that performs only contactless supporting of the drive shaft are provided in place of the bearingless motor.

According to the ninth aspect, furthermore, the magnetic bearing is capable of generating a larger support force than the bearingless motor. Thus, the radial magnetic bearing is arranged at a position at which the radial load of the drive shaft is relatively large, and the bearingless motor is arranged at a position at which the radial load of the drive shaft is relatively small. This ensures a support force for the drive shaft (a force for supporting the drive shaft in a contactless manner) can be maintained.

According to the tenth aspect, the magnetic bearing is arranged at a position closer to the impeller than the bearingless motor in the axial direction of the drive shaft. With this configuration, in the turbo compressor in which the impeller is connected to one end of the drive shaft, the magnetic bearing can be arranged at a position at which the radial load of the drive shaft is relatively large, and the bearingless motor can be arranged at a position at which the radial load of the drive shaft is relatively small.

According to the eleventh aspect, the bearingless motor configured as an SPM bearingless motor can generate a larger driving force (a force for rotationally driving the drive shaft) than the bearingless motor configured as a consequent-pole bearingless motor.

According to the twelfth aspect, rotational driving and contactless supporting of the drive shaft are performed using the bearingless motor and the magnetic bearing. This makes it possible to reduce the size of the turbo compressor, compared to a case where a motor that performs only rotational driving of the drive shaft and two magnetic bearings that perform only contactless supporting of the drive shaft are provided in place of the bearingless motor.

According to the twelfth aspect, furthermore, since it is possible to reduce the size (in particular, the axial length or rotor diameter) of the magnetic bearing, compared to a case where the magnetic bearing is arranged at a position on which a larger radial load than the radial load supported by the bearingless motor is exerted, it is possible to further reduce the size of the turbo compressor.

According to the twelfth aspect, furthermore, in an operating region in which the radial load of the drive shaft is relatively large, the electromagnetic force of the bearingless motor can be sufficiently distributed as a support force (a force for supporting the drive shaft in a contactless manner). This ensures that a support force for the drive shaft can be maintained in the operating region in which the radial load of the drive shaft is relatively large.

According to the thirteenth aspect, the bearingless motor is arranged at a position closer to the impeller than the magnetic bearing in the axial direction of the drive shaft. With this configuration, in the turbo compressor in which the impeller is connected to one end of the drive shaft, the bearingless motor can be arranged at a position at which the radial load of the drive shaft is relatively large, and the magnetic bearing can be arranged at a position at which the radial load of the drive shaft is relatively small.

According to the fourteenth aspect, the bearingless motor configured as a consequent-pole bearingless motor or an IPM bearingless motor can generate a larger support force (a force for supporting the drive shaft in a contactless manner) than the bearingless motor configured as an SPM bearingless motor.

According to the fifteenth aspect, in the drive support unit that supports the drive shaft in a contactless manner, it is possible to reduce a displacement of the drive shaft in the tilt direction without increasing the size of the drive support unit.

According to the sixteenth aspect, it is possible to easily control two magnetic bearings.

According to the seventeenth aspect, it is possible to more reliably achieve the advantages described above.

According to the eighteenth aspect, with the use of controllers that provide optimum computational speeds and output capacities for translational-direction control and tilt-direction control, it is possible to reduce the cost of the controllers.

According to the nineteenth to twenty-second aspects, the magnetic bearings handle not only a force for reducing a tilt displacement angle but also a portion of a force for reducing a displacement in the translational direction. This can reduce the force for reducing the force to be output from the bearingless motor to reduce a displacement in the translational direction. It is possible to reduce the size of the bearingless motor.

According to the twenty-third to twenty-seventh aspects, the gas bearing supports at least a portion of the radial load of the drive shaft. This can reduce the radial load imposed on the bearingless motor. Thus, it is possible to increase the driving torque output of the bearingless motor.

According to the twenty-third to twenty-seventh aspects, the axial length of a rotating system including the bearingless motor, the gas bearing, and the drive shaft can be set to be small. Thus, it is possible to expand a region in which the turbo compressor can be operated safely.

According to the twenty-eighth, twenty-ninth, and thirty-second aspects, it is possible to adjust the armature voltage VA and the support current IS within the range of the power supply capacity of the power source (861, 862) in accordance with the operating status of the turbo compressor (812).

According to the thirtieth aspect, it is possible to increase a radial support force caused by the armature current IA, which is a current flowing through the armature winding (846*a* to 846*c*, 856*a* to 856*c*), while preventing the support current IS from exceeding the first upper limit.

According to the thirty-first aspect, if the radial support force caused by the armature current IA is reduced when control is performed so that the armature voltage VA does not exceed the second upper limit, the support current IS is increased, and a radial support force caused by the increased support current IS can compensate for the reduction in the radial support force.

According to the thirty-third aspect, for example, heat generated in the support winding (847*a* to 847*c*, 857*a* to 857*c*) can be utilized, as necessary.

According to the thirty-fourth aspect, for example, heat generated in the armature winding (846*a* to 846*c*, 856*a* to 856*c*) can be utilized, as necessary.

According to the thirty-fifth aspect, even if the support current IS is kept less than or equal to the first upper limit, the increase in the armature current IA can increase the radial support force of the bearingless motor (840, 850).

According to the thirty-sixth and thirty-seventh aspects, the refrigeration apparatus (900) can achieve the advantages described above.

BRIEF DESCRIPTION OF THE DRAWINGS

FIG. 2 is a cross-sectional view illustrating an example configuration of a first bearingless motor;

FIG. 15 is a cross-sectional view exemplarily illustrating the magnet magnetic flux, the driving magnetic flux, and the supporting magnetic flux that are generated in the bearingless motor;

FIG. 18 is a cross-sectional view exemplarily illustrating a magnet magnetic flux, a driving magnetic flux, and a supporting magnetic flux that are generated in the bearingless motor according to the modification;

FIG. 21 is a cross-sectional view exemplarily illustrating the configuration of a bearingless motor;

FIG. 26 is a cross-sectional view exemplarily illustrating a bearingless motor according to a first modification;

FIG. 29 is a cross-sectional view exemplarily illustrating a magnet magnetic flux, a driving magnetic flux, and a supporting magnetic flux that are generated in the bearingless motor according to the second modification;

FIG. 32 is a cross-sectional view of the bearingless motor, and illustrates a magnet magnetic flux and a driving magnetic flux;

FIG. 34 is a cross-sectional view of the bearingless motor, and illustrates the magnet magnetic flux, the driving magnetic flux, and the supporting magnetic flux;

DESCRIPTION OF THE PREFERRED EMBODIMENTS

Embodiments of the present invention will be described in detail with reference to the drawings. The following embodiments are essentially preferable examples which are not intended in any sense to limit the scope of the present invention, its application, or its use.

First Embodiment of Invention

Figure 1:
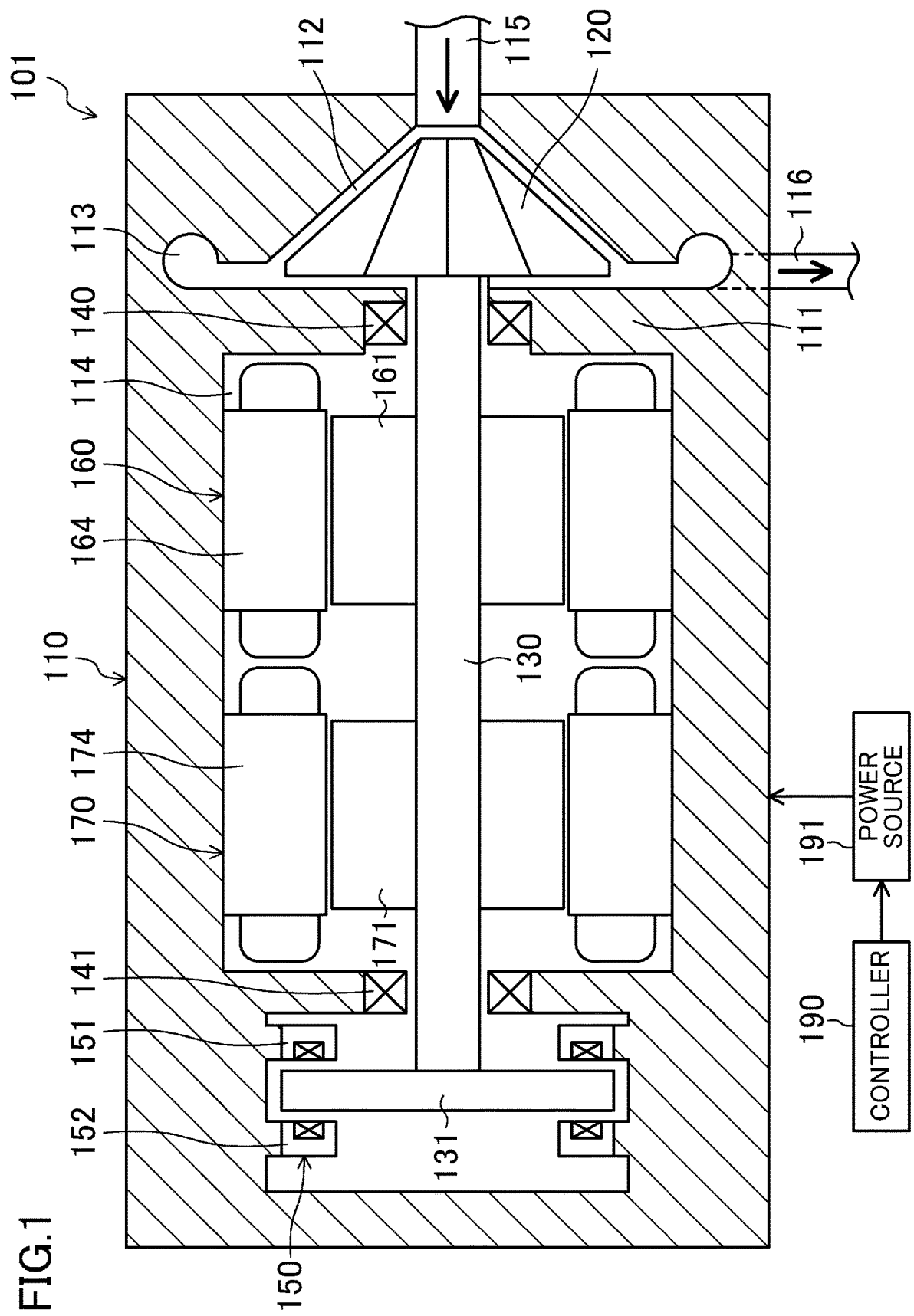
FIG. 1 is a front view illustrating an example configuration of a turbo compressor according to a first embodiment of the present invention.

A first embodiment of the present invention will be described. A turbo compressor (101) according to this embodiment is disposed in a refrigerant circuit (not illustrated) that performs a refrigeration cycle, and is configured to compress refrigerant. As illustrated in FIG. 1, the turbo compressor (101) includes a casing (110), an impeller (120), a drive shaft (130), touch-down bearings (140, 141), a thrust magnetic bearing (150), a controller (190), a power source (191), a first bearingless motor (160), and a second bearingless motor (170). The first bearingless motor (160) and the second bearingless motor (170) are arranged side-by-side in the axial direction of the drive shaft (130).

As used herein, the term "axial direction" refers to a direction of an axis of rotation, which is a direction of an axis of the drive shaft (130), and the term "radial direction" refers to a direction perpendicular to the axial direction of the drive shaft (130). The term "outer circumferential side" refers to a side farther from the axis of the drive shaft (130), and the term "inner circumferential side" refers to a side closer to the axis of the drive shaft (130).

Casing

The casing (110) is shaped into a cylinder having both ends closed and is arranged such that the axis line of the cylinder is directed horizontally. The inner space of the casing (110) is partitioned by a wall portion (111), with the space to the right of the wall portion (111) forming an impeller chamber (112) that accommodates the impeller (120) and the space to the left of the wall portion (111) forming an electric motor chamber (114) that accommodates the first and second bearingless motors (160, 170). The drive shaft (130) extending in the axial direction through the casing (110) couples the impeller (120) and the first and second bearingless motors (160, 170) to each other. The first and second bearingless motors (160, 170) constitute a drive support unit.

Impeller

The impeller (120) is formed with a plurality of blades so as to have a substantially conical outer shape. The impeller (120) is accommodated in the impeller chamber (112) in such a manner as to be fixed to one end of the drive shaft (130). A suction pipe (115) and a discharge pipe (116) are connected to the impeller chamber (112), and a compression space (113) is formed in an outer circumferential portion of the impeller chamber (112). The suction pipe (115) is provided to introduce refrigerant into the impeller chamber (112) from the outside, and the discharge pipe (116) is provided to return high-pressure refrigerant compressed in the impeller chamber (112) to the outside.

Touch-Down Bearings

The turbo compressor (101) is provided with the two touch-down bearings (140, 141). One touch-down bearing (140) is disposed near one end (the right-side end in FIG. 1) of the drive shaft (130), and the other touch-down bearing (141) is disposed near the other end of the drive shaft (130). The touch-down bearings (140, 141) are configured to support the drive shaft (130) when the first and second bearingless motors (160, 170) are not energized (that is, when the drive shaft (130) is not levitated).

Thrust Magnetic Bearing

As illustrated in FIG. 1, the thrust magnetic bearing (150) includes a first and second electromagnets (151, 152), and is configured to support a disk-shaped portion (hereinafter referred to as a disk portion (131)) disposed at the other end of the drive shaft (130) (that is, the end on the opposite side to the one end to which the impeller (120) is fixed) in a contactless manner by using an electromagnetic force. By controlling the current flowing through the first and second electromagnets (151, 152), the thrust magnetic bearing (150) can control the position of a supported portion (the disk portion (131)) of the drive shaft (130) in the direction in which the first and second electromagnets (151, 152) face each other (that is, in the axial direction, or the left-right direction in FIG. 1).

Controller

The controller (190) outputs a voltage command value (thrust voltage command value) for controlling a voltage to be supplied to the thrust magnetic bearing (150) and a voltage command value (motor voltage command value) for controlling a voltage to be supplied to the first and second bearingless motors (160, 170) in accordance with a detection value of a gap sensor (not illustrated) capable of detecting a gap between the disk portion (131) and the thrust magnetic bearing (150), a detection value of a gap sensor (not illustrated) capable of detecting a gap between stators (164, 174) and rotors (161, 171) of the first and second bearingless motors (160, 170), and information on target rotational speeds of the impeller (120) and the drive shaft (130) so as to position the drive shaft (130) at a desired position. For example, the controller (190) can be constituted by a microcomputer (not illustrated) and a program that allows the microcomputer to operate.

Power Source

The power source (191) supplies a voltage to the thrust magnetic bearing (150) and the first and second bearingless motors (160, 170) in accordance with the thrust voltage command value and the motor voltage command value from the controller (190). For example, the power source (191) can be constituted by a pulse width modulation (PWM) amplifier. The power source (191) constitutes an electric circuit.

First Bearingless Motor

The first bearingless motor (160) is arranged in a portion of the electric motor chamber (114) closer to the impeller (120). The first bearingless motor (160) is configured to rotationally drive the drive shaft (130) by using an electromagnetic force and to support the radial load of the drive shaft (130) in a contactless manner by using the electromagnetic force. The first bearingless motor (160) has a rotor-stator pair constituted by the rotor (161) and the stator (164). The rotor (161) is fixed to the drive shaft (130), and the stator (164) is fixed to an inner circumferential wall of the casing (110).

FIG. 2 is a cross-sectional view illustrating an example configuration of the first bearingless motor (160). As illustrated in FIG. 2, the first bearingless motor (160) is a consequent-pole bearingless motor. The stator (164) of the first bearingless motor (160) has a back yoke portion (165), a plurality of tooth portions (not illustrated), and drive coils (166a to 166c) and support coils (167a to 167c) that are wound around the tooth portions. The rotor (161) of the first bearingless motor (160) has a core portion (162) and a plurality of (in the illustrated example, four) permanent magnets (163) embedded in the core portion (162).

The stator (164) is formed of a magnetic material (for example, layered steel plates). The back yoke portion (165) of the stator (164) is formed into a cylindrical shape. The drive coils (166a to 166c) and the support coils (167a to 167c) are wound around the respective tooth portions by using a distributed winding method. The drive coils (166a to 166c) and the support coils (167a to 167c) may be wound around the respective tooth portions by using a concentrated winding method.

The drive coils (166a to 166c) are coils wound on the inner circumferential side of the tooth portions. The drive coils (166a to 166c) are constituted by U-phase drive coils (166a) in portions enclosed by the thick solid line in FIG. 2, V-phase drive coils (166b) in portions enclosed by the thick broken line, and W-phase drive coils (166c) in portions enclosed by the thin solid line.

The support coils (167a to 167c) are coils wound on the outer circumferential side of the tooth portions. The support coils (167a to 167c) are constituted by U-phase support coils (167a) in portions enclosed by the thick solid line in FIG. 2, V-phase support coils (167b) in portions enclosed by the thick broken line, and W-phase support coils (167c) in portions enclosed by the thin solid line.

The core portion (162) of the rotor (161) is formed into a cylindrical shape. The core portion (162) has a shaft hole (not illustrated) formed therein at a center portion thereof, through which the drive shaft (130) extends. The core portion (162) is formed of a magnetic material (for example, layered steel plates). Near an outer circumferential surface of the core portion (162), the four permanent magnets (163) having a shape along the outer circumferential surface are embedded in the circumferential direction of the rotor (161) at pitch angles (AP1) of 90°. The four permanent magnets (163) have the same shape. The side of each of the permanent magnets (163) nearer the outer circumferential surface is the N pole, and the S pole is formed in a pseudo manner on the outer circumferential surface of the core portion (162) between the permanent magnets (163). The side of each of the permanent magnets (163) nearer the outer circumferential surface may be the S pole.

Figure 3:
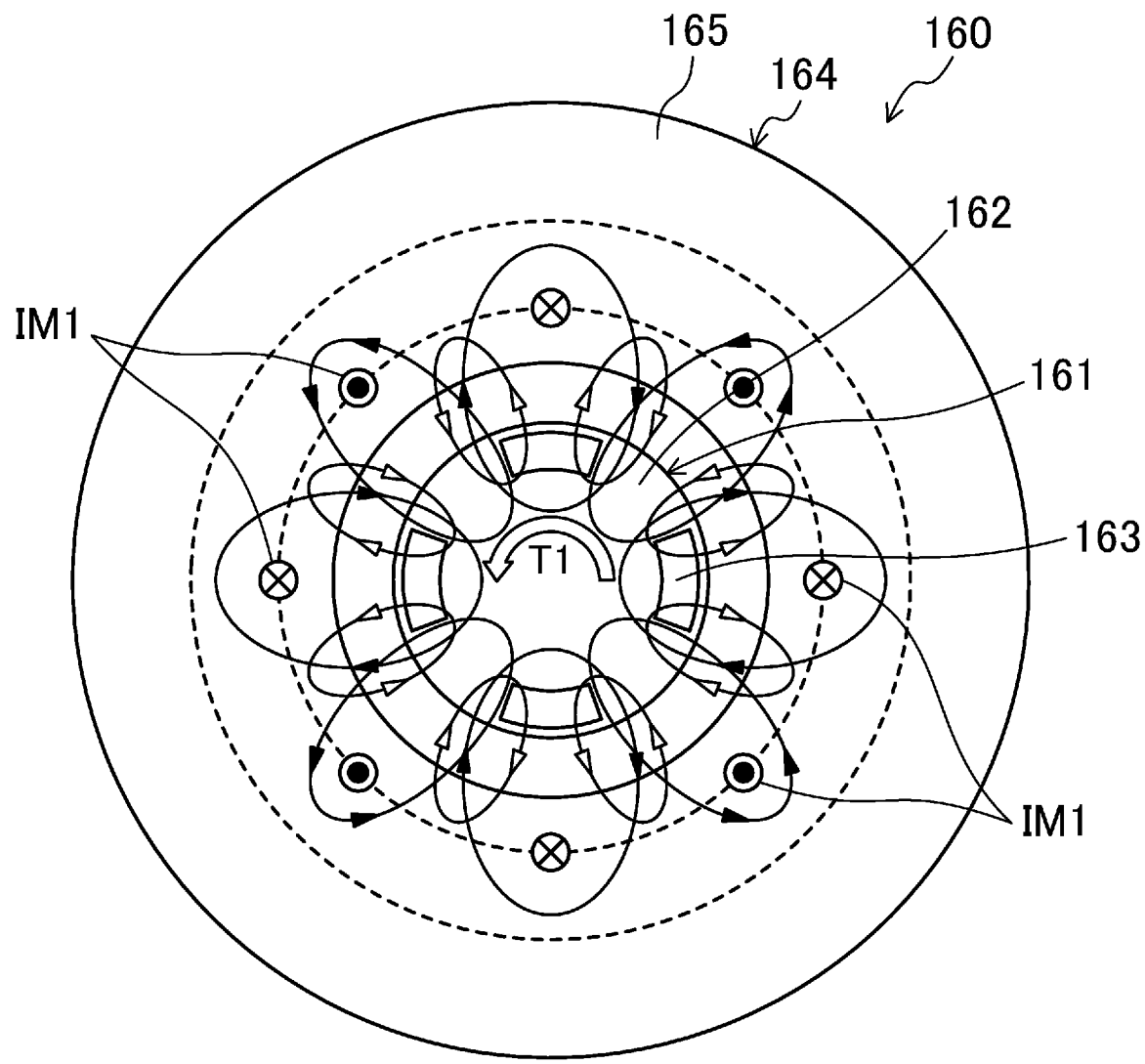
FIG. 3 is a cross-sectional view of the first bearingless motor, and illustrates a magnet magnetic flux and a driving magnetic flux.

FIG. 3 illustrates a magnet magnetic flux 41 generated by the permanent magnets (163) and a driving magnetic flux BM1 generated to rotationally drive the impeller (120) and the drive shaft (130) in the first bearingless motor (160). The first bearingless motor (160) is configured such that a driving torque T1 illustrated in FIG. 3 (that is, a torque that allows the drive shaft (130) to rotate in the counterclockwise direction in FIG. 3) is generated by interaction between the magnet magnetic flux $\phi 1$ and the driving magnetic flux BM1. In FIG. 3, current IM1 equivalent to the current flowing through the drive coils (166a to 166c) is illustrated.

Figure 4:
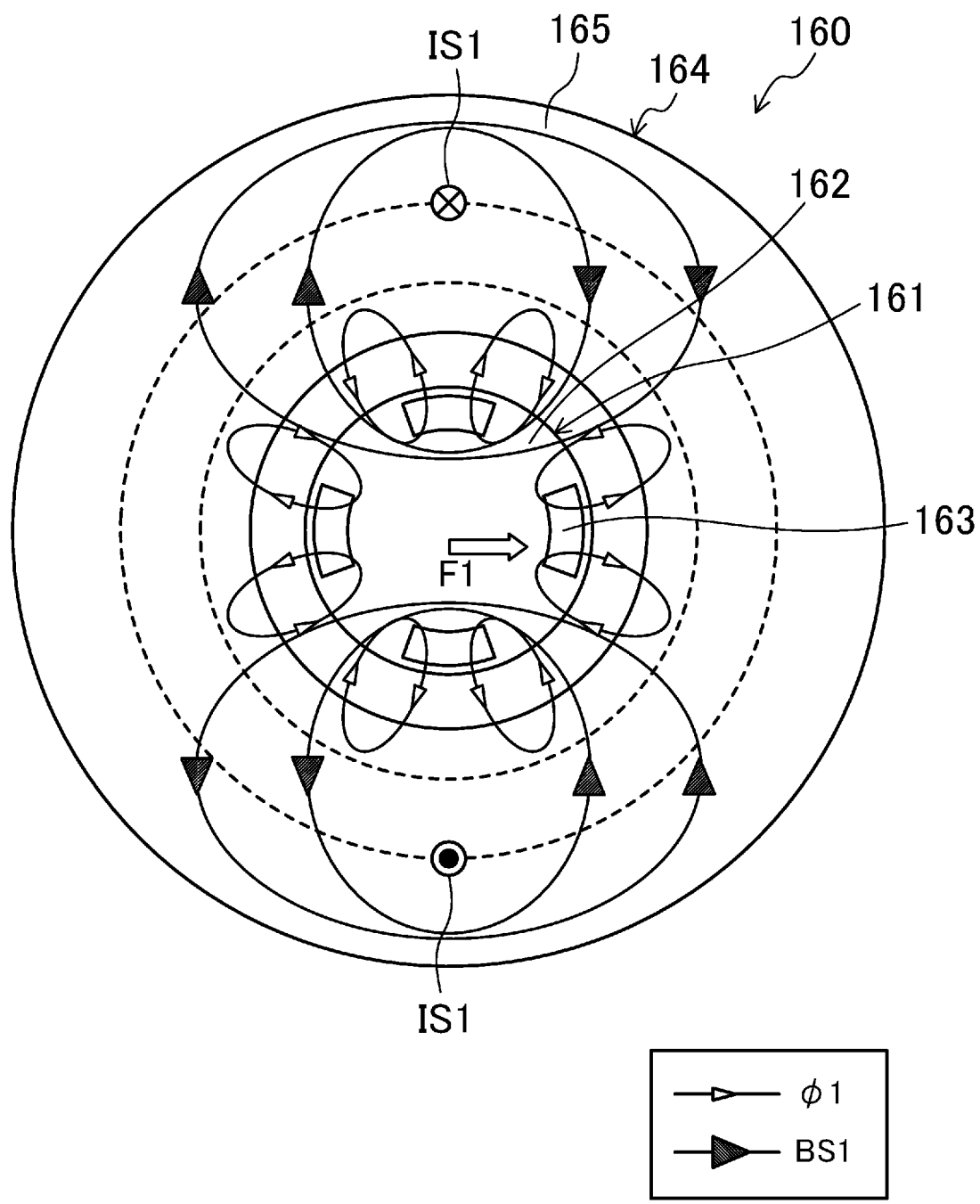
FIG. 4 is a cross-sectional view of the first bearingless motor, and illustrates the magnet magnetic flux and a supporting magnetic flux.

FIG. 4 illustrates the magnet magnetic flux φ1 generated by the permanent magnets (163) and a supporting magnetic flux BS1 generated to support the radial load of the drive shaft (130) in a contactless manner in the first bearingless motor (160). The first bearingless motor (160) is configured such that a support force F1 illustrated in FIG. 4 (that is, a force for pressing the drive shaft (130) to the right in FIG. 4) is generated by interaction between the magnet magnetic flux φ1 and the supporting magnetic flux BS1. In FIG. 4, current IS1 equivalent to the current flowing through the support coils (167a to 167c) is illustrated.

As can be seen from FIG. 4, the magnetic path of the supporting magnetic flux BS1 is a path that passes through the back yoke portion (165) and the tooth portions of the stator (164), air gaps, and the core portion (162) of the rotor (161). The magnetic resistances of the back yoke portion (165), the tooth portions, and the core portion (162) are smaller than the magnetic resistances of the permanent magnets (163). Thus, the first bearingless motor (160) has a smaller magnetic resistance for a magnetic path for generating a magnetic force to support the radial load of the drive shaft (130) than the second bearingless motor (170) in which, as described below, permanent magnets (173) are arranged over substantially an entire area of the outer circumferential surface of the rotor (171) (that is, the second bearingless motor (170) in which the permanent magnets (173) are included in a magnetic path for generating a magnetic force to support the radial load of the drive shaft (130)). Accordingly, the first bearingless motor (160) is capable of generating a larger support force for supporting the radial load of the drive shaft (130) than the second bearingless motor (170).

Figure 5:
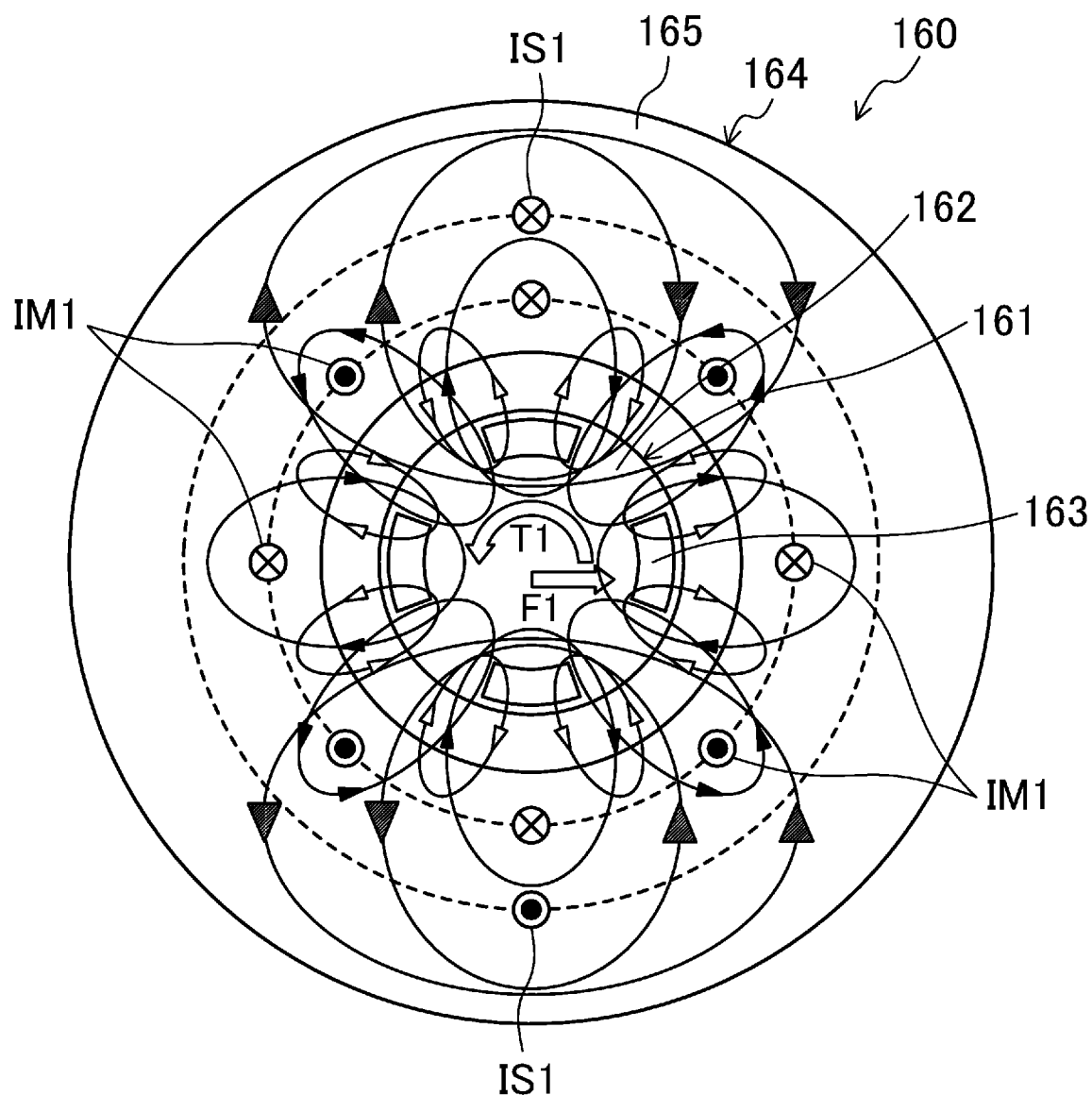
FIG. 5 is a cross-sectional view of the first bearingless motor, and illustrates the magnet magnetic flux, the driving magnetic flux, and the supporting magnetic flux.

FIG. 5 illustrates the magnet magnetic flux φ1 generated by the permanent magnets (163), the driving magnetic flux BM1 generated to rotationally drive the impeller (120) and the drive shaft (130), and the supporting magnetic flux BS1 generated to support the radial load of the drive shaft (130) in a contactless manner in the first bearingless motor (160). The first bearingless motor (160) is configured such that the driving torque T1 and the support force F1 illustrated in FIG. 5 are simultaneously generated by interaction among the magnet magnetic flux φ1, the driving magnetic flux BM1, and the supporting magnetic flux BS1. In FIG. 5, the currents IM1 and IS1 equivalent to the currents flowing through the drive coils (166a to 166c) and the support coils (167a to 167c) are illustrated.

Second Bearingless Motor

The second bearingless motor (170) is arranged in a portion of the electric motor chamber (114) farther from the impeller (120). The second bearingless motor (170) is configured to rotationally drive the drive shaft (130) by using an electromagnetic force and to support the radial load of the drive shaft (130) in a contactless manner by using the electromagnetic force. The second bearingless motor (170) has a rotor-stator pair constituted by the rotor (171) and the stator (174). The rotor (171) is fixed to the drive shaft (130), and the stator (174) is fixed to the casing (110).

Figure 6:
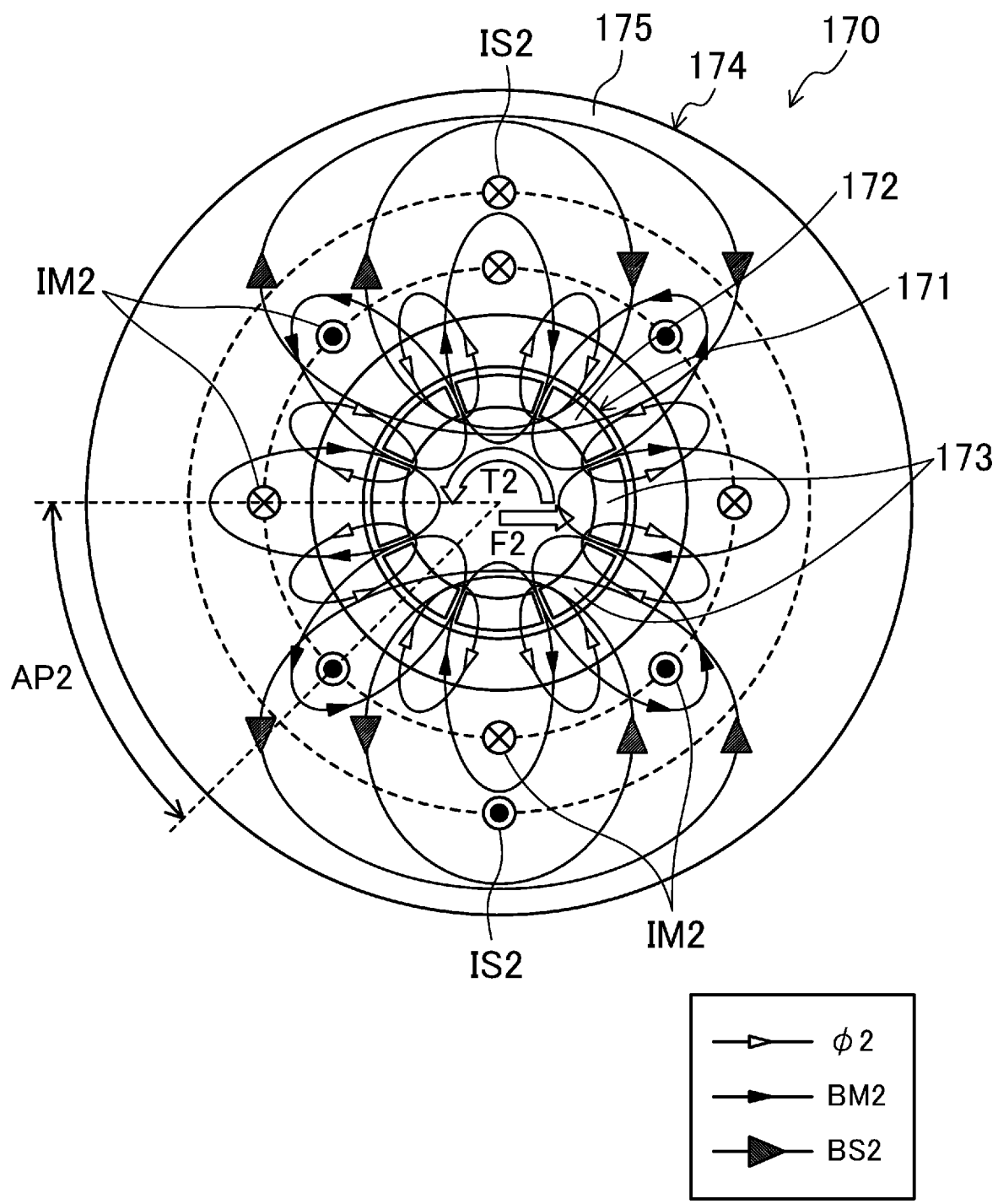
FIG. 6 is a cross-sectional view illustrating an example configuration of a second bearingless motor, and illustrates a magnet magnetic flux, a driving magnetic flux, and a supporting magnetic flux.

FIG. 6 is a cross-sectional view illustrating an example configuration of the second bearingless motor (170). As illustrated in FIG. 6, the second bearingless motor (170) is an IPM bearingless motor exhibiting a behavior substantially similar to that of an SPM bearingless motor. The stator (174) of the second bearingless motor (170) has the same configuration as the stator (164) of the first bearingless motor (160). The rotor (171) of the second bearingless motor (170) has a core portion (172) and a plurality of (in the illustrated example, eight) permanent magnets (173) embedded in the core portion (172).

The core portion (172) of the rotor (171) is formed into a cylindrical shape. The core portion (172) has a shaft hole (not illustrated) formed therein at a center portion thereof, through which the drive shaft (130) extends. The core portion (172) is formed of a magnetic material (for example, layered steel plates). Near an outer circumferential surface of the core portion (172), the eight permanent magnets (173) having a shape along the outer circumferential surface are embedded in the circumferential direction of the rotor (171) at pitch angles (AP2) of 45° (that is, one half of the pitch angles (AP1) of 90° in the first bearingless motor (160)). The eight permanent magnets (173) have the same shape, and also have the same shape as the four permanent magnets (163) of the first bearingless motor (160). On the sides of the permanent magnets (173) nearer the outer circumferential surface, the N poles and the S poles alternately appear in the circumferential direction of the rotor (171).

FIG. 6 illustrates a magnet magnetic flux φ2 generated by the permanent magnets (173), a driving magnetic flux BM2 generated to rotationally drive the impeller (120) and the drive shaft (130), and a supporting magnetic flux BS2 generated to support the radial load of the drive shaft (130) in a contactless manner in the second bearingless motor (170). The second bearingless motor (170) is configured such that a driving torque T2 (that is, a torque that allows the drive shaft (130) to rotate in the counterclockwise direction in FIG. 6) and a support force F2 (that is, a force for pressing the drive shaft (130) to the right in FIG. 6) illustrated in FIG. 6 are simultaneously generated by interaction among the magnet magnetic flux φ2, the driving magnetic flux BM2, and the supporting magnetic flux BS2.

As can be seen from FIG. 6, the magnetic path of the supporting magnetic flux BS2 is a path that passes through a back yoke portion (175) and tooth portions of the stator (174), air gaps, and the permanent magnets (173) and the core portion (172) of the rotor (171).

The number of permanent magnets (173) in the second bearingless motor (170) is larger than the number of permanent magnets (163) in the first bearingless motor (160). Thus, the second bearingless motor (170) has a higher magnetic flux density of magnetic fluxes generated by the permanent magnets (173) than the first bearingless motor (160) (see FIG. 3). Accordingly, the second bearingless motor (170) can generate the larger driving torque T2 than the driving torque T1 generated by the first bearingless motor (160) to rotationally drive the impeller (120) and the drive shaft (130).

Operating Region of Turbo Compressor

Figure 7:
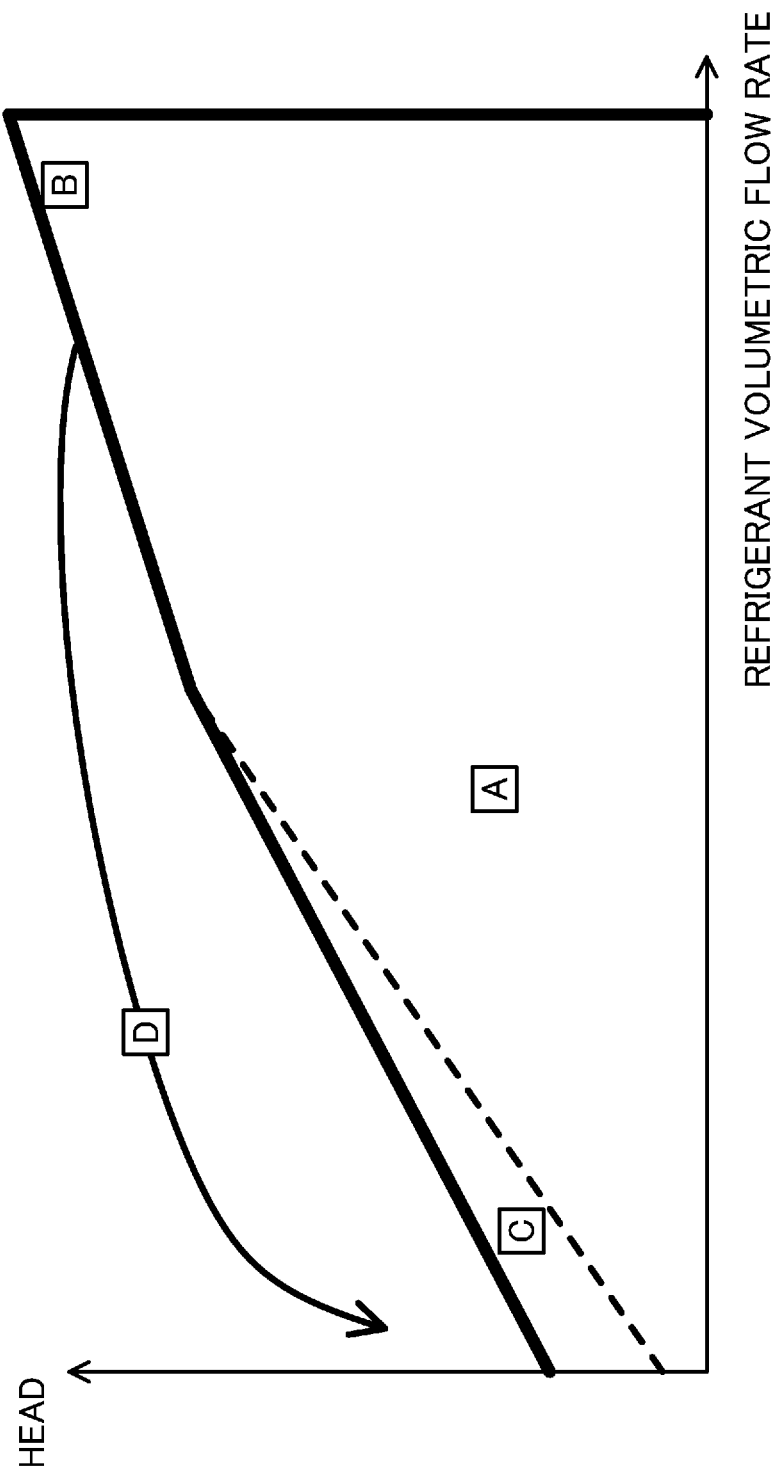
FIG. 7 is a diagram describing an operating region of the turbo compressor.

FIG. 7 is a diagram describing an operating region of the turbo compressor (101). In FIG. 7, the horizontal axis represents refrigerant volumetric flow rate, and the vertical axis represents head. The power source (191) causes a current in a predetermined current range to flow through the drive support unit (in this embodiment, the first and second bearingless motors (160, 170)), thereby allowing the turbo compressor (101) to operate in a predetermined operating region.

The predetermined operating region mainly includes regions located inside a surge line indicated by a bold line in FIG. 7, which include a steady operating region (A), a high-load torque region (B), and a turbulence region (C), and a surging region (D) located outside the surge line. As used herein, the time period during which the turbo compressor (101) operates in the steady operating region (A) and the high-load torque region (B) is referred to also as "during normal operation". The turbulence region (C) is also referred to as a "rotating-stall generation region".

The steady operating region (A) is a region indicated by symbol A in FIG. 7. In the steady operating region (A), the load torque of the impeller (120) and the drive shaft (130) (that is, the driving torques T1 and T2 for rotationally driving the impeller (120) and the drive shaft (130)) is relatively small, and the radial load of the drive shaft (130) is also relatively small.

The high-load torque region (B) is a region indicated by symbol B in FIG. 7. In the high-load torque region (B), the load torque of the impeller (120) and the drive shaft (130) is relatively large, and the radial load of the drive shaft (130) is also relatively large.

The load torque of the impeller (120) and the drive shaft (130) in the turbo compressor (101) is maximum at the uppermost-rightmost point of the high-load torque region (B) in FIG. 7. When the turbo compressor (101) operates at the point at which the load torque is maximum, the value of a driving magnetic flux BM (that is, the sum of the driving magnetic flux BM1 of the first bearingless motor (160) and the driving magnetic flux BM2 of the second bearingless motor (170)) is a maximum value BMmax. The maximum value BMmax indicates a magnetic flux generated in the drive support unit to generate a driving torque corresponding to the maximum torque load in the predetermined operating region. When the value of the driving magnetic flux BM is the maximum value BMmax, a total of maximum torque current IBMmax flows through the drive coils (166a to 166c, 176a to 176c) of the first and second bearingless motors (160, 170).

The load torque of the impeller (120) and the drive shaft (130) and the radial load of the drive shaft (130) in the turbo compressor (101) are large (in particular, the load torque is maximum) at the uppermost-rightmost point of the high-load torque region (B) in FIG. 7. When the turbo compressor (101) operates at the uppermost-rightmost point of the high-load torque region (B) in FIG. 7, the sum of the driving magnetic flux BM and a supporting magnetic flux BS (that is, the sum of the supporting magnetic flux BS1 of the first bearingless motor (160) and the supporting magnetic flux BS2 of the second bearingless motor (170)) is a maximum value (BM+BS)max.

The turbulence region (C) is a region indicated by symbol C in FIG. 7. In the turbulence region (C), the load torque of the impeller (120) and the drive shaft (130) is relatively small, whereas the radial load of the drive shaft (130) is relatively large. In the turbulence region (C), rotating stall can occur, as described above. Rotating stall is a phenomenon that occurs when, for example, the turbo compressor (101) operates with low refrigeration load at a relatively high condensation temperature (that is, outside air temperature). This operation is typically performed when only some rooms in a construction with multiple rooms, such as a building, are requested to be air-conditioned. If rotating stall occurs, a pressure imbalance occurs among the plurality of blades of the impeller (120), causing the drive shaft (130) to vibrate. The vibration results in a relative increase in the radial load of the drive shaft (130) within the turbulence region (C).

The surging region (D) is a region indicated by symbol D in FIG. 7. In cases of emergency such as a blackout, the turbo compressor (101) may sometimes temporarily operate in the surging region (D). The surging region (D) is a region in which the load torque of the impeller (120) and the drive shaft (130) is relatively small whereas the radial load of the drive shaft (130) is relatively large. The radial load of the drive shaft (130) in the turbo compressor (101) is maximum at a predetermined point in the surging region (D). When the turbo compressor (101) operates at the point at which the radial load is maximum, the value of the supporting magnetic flux BS is a maximum value BSmax. The maximum value BSmax indicates a magnetic flux generated in the drive support unit to support the maximum radial load of the drive shaft (130) in the predetermined operating region in a contactless manner. When the value of the supporting magnetic flux BS is the maximum value BSmax, a total of maximum support force current IBSmax flows through the support coils (167a to 167c, 177a to 177c) of the first and second bearingless motors (160, 170).

In a general concept that makes it possible to simultaneously generate both the maximum load torque and the maximum radial load support force in the first and second bearingless motors (160, 170), the first and second bearingless motors (160, 170) are configured such that the magnetic flux Bmax generated in the first and second bearingless motors (160, 170) by causing a current corresponding to the upper limit of the predetermined current range to flow through the first and second bearingless motors (160, 170) becomes equal to BMmax+BSmax (Bmax=BMmax+BSmax).

In this embodiment, in contrast, the first and second bearingless motors (160, 170) are configured such that the magnetic flux Bmax generated in the first and second bearingless motors (160, 170) by causing a total of current corresponding to the upper limit of the predetermined current range to flow through the first and second bearingless motors (160, 170) becomes greater than or equal to (BM+BS)max and less than BMmax+BSmax((BM+BS)max≤Bmax<BMmax+BSmax).

Specifically, the first and second bearingless motors (160, 170) are configured such that the outer diameter of the stators (164, 174), the circumferential width of the tooth portions, the outer diameter of the rotors (161, 171), the axial length of the stators (164, 174) and the rotors (161, 171), and so on are smaller than those in a configuration based on the general concept. That is, with the configuration according to this embodiment, it is possible to reduce the size of the stators (164, 174) and the rotors (161, 171), which are components forming the magnetic paths in the first and second bearingless motors (160, 170), compared to the configuration based on the general concept.

This is based on a fact discovered by the inventors of the present invention that in the turbo compressor (101) for use in a refrigeration apparatus, an operating region in which a maximum driving torque is required (that is, the high-load torque region (B)) and an operating region in which a maximum radial load support force is required (that is, the surging region (D)) are different. That is, since there is no need to simultaneously generate the maximum driving torque and the maximum radial load support force in the first and second bearingless motors (160, 170), according to this embodiment, the first and second bearingless motors (160, 170) are configured such that a relationship given by (BM+BS)max≤Bmax<BMmax+BSmax is satisfied. With this configuration, it is possible to reduce the size or the first and second bearingless motors (160, 170) without impairing the functionality and reliability of the turbo compressor (101).

Operation of Controller and Power Source in Surging Region and the Like

When the turbo compressor (101) operates in the surging region (D), the controller (190) transmits a motor command value to the power source (191) so as to increase the ratio of the current IS for generating the supporting magnetic flux BS (that is, the total current IS1+IS2 flowing through the support coils (167a to 167c, 177a to 177c) of the first and second bearingless motors (160, 170)) to the current IM for generating the driving magnetic flux BM (that is, the sum of the driving magnetic fluxes (BM1+BM2) generated in the first and second bearingless motors (160, 170)) (that is, the total current IM1+IM2 flowing through the drive coils (166a to 166c, 176a to 176c) of the first and second bearingless motors (160, 170)), compared to during normal operation, when compared at the same rotational speed.

In accordance with the motor command value transmitted from the controller (190), the power source (191) supplies a voltage to the first and second bearingless motors (160, 170) so as to increase the ratio of the current IS flowing through the support coils (167a to 167c, 177a to 177c) to the current IM flowing through the drive coils (166a to 166c. 176a to 176c) in the first and second bearingless motors (160, 170).

When the turbo compressor (101) operates in the rotating-stall generation region (that is, the turbulence region (C)) and the surging region (D), the controller (190) transmits a motor command value to the power source (191) so as to increase the ratio of the current IS for generating the supporting magnetic flux BS to the current IM for generating the driving magnetic flux BM (that is, the sum of the driving magnetic fluxes (BM1+BM2) generated in the first and second bearingless motors (160, 170)) as the refrigerant volumetric flow rate decreases, when compared at a same rotational speed during normal operation.

In accordance with the motor command value transmitted from the controller (190), the power source (191) supplies a voltage to the first and second bearingless motors (160, 170) so as to increase the ratio of the current IS flowing through the support coils (167a to 167c, 177a to 177c) to the current IM flowing through the drive coils (166a to 166c, 176a to 176c) in the first and second bearingless motors (160, 170).

When the turbo compressor (101) operates in the surging region (D) or when the rotation of the drive shaft (130) is stopped under normal operation, the controller (190) transmits a motor command value to the power source (191) so as to cause the current IS to flow through the support coils (167a to 167c, 177a to 177c) of the first and second bearingless motors (160, 170), but so as not to cause the current IM to flow through the drive coils (166a to 166c, 176a to 176c) of the first and second bearingless motors (160, 170).

In accordance with the motor command value transmitted from the controller (190), the power source (191) supplies a voltage to the first and second bearingless motors (160, 170) so that the current IS flows through the support coils (167a to 167c, 177a to 177c) of the first and second bearingless motors (160, 170).

Advantages of First Embodiment

In this embodiment, it is possible to reduce the size of the first and second bearingless motors (160, 170), compared to a case where the first and second bearingless motors (160, 170) are configured on the basis of the general concept when the first and second bearingless motors (160, 170) are applied to the turbo compressor (101). Accordingly, it is possible to reduce the entire size of the turbo compressor (101), the cost of the turbo compressor (101), and so on.

In this embodiment, furthermore, only the first and second bearingless motors (160, 170) support the radial load of the drive shaft (130). This eliminates the use of two radial magnetic bearings in an existing turbo compressor (see, for example, Japanese Unexamined Patent Application Publication No. 2016-114114), resulting in a reduction in the size of a rotating system including the impeller (120) and the drive shaft (130). Thus, the rotating system has a higher resonant frequency than in the existing configuration, and the operating region in which the turbo compressor (101) can be operated safely can be expanded accordingly.

Furthermore, when the turbo compressor (101) operates in the surging region (D), the radial load of the drive shaft (130) is increased, compared to during normal operation. To address this, in this embodiment, the ratio of the current IS for generating the supporting magnetic flux BS to the current IM for generating the driving magnetic flux BM is increased, compared to during normal operation. This enables the turbo compressor (101) to operate without failure even in the surging region (D).

Furthermore, when the turbo compressor (101) operates in the turbulence region (C) and the surging region (D), the radial load of the drive shaft (130) increases as the refrigerant volumetric flow rate decreases, when compared at the same rotational speed. To address this, in this embodiment, the ratio of the current IS for generating the supporting magnetic flux BS to the current IM for generating the driving magnetic flux BM is increased as the refrigerant volumetric flow rate decreases. This enables the turbo compressor (101) to operate without failure even in the turbulence region (C) and the surging region (D).

Modification of First Embodiment

A modification of the first embodiment will be described. This modification is different from the first embodiment in a current corresponding to an upper limit of a predetermined current range.

In this modification, a current corresponding to an upper limit of a predetermined current range is a current obtained by adding together the maximum torque current IBMmax and the maximum support force current IBSmax. In this modification, the first and second bearingless motors (160, 170) are configured such that a magnetic flux BMSmax generated in the first and second bearingless motors (160, 170) by causing a total of current obtained by adding together the maximum torque current IBMmax and the maximum support force current IBSmax to flow through the coils (166a to 166c, 167a to 167c, 176a to 176c, 177a to 177c) of the first and second bearingless motors (160, 170) becomes less than BMmax+BSmax (BMSmax<BMmax+BSmax). When the magnetic flux BMSmax is generated in the first and second bearingless motors (160, 170), a magnetic saturation is considered to occur in main magnetic paths of the driving magnetic flux BM and the supporting magnetic flux BS.

Specifically, as in the first embodiment, the first and second bearingless motors (160, 170) are configured such that the outer diameter of the stators (164, 174), the circumferential width of the tooth portions, the outer diameter of the rotors (161, 171), the axial length of the stators (164, 174) and the rotors (161, 171), and so on are smaller than those in a configuration based on the general concept. That is, with the configuration according to this modification, it is also possible to reduce the size of the stators (164, 174) and the rotors (161, 171), which are components forming the magnetic paths in the first and second bearingless motors (160, 170), compared to the configuration based on the general concept.

Second Embodiment of Invention

A second embodiment of the present invention will be described. In a turbo compressor (101) according to this embodiment, the drive support unit has a different configuration from that in the first embodiment. The following description mainly focuses on differences from the first embodiment.

Figure 8:
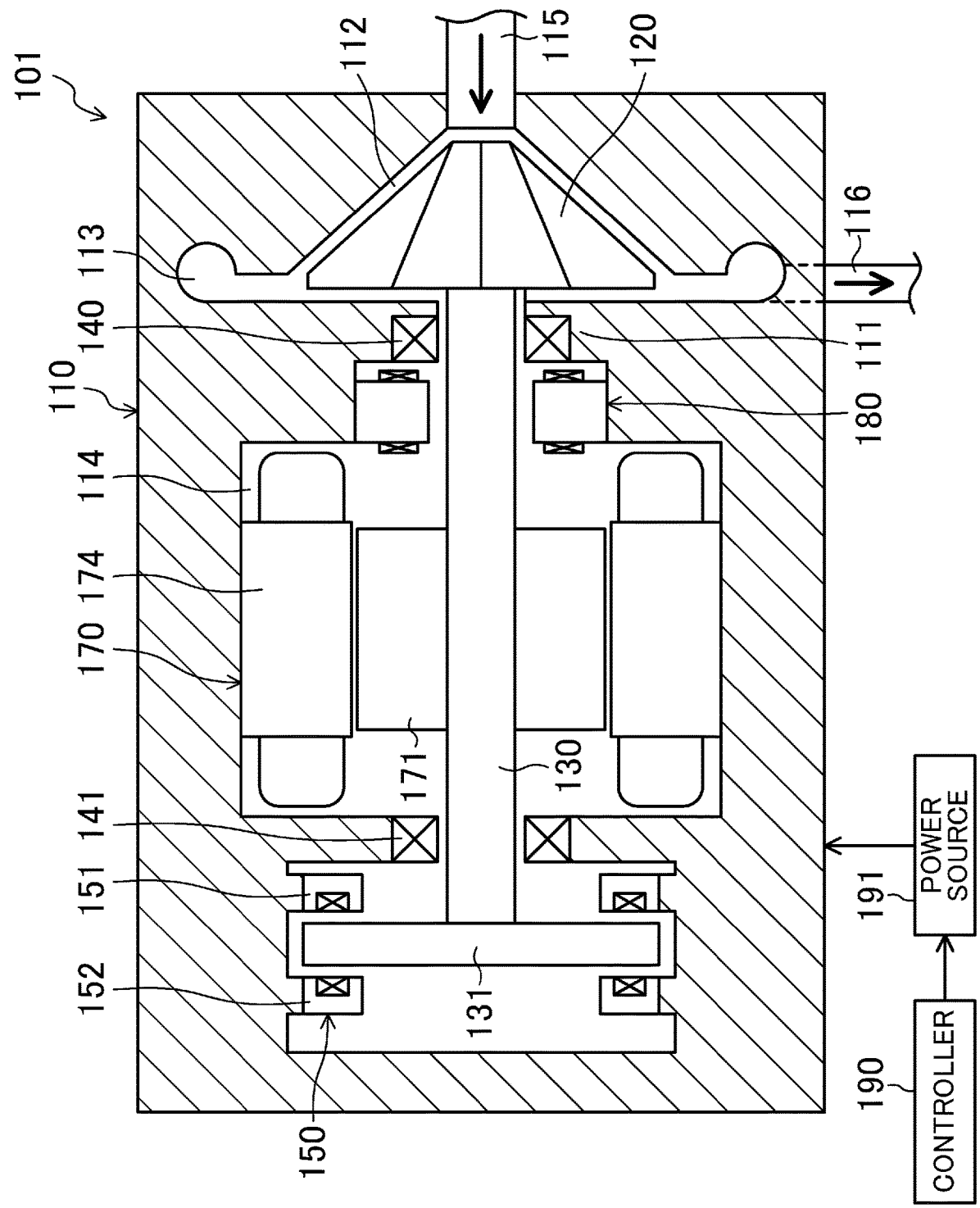
FIG. 8 is a front view illustrating an example configuration of a turbo compressor according to a second embodiment of the present invention.

As illustrated in FIG. 8, the turbo compressor (101) according to this embodiment includes one radial magnetic bearing (180) and one bearingless motor (170), in place of the first and second bearingless motors (160, 170). The radial magnetic bearing (180) and the bearingless motor (170) constitute a drive support unit.

The radial magnetic bearing (180) is arranged in a portion of the electric motor chamber (114) closer to the impeller (120), and the bearingless motor (170) is arranged in a portion of the electric motor chamber (114) farther from the impeller (120). The configuration of the bearingless motor (170) is similar to the configuration of the second bearingless motor (170) according to the first embodiment, for example. The radial magnetic bearing (180) may be arranged in a portion of the electric motor chamber (114) farther from the impeller (120), and the bearingless motor (170) may be arranged in a portion of the electric motor chamber (114) closer to the impeller (120).

Figure 9:
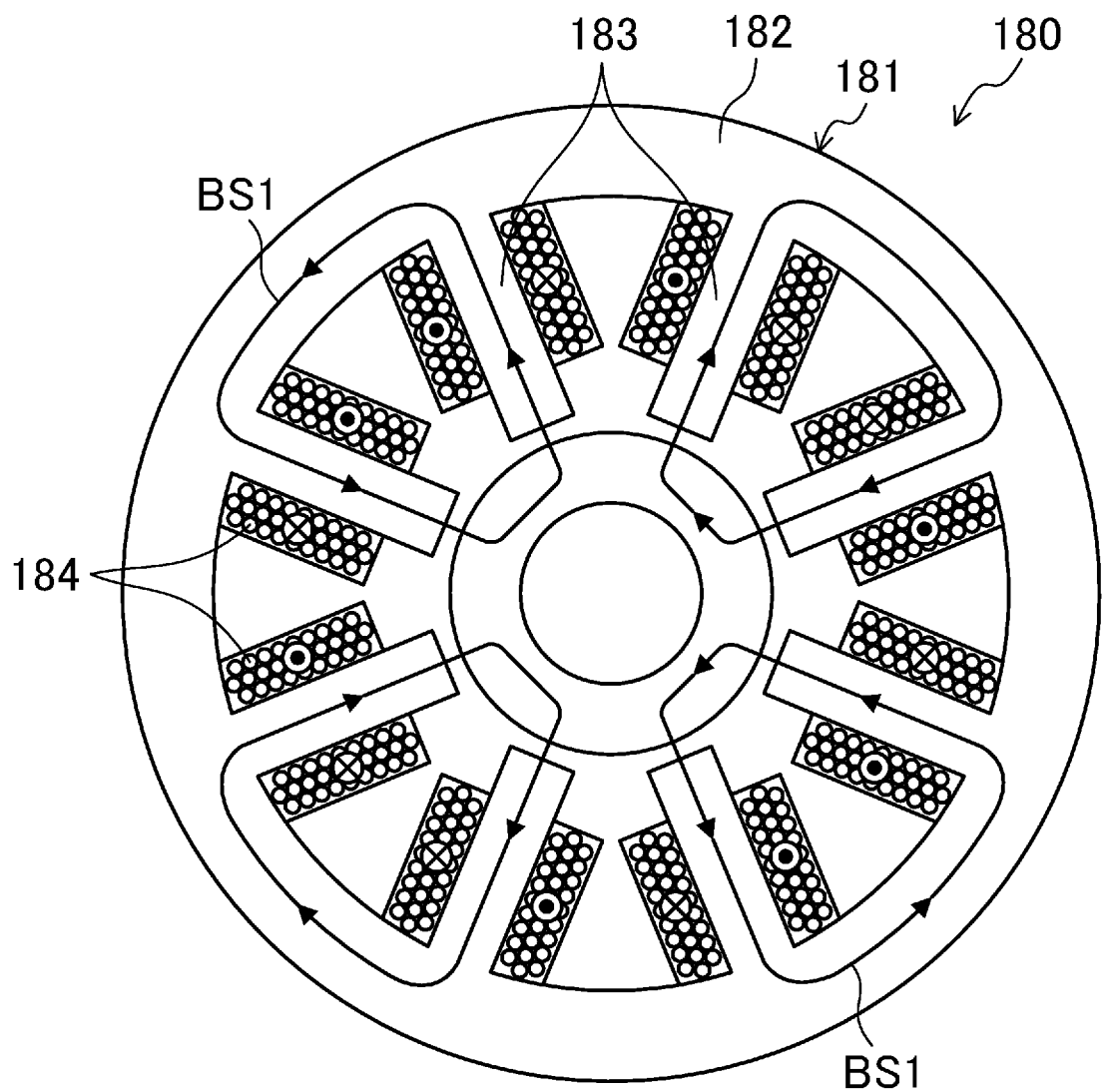
FIG. 9 is a cross-sectional view illustrating an example configuration of a radial magnetic bearing.

FIG. 9 is a cross-sectional view illustrating an example configuration of the radial magnetic bearing (180). As illustrated in FIG. 9, the radial magnetic bearing (180) constitutes a heteropolar radial magnetic bearing. The radial magnetic bearing (180) includes a stator (181) having a hack yoke portion (182) and a plurality of tooth portions (183), and a plurality of coil (184), each of which is wound around one of the tooth portions (183). The radial magnetic bearing (180) is configured to support the radial load of the drive shaft (130) in a contactless manner by using an electromagnetic force generated by the flow of current through each of the coils (184) using the power source (191). The direction of current flowing through each of the coils (184) is set such that supporting magnetic fluxes BS1 are generated in directions illustrated in FIG. 9. The radial magnetic bearing (180) is fixed to the inner circumferential wall of the casing (110).

In the second embodiment, the driving magnetic flux BM, which is a magnetic flux generated in the bearingless motor (170) and the radial magnetic bearing (180) to rotationally drive the impeller (120) and the drive shaft (130), is the driving magnetic flux BM2 of the bearingless motor (170). The supporting magnetic flux BS, which is a magnetic flux generated in the bearingless motor (170) and the radial magnetic bearing (180) to support the radial load of the drive shaft (130), is the sum of the supporting magnetic flux BS1 (see FIG. 9) of the radial magnetic bearing (180) and the supporting magnetic flux BS2 of the bearingless motor (170).

This embodiment can also achieve advantages similar to those of the first embodiment.

Third Embodiment of Invention

A third embodiment of the present invention will be described.

Air Conditioner

Figure 10:
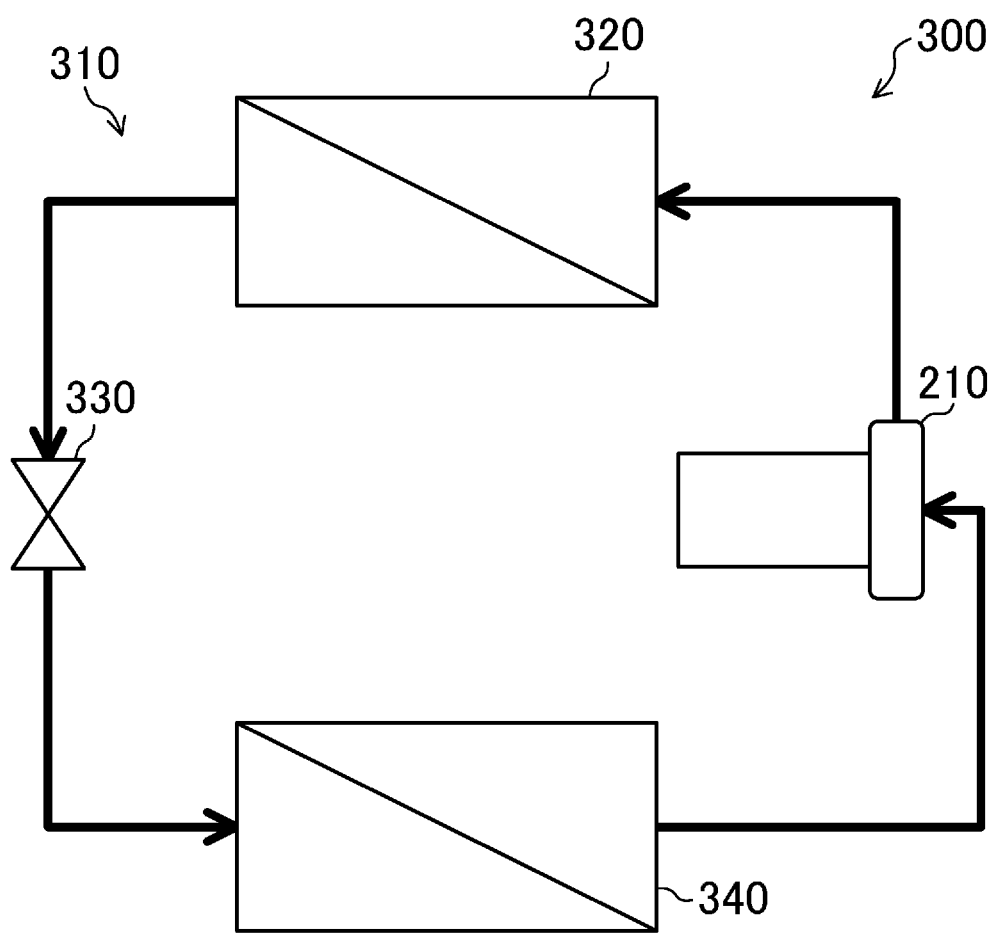
FIG. 10 is a schematic diagram exemplarily illustrating the configuration of an air conditioner according to a third embodiment of the present invention.

FIG. 10 exemplarily illustrates the configuration of an air conditioner (300) according to an embodiment. The air conditioner (300) includes a refrigerant circuit (310). The refrigerant circuit (310) has a turbo compressor (210), a condenser (320), an expansion valve (330), and an evaporator (340), and is configured to perform a refrigeration cycle by circulating refrigerant therethrough. For example, the condenser (320) and the evaporator (340) are each configured as a cross-fin heat exchanger, and the expansion valve (330) is configured as an electrically powered valve.

Turbo Compressor

Figure 11:
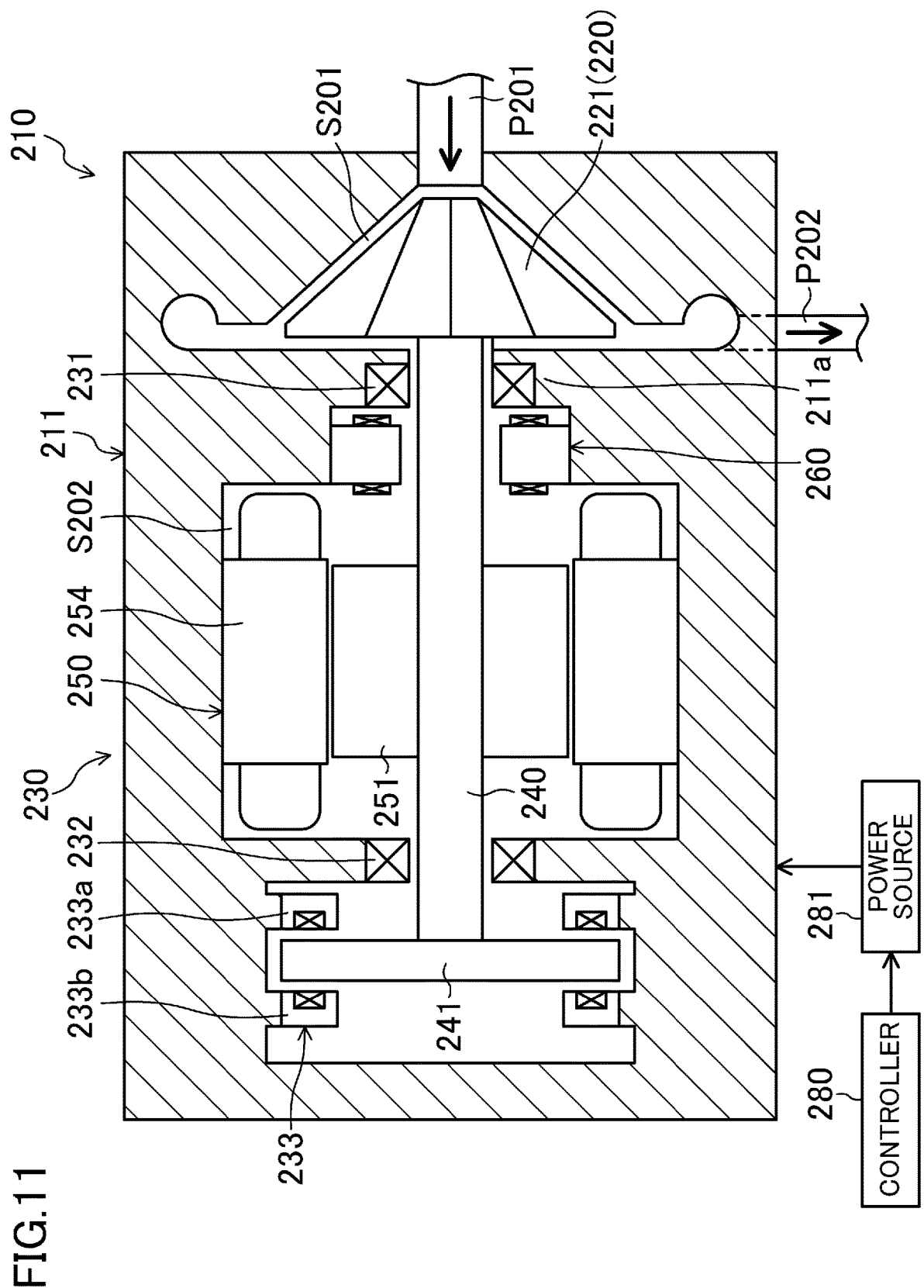
FIG. 11 is a longitudinal sectional view exemplarily illustrating the configuration of the turbo compressor.

FIG. 11 exemplarily illustrates the configuration of the turbo compressor (210) illustrated in FIG. 10. The turbo compressor (210) is disposed in the refrigerant circuit (310) and is configured to compress refrigerant. In the illustrated example, the turbo compressor (210) includes a casing (211), an impeller (221), and an electric motor system (230). The electric motor system (230) has a drive shaft (240), a bearingless motor (250), a radial magnetic bearing (260), a controller (280), and a power source (281). In the illustrated example, the electric motor system (230) further has a first touch-down bearing (231), a second touch-down bearing (232), and a thrust magnetic bearing (233).

In the following description, the term "axial direction" refers to a direction of an axis of rotation, which is a direction of an axis of the drive shaft (240), and the term "radial direction" refers to a direction perpendicular to the axial direction of the drive shaft (240). The term "outer circumferential side" refers to a side farther from the axis of the drive shaft (240), and the term "inner circumferential side" refers to a side closer to the axis of the drive shaft (240).

Casing

The casing (211) is shaped into a cylinder having both ends closed and is arranged such that the axis line of the cylinder is directed horizontally. The inner space of the casing (211) is partitioned by a wall portion (211a), with the space to the right of the wall portion (211a) forming an impeller chamber (S201) that accommodates the impeller (221) and the space to the left of the wall portion (211a) forming an electric motor chamber (S202) that accommodates the bearingless motor (250). The electric motor chamber (S202) further accommodates the bearingless motor (250), the radial magnetic bearing (260), the first touch-down bearing (231), the second touch-down bearing (232), and the thrust magnetic bearing (233). The bearingless motor (250), the radial magnetic bearing (260), the first touch-down bearing (231), the second touch-down bearing (232), and the thrust magnetic bearing (233) are fixed to an inner circumferential wall of the electric motor chamber (S202).

Drive Shaft

The drive shaft (240) is provided to rotationally drive a load (220) (in the illustrated example, the impeller (221)). In the illustrated example, the drive shaft (240) extends in the axial direction through the casing (211) and couples the impeller (221) and the bearingless motor (250) to each other. Specifically, the impeller (221) is fixed to one end of the drive shaft (240), and the bearingless motor (250) is disposed in a middle portion of the drive shaft (240). A disk-shaped portion (hereinafter referred to as a "disk portion (241)") is disposed at the other end of the drive shaft (240) (that is, the end on the opposite side to the one end to which the impeller (221) is fixed). The disk portion (241) is formed of a magnetic material (for example, iron).

Impeller (Load)

The impeller (221) is formed with a plurality of blades so as to have a substantially conical outer shape. The impeller (221) is accommodated in the impeller chamber (S201) in such a manner as to be fixed to one end of the drive shaft (240). A suction pipe (P201) and a discharge pipe (P202) are connected to the impeller chamber (S201). The suction pipe (P201) is provided to introduce refrigerant (fluid) into the impeller chamber (S201) from the outside. The discharge pipe (P202) is provided to return high-pressure refrigerant (fluid) compressed in the impeller chamber (S201) to the outside. That is, in the illustrated example, the impeller (221) and the impeller chamber (S201) constitute a compression mechanism.

Bearingless Motor

The bearingless motor (250) has a rotor-stator pair constituted by a rotor (251) and a stator (254), and is configured to rotationally drive the drive shaft (240) and to support the radial load of the drive shaft (240) in a contactless manner. The rotor (251) is fixed to the drive shaft (240), and the stator (254) is fixed to an inner circumferential wall of the casing (211).

Figure 12:
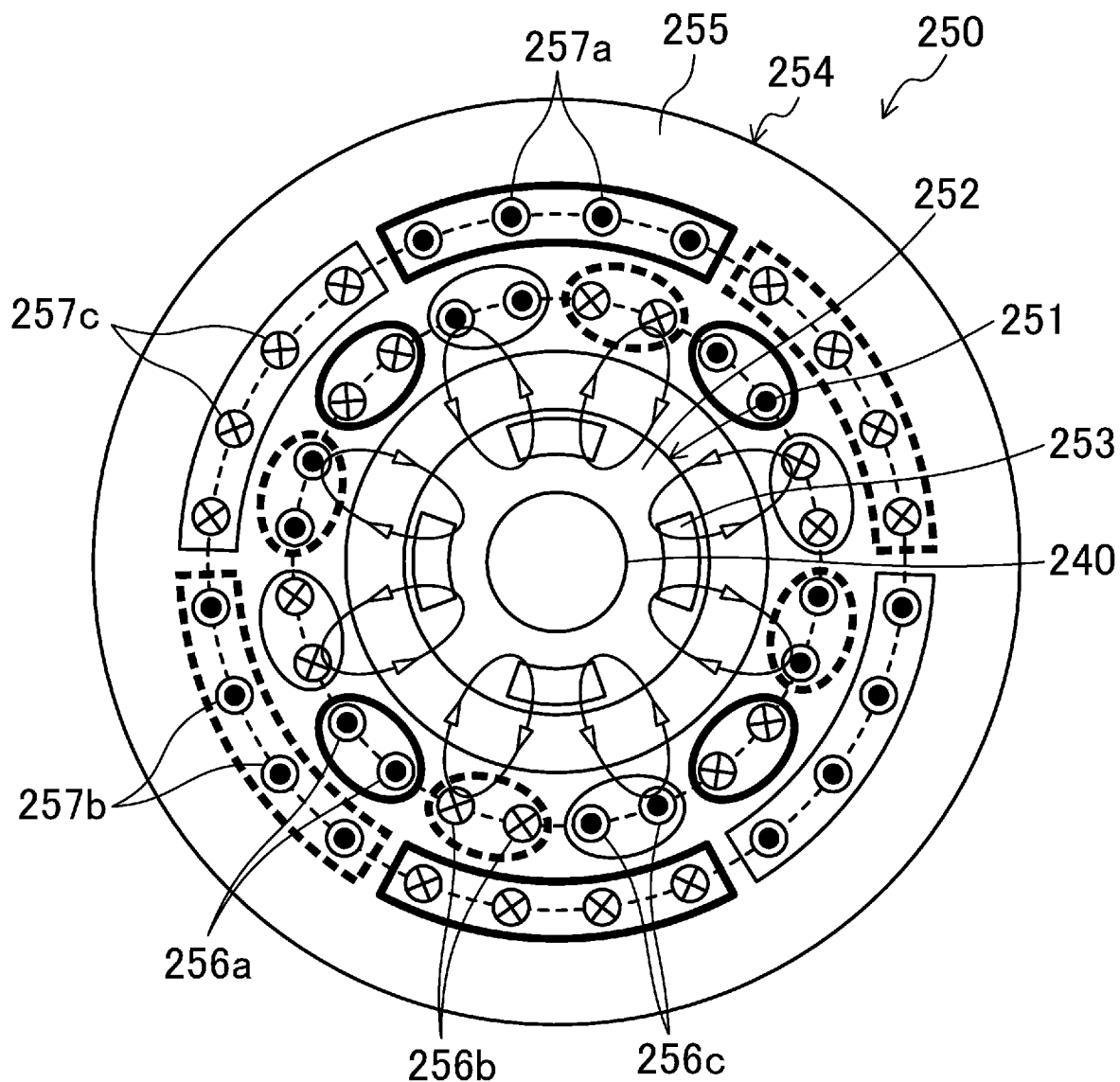
FIG. 12 is a cross-sectional view exemplarily illustrating the configuration of a bearingless motor.

As illustrated in FIG. 12, in the illustrated example, the bearingless motor (250) is configured as a consequent-pole bearingless motor.

The rotor (251) of the bearingless motor (250) has a rotor core (252) and a plurality of (in the illustrated example, four) permanent magnets (253) embedded in the rotor core (252). The rotor core (252) is formed of a magnetic material (for example, layered steel plates) and is formed into a columnar shape. The rotor core (252) has a shaft hole formed therein at a center portion thereof, through which the drive shaft (240) extends.

The plurality of permanent magnets (253) are arranged in the circumferential direction of the rotor (251) at predetermined pitch angles. In the illustrated example, the four permanent magnets (253) are arranged in the circumferential direction of the rotor (251) at pitch angles of 90°. In the illustrated example, furthermore, the permanent magnets (253) are embedded near the outer circumferential surface (outer circumferential portion) of the rotor core (252), and are formed into a shape (an arc shape) along the outer circumferential surface of the rotor core (252). The four permanent magnets (253) have the same shape. The side of each of the four permanent magnets (253) nearer the outer circumferential surface is the N pole, and portions of the outer circumferential surface of the rotor core (252) that are positioned between the four permanent magnets (253) in the circumferential direction of the rotor (251) are pseudo-S poles. The side of each of the four permanent magnets (253) nearer the outer circumferential surface may be the S pole. In this case, portions of the outer circumferential surface of the rotor core (252) that are positioned between the four permanent magnets (253) in the circumferential direction of the rotor (251) are pseudo-N poles.

The stator (254) of the bearingless motor (250) is formed of a magnetic material (for example, layered steel plates), and has a back yoke portion (255), a plurality of tooth portions (not illustrated), and drive coils (256a, 256b, 256c) and support coils (257a, 257b, 257c) that are wound around the tooth portions. The back yoke portion (255) is formed into a cylindrical shape. The drive coils (256a, 256b, 256c) and the support coils (257a, 257b, 257c) are wound around the respective tooth portions by using a distributed winding method. The drive coils (256a, 256b, 256c) and the support coils (257a, 257b, 257c) may be wound around the respective tooth portions by using a concentrated winding method.

The drive coils (256a, 256b, 256c) are coils wound on the inner circumferential side of the tooth portions. The drive coils (256a, 256b, 256c) are constituted by U-phase drive coils (256a) in portions enclosed by the thick solid line in FIG. 12, V-phase drive coils (256b) in portions enclosed by the thick broken line in FIG. 12, and W-phase drive coils (256c) in portions enclosed by the thin solid line in FIG. 12.

The support coils (257a, 257b, 257c) are coils wound on the outer circumferential side of the tooth portions. The support coils (257a, 257b, 257c) are constituted by U-phase support coils (257a) in portions enclosed by the thick solid line in FIG. 12, V-phase support coils (257b) in portions enclosed by the thick broken line in FIG. 12, and W-phase support coils (257c) in portions enclosed by the thin solid line in FIG. 12.

Figure 13:
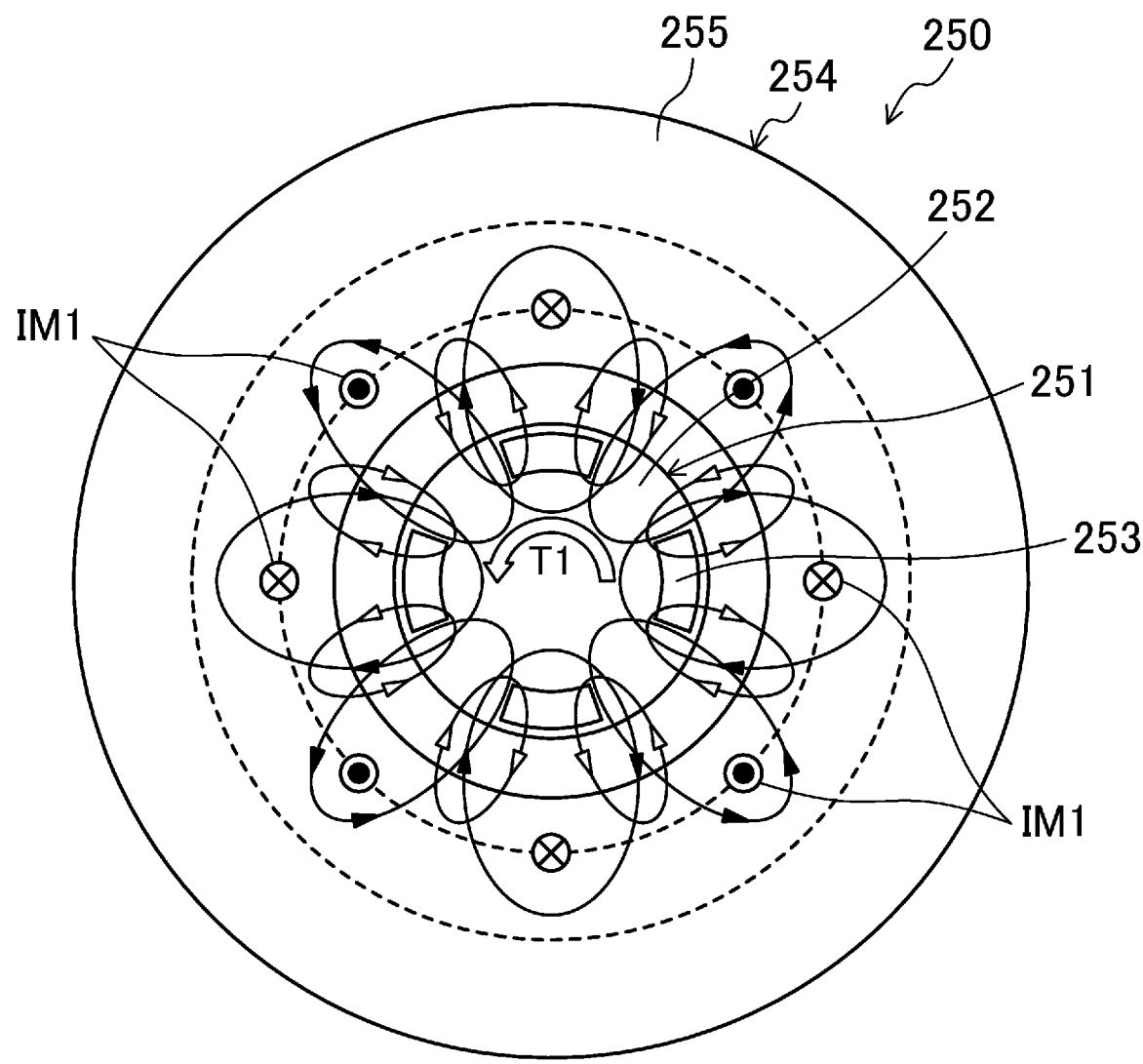
FIG. 13 is a cross-sectional view exemplarily illustrating a magnet magnetic flux and a driving magnetic flux that are generated in the bearingless motor.

FIG. 13 exemplarily illustrates a magnet magnetic flux (a magnet magnetic flux $\phi 1$ generated by the permanent magnets (253)) and a driving magnetic flux (a driving magnetic flux BM1 generated to rotationally drive the drive shaft (240)) generated in the bearingless motor (250). The driving magnetic flux BM1 is a magnetic flux generated in accordance with the current flowing through the drive coils (256a, 256b, 256c). The bearingless motor (250) is configured such that a driving torque for allowing the drive shaft (240) to rotate (a driving torque (T1) for allowing the drive shaft (240) to rotate in the counterclockwise direction in FIG. 13) is generated by interaction between the magnet magnetic flux $\phi 1$ and the driving magnetic flux BM1. In FIG. 13, current IM1 equivalent to the current flowing through the drive coils (256a, 256b, 256c) is illustrated.

Figure 14:
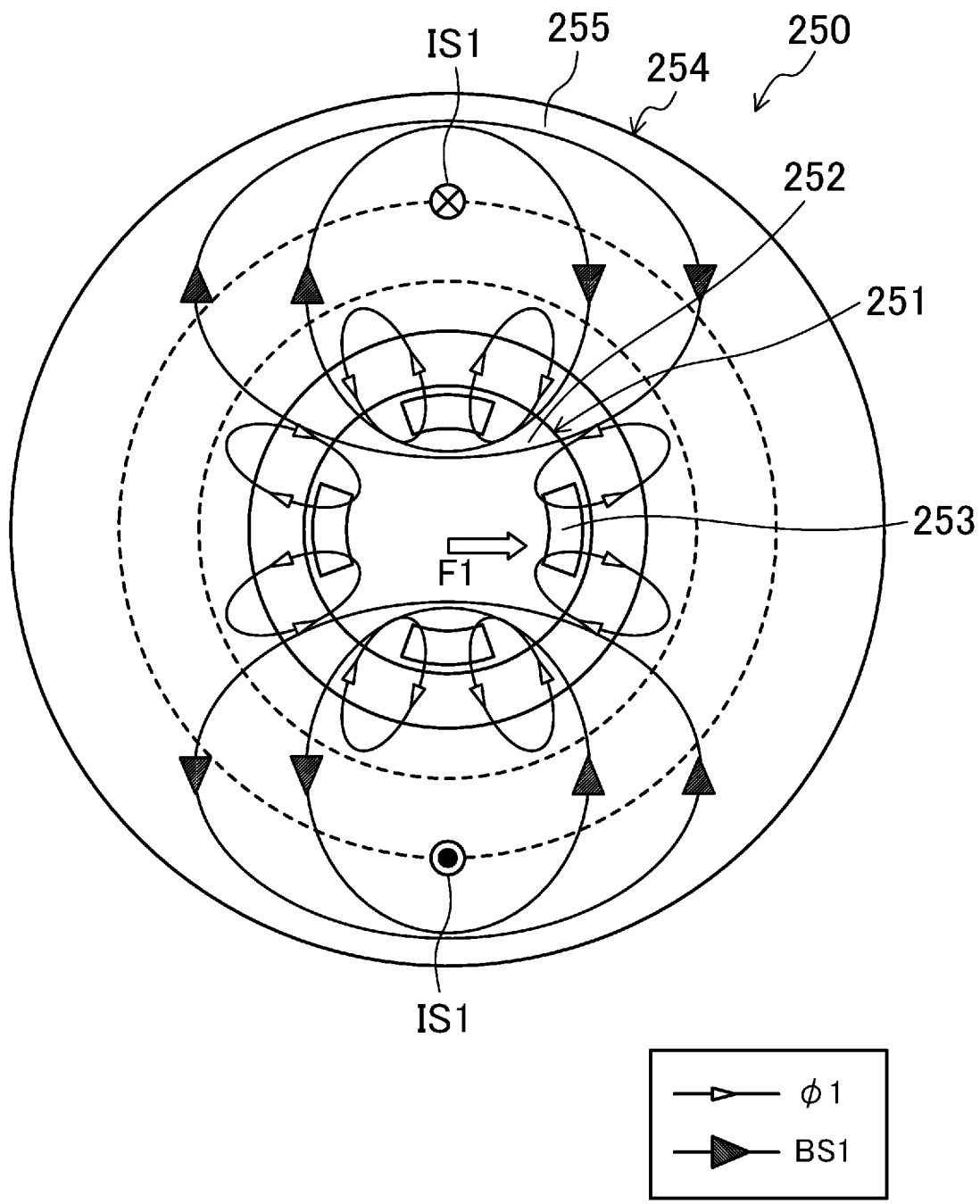
FIG. 14 is a cross-sectional view exemplarily illustrating the magnet magnetic flux and a supporting magnetic flux that are generated in the bearingless motor.

FIG. 14 exemplarily illustrates the magnet magnetic flux $\phi 1$ and a supporting magnetic flux (a supporting magnetic flux BS1 generated to support the radial load of the drive shaft (240) in a contactless manner) generated in the bearingless motor (250). The supporting magnetic flux BS1 is a magnetic flux generated in accordance with the current flowing through the support coils (257a, 257b, 257c). The bearingless motor (250) is configured such that a support force for supporting the radial load of the drive shaft (240) in a contactless manner (in FIG. 14, a support force (F1) that acts on the drive shaft (240) to the right) is generated by interaction between the magnet magnetic flux $\phi 1$ and the supporting magnetic flux BS1. In FIG. 14, current IS1 equivalent to the current flowing through the support coils (257a, 257b, 257c) is illustrated.

FIG. 15 exemplarily illustrates the magnet magnetic flux 41, the driving magnetic flux BM1, and the supporting magnetic flux BS1, which are generated in the bearingless motor (250). The bearingless motor (250) is configured such that the driving torque (T1) and the support force (F1) are simultaneously generated by interaction among the magnet magnetic flux $\phi 1$, the driving magnetic flux BM1, and the supporting magnetic flux BS1. In FIG. 15, the current IM1 equivalent to the current flowing through the drive coils (256a, 256b, 256c), and the current IS1 equivalent to the current flowing through the support coils (257a, 257b, 257c) are illustrated.

Radial Magnetic Bearing (Magnetic Bearing)

The radial magnetic bearing (260) has a plurality of electromagnets (in the illustrated example, first to fourth electromagnets (261 to 264)), and is configured to support the radial load of the drive shaft (240) in a contactless manner.

Figure 16:
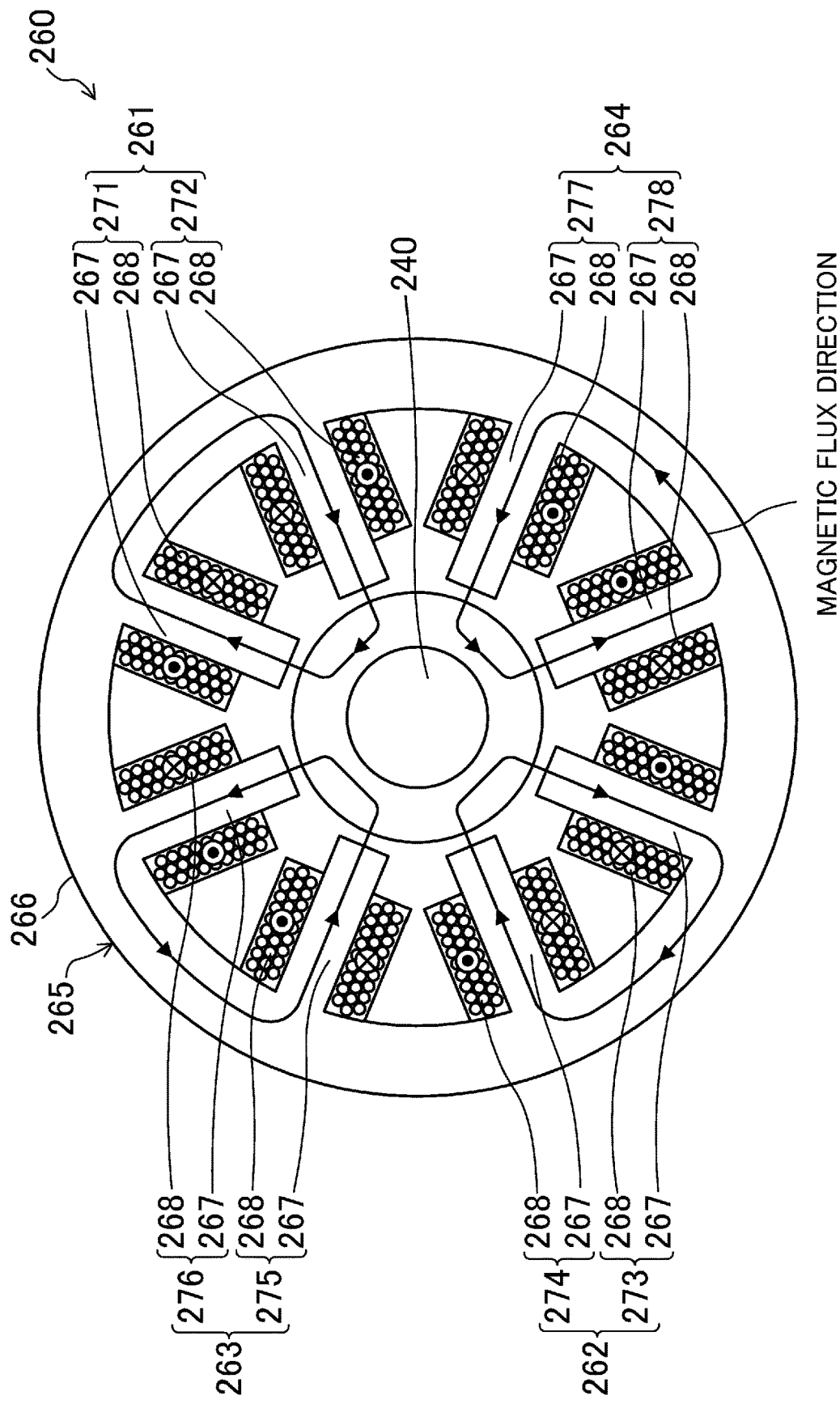
FIG. 16 is a cross-sectional view exemplarily illustrating the configuration of a radial magnetic bearing.

As illustrated in FIG. 16, in the illustrated example, the radial magnetic bearing (260) constitutes a heteropolar radial magnetic bearing. The first and second electromagnets (261, 262) face each other with the drive shaft (240) interposed therebetween, and support the drive shaft (240) in a contactless manner by using a combined electromagnetic force of the first and second electromagnets (261, 262). The third and fourth electromagnets (263, 264) face each other with the drive shaft (240) interposed therebetween, and support the drive shaft (240) in a contactless manner by using a combined electromagnetic force of the third and fourth electromagnets (263, 264). The direction in which the third and fourth electromagnets (263, 264) face each other (in FIG. 16, the lower right diagonal direction) is perpendicular to the direction in which the first and second electromagnets (261, 262) face each other (in FIG. 16, the upper right diagonal direction) in plan view.

Specifically, the radial magnetic bearing (260) includes a magnetic bearing core (265) and a plurality of (in the illustrated example, eight) coils (268). The magnetic bearing core (265) is formed by, for example, stacking a plurality of electromagnetic steel plates on top of each other, and has a back yoke (266) and a plurality of (in the illustrated example, eight) teeth (267). The back yoke (266) is formed into a cylindrical shape. The eight teeth (267) are arranged along an inner circumferential surface of the back yoke (266) at predetermined intervals (in the illustrated example, at intervals of 45°) in the circumferential direction. The teeth (267) project inward in the radial direction from the inner circumferential surface of the back yoke (266), and each have an inner circumferential surface (projecting end surface) that faces an outer circumferential surface of the drive shaft (240) with a predetermined gap interposed therebetween.

The eight coils (268) are wound around the eight teeth (267) of the magnetic bearing core (265), respectively. In the illustrated example, accordingly, eight electromagnet units (first to eighth electromagnet units (271 to 278)) are formed. Specifically, the first electromagnet unit (271), the second electromagnet unit (272), the seventh electromagnet unit (277), the eighth electromagnet unit (278), the third electromagnet unit (273), the fourth electromagnet unit (274), the fifth electromagnet unit (275), and the sixth electromagnet unit (276) are arranged in the clockwise direction in FIG. 16 in this order.

The respective coils (268) of the first and second electromagnet units (271, 272) are connected in series with each other to form the first electromagnet (261). The respective coils (268) of the third and fourth electromagnet units (273, 274) are connected in series with each other to form the second electromagnet (262). The current flowing through the coils of the first electromagnet (261) (that is, the coils (268) of the first and second electromagnet units (271, 272)) and the current flowing through the coils of the second electromagnet (262) (that is, the coils (268) of the third and fourth electromagnet units (273, 274)) are controlled to control the combined electromagnetic force of the first and second electromagnets (261, 262), thereby controlling the position of the drive shaft (240) in the direction in which the first and second electromagnets (261, 262) face each other (that is, the radial direction, or the upper right diagonal direction in FIG. 16).

The respective coils (268) of the fifth and sixth electromagnet units (275, 276) are connected in series with each other to form the third electromagnet (263). The respective coils (268) of the seventh and eighth electromagnet units (278) are connected in series with each other to form the fourth electromagnet (264). The current flowing through the coils of the third electromagnet (263) (that is, the coils (268) of the fifth and sixth electromagnet units (275, 276)) and the current flowing through the coils of the fourth electromagnet (264) (that is, the coils (268) of the seventh and eighth electromagnet units (278)) are controlled to control the combined electromagnetic force of the third and fourth electromagnets (263, 264), thereby controlling the position of the drive shaft (240) in the direction in which the third and fourth electromagnets (263, 264) face each other (that is, the radial direction perpendicular to the direction in which the first and second electromagnets (261, 262) face each other, or the lower right diagonal direction in FIG. 16).

The winding direction of the coils (268) and the direction of current flowing through the coils (268) are set so as to generate a suction force (that is, an electromagnetic force acting in a direction in which the drive shaft (240) is attracted) in each of the first to fourth electromagnets (261 to 264). Specifically, the winding direction of the coils (268) and the direction of current flowing through the coils (268) are set so that magnetic fluxes are generated in directions indicated by arrows in FIG. 16.

Touch-Down Bearings

The first touch-down bearing (231) is disposed near one end (the right end in FIG. 11) of the drive shaft (240), and the second touch-down bearing (232) is disposed near the other end (the left end in FIG. 11) of the drive shaft (240). The first and second touch-down bearings (231, 232) are configured to support the drive shaft (240) when the bearingless motor (250) and the radial magnetic bearing (260) are not energized (that is, when the drive shaft (240) is not levitated).

Thrust Magnetic Bearing

The thrust magnetic bearing (233) has a first and second thrust electromagnets (233a, 233b), and is configured to support the disk portion (241) of the drive shaft (240) in a contactless manner by using an electromagnetic force. Specifically, the first and second thrust electromagnets (233a, 233b) are each formed into an annular shape. The first and second thrust electromagnets (233a, 233b) face each other with the disk portion (241) of the drive shaft (240) interposed therebetween, and support the disk portion (241) of the drive shaft (240) in a contactless manner by using a combined electromagnetic force of the first and second thrust electromagnets (233a, 233b). That is, the current flowing through the first and second thrust electromagnets (233a, 233b) is controlled to control the combined electromagnetic force of the first and second thrust electromagnets (233a, 233b), thereby controlling the position of the drive shaft (240) in the direction in which the first and second thrust electromagnets (233a, 233b) face each other (that is, in the axial direction, or the left-right direction in FIG. 11).

Various Sensors

The components of the electric motor system (230) are provided with various sensors (not illustrated) such as a position sensor, a current sensor, and a rotational speed sensor. For example, the bearingless motor (250) is provided with a position sensor (not illustrated) that outputs a detection signal corresponding to the position of the rotor (251) in the radial direction, the radial magnetic bearing (260) is provided with a position sensor (not illustrated) that outputs a detection signal corresponding to the position of the drive shaft (240) in the radial direction, and the thrust magnetic bearing (233) is provided with a position sensor (not illustrated) that outputs a detection signal corresponding to the position of the drive shaft (240) in the thrust direction (axial direction). These position sensors are each constituted by, for example, an eddy-current displacement sensor that detects a gap (distance) between the sensor and the object being measured.

Controller

The controller (280) is configured to generate and output a motor voltage command value, a radial voltage command value, and a thrust voltage command value on the basis of detection signals from the various sensors disposed in the components of the electric motor system (230) and information such as the target rotational speed of the drive shaft (240), so that the rotational speed of the drive shaft (240) becomes equal to a predetermined target rotational speed, with the drive shaft (240) being supported in a contactless manner. The motor voltage command value is a command value for controlling the voltage to be supplied to the coils (not illustrated) of the stator (254) of the bearingless motor (250). The radial voltage command value is a command value for controlling the voltage to be supplied to the coils (268) of the first to fourth electromagnets (261 to 264) of the radial magnetic bearing (260). The thrust voltage command value is a command value for controlling the voltage to be supplied to the coils (not illustrated) of the first and second thrust electromagnets (233*a*, 233*b*) of the thrust magnetic bearing (233). The controller (280) is constituted by, for example, a computational unit such as a central processing unit (CPU), a storage unit such as a memory that stores a program for activating the computational unit or information, and so on.

Power Source

The power source (281) is configured to supply a voltage to the coils of the stator (254) of the bearingless motor (250) (specifically, the drive coils (256*a*, 256*b*, 256*c*) and the support coils (257*a*, 257*b*, 257*c*)), the coils (268) of the first to fourth electromagnets (261 to 264) of the radial magnetic bearing (260), and the coils (not illustrated) of the first and second thrust electromagnets (233*a*, 233*b*) of the thrust magnetic bearing (233) in accordance with the motor voltage command value, the radial voltage command value, and the thrust voltage command value output from the controller (280), respectively. The power source (281) is constituted by, for example, a PWM amplifier.

By controlling the voltage to be applied to the coils of the stator (254) of the bearingless motor (250) (specifically, the drive coils (256*a*, 256*b*, 256*c*) and the support coils (257*a*, 257*b*, 257*c*)), it is possible to control the current flowing through the coils of the stator (254) to control the magnetic fluxes generated in the bearingless motor (250) (specifically, the driving magnetic flux BM1 and the supporting magnetic flux BS1). In addition, by controlling the voltage to be supplied to the coils (268) of the first to fourth electromagnets (261 to 264) of the radial magnetic bearing (260), it is possible to control the current flowing through the coils (268) of the first to fourth electromagnets (261 to 264) to control the combined electromagnetic force of the first to fourth electromagnets (261 to 264). Likewise, by controlling the voltage to be supplied to the coils (not illustrated) of the first and second thrust electromagnets (233*a*, 233*b*) of the thrust magnetic bearing (233), it is possible to control the current flowing through the coils of the first and second thrust electromagnets (233*a*, 233*b*) to control the combined electromagnetic force of the first and second thrust electromagnets (233*a*, 233*b*).

Arrangement of Bearingless Motor and Radial Magnetic Bearing

The radial magnetic bearing (260) is arranged at a position on which a larger radial load than the radial load supported by the bearingless motor (250) is exerted in the axial direction of the drive shaft (240). In the illustrated example, the load (220) (in the illustrated example, the impeller (221)) is connected to one end of the drive shaft (240). The radial magnetic bearing (260) is arranged at a position closer to the load (220) (in the illustrated example, at a position closer to the impeller (221)) than the bearingless motor (250) in the axial direction of the drive shaft (240). As the position in the axial direction of the drive shaft (240) becomes closer to the one end of the drive shaft (240) (that is, the load (220)), the radial load of the drive shaft (240) at this position tends to increase. The radial magnetic bearing (260) is arranged at a position closer to the load (220) than the bearingless motor (250) in the axial direction of the drive shaft (240). With this configuration, in the electric motor system (230) in which the load (220) is connected to one end of the drive shaft (240), the radial magnetic bearing (260) can be arranged at a position at which the radial load of the drive shaft (240) is relatively large, and the bearingless motor (250) can be arranged at a position at which the radial load of the drive shaft (240) is relatively small.

Advantages of Third Embodiment

As described above, in the electric motor system (230) according to this embodiment, rotational driving and contactless supporting of the drive shaft (240) are performed using the bearingless motor (250) and the radial magnetic bearing (260). This configuration can reduce the size of the electric motor system (230), compared to a case where a motor that performs only rotational driving of the drive shaft (240) and a magnetic bearing that performs only contactless supporting of the drive shaft (240) are provided in place of the bearingless motor (250). Specifically, the length of the drive shaft (240) can be reduced.

In the electric motor system (230) according to this embodiment, furthermore, the radial load supported by the radial magnetic bearing (260) is larger than the radial load supported by the bearingless motor (250). That is, the radial magnetic bearing (260) is arranged at a position at which the radial load of the drive shaft (240) is relatively large, and the bearingless motor (250) is arranged at a position at which the radial load of the drive shaft (240) is relatively small.

In the bearingless motor (250), the electromagnetic force is distributed as a support force (a force for supporting the drive shaft (240) in a contactless manner) and a driving force (a force for rotationally driving the drive shaft (240)), whereas in the radial magnetic bearing (260), all of the electromagnetic force can be distributed as a support force. Thus, the radial magnetic bearing (260) is capable of generating a larger support force than the bearingless motor (250).

Accordingly, the radial magnetic bearing (260) is arranged at a position at which the radial load of the drive shaft (240) is relatively large, and the bearingless motor (250) is arranged at a position at which the radial load of the drive shaft (240) is relatively small. This ensures that a support force for the drive shaft (240) (a force for supporting the drive shaft (240) in a contactless manner) can be maintained.

Since it is possible to reduce the size of the electric motor system (230) while ensuring that a support force for the drive shaft (240) can be maintained, it is possible to reduce the size of the turbo compressor (210).

In the electric motor system (230), the resonant frequency of the rotating system including the load (220) (in the illustrated example, the impeller (221)) and the drive shaft (240) tends to increase with a reduction in axial length. Accordingly, reducing the length of the drive shaft (240) can increase the resonant frequency of the rotating system including the load (220) and the drive shaft (240). Thus, a safe operating region in which the electric motor system (230) can be operated safely can be expanded.

Modification of Bearingless Motor

Figure 17:
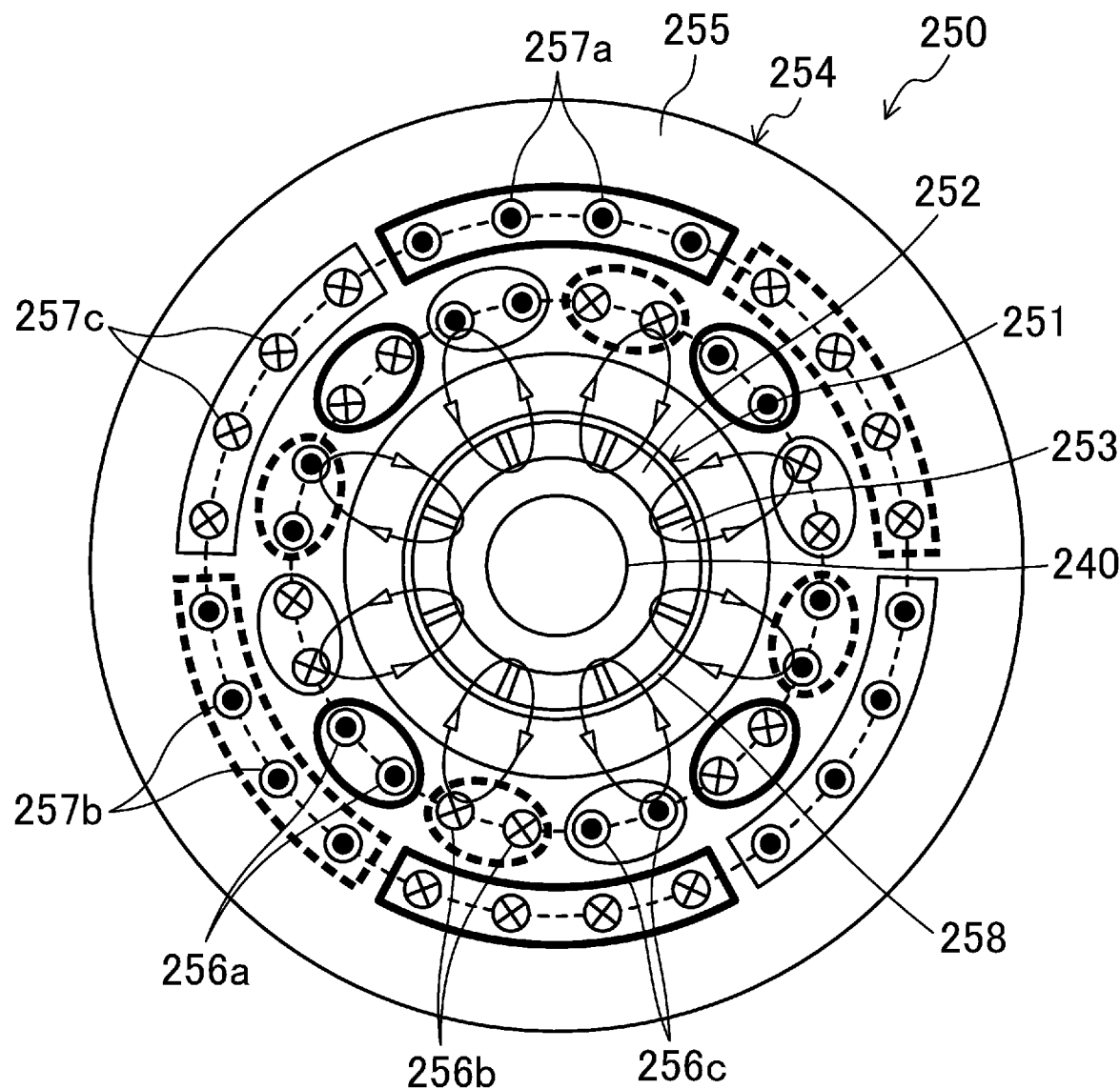
FIG. 17 is a cross-sectional view exemplarily illustrating the configuration of a bearingless motor according to a modification.

As illustrated in FIG. 17, the bearingless motor (250) may be configured as an SPM bearingless motor. In the SPM bearingless motor (250) illustrated in FIG. 17, the rotor (251) has a rotor core (252), a plurality of (in the illustrated example, eight) permanent magnets (253) disposed on an outer circumferential surface of the rotor core (252), and a protective member (258) that covers an outer circumference of the plurality of permanent magnets (253). The plurality of permanent magnets (253) are arranged in the circumferential direction of the rotor (251) at predetermined pitch angles. In the illustrated example, the eight permanent magnets (253) are arranged in the circumferential direction of the rotor (251) at pitch angles of 45°. Further, the permanent magnets (253) are formed into a shape (an arc shape) along the outer circumferential surface of the rotor core (252). The eight permanent magnets (253) have the same shape. Each of the eight permanent magnets (253) is configured to have magnetic pole surfaces (the S-pole surface/the N-pole surface) on an outer circumferential surface and an inner circumferential surface thereof such that different magnetic poles (the S pole/the N pole) are alternately arranged on the circumferential direction of the rotor (251). The protective member (258) is formed into a cylindrical shape and is disposed on the outer circumference of the plurality of permanent magnets (253).

FIG. 18 illustrates the magnet magnetic flux ϕ1, the driving magnetic flux BM1, and the supporting magnetic flux BS1, which are generated in the SPM bearingless motor (250) illustrated in FIG. 17. Like the consequent-pole bearingless motor (250) illustrated in FIG. 12, the SPM bearingless motor (250) illustrated in FIGS. 17 and 18 is configured such that the driving torque (T1) and the support force (F1) are simultaneously generated by interaction among the magnet magnetic flux ϕ1, the driving magnetic flux BM1, and the supporting magnetic flux BS1.

As illustrated in FIGS. 17 and 18, furthermore, the number of permanent magnets (253) in the SPM bearingless motor (250) (in the illustrated example, eight) is larger than the number of permanent magnets (253) in the consequent-pole bearingless motor (250) illustrated in FIG. 12 (in the example illustrated in FIG. 12, four). With this configuration, the SPM bearingless motor (250) has a higher magnetic flux density in terms of the magnet magnetic flux ϕ1 than the consequent-pole bearingless motor (250). Accordingly, the SPM bearingless motor (250) can generate a greater driving torque (T1) than the consequent-pole bearingless motor (250).

In the illustrated example, furthermore, the SPM bearingless motor (250) illustrated in FIG. 17 has narrower spaces between the plurality of permanent magnets (253) on the circumferential direction of the rotor (251) than the consequent-pole bearingless motor (250) illustrated in FIG. 12. Specifically, in the consequent-pole bearingless motor (250) illustrated in FIG. 12, the spaces between the plurality of permanent magnets (253) in the circumferential direction of the rotor (251) are each equal to the circumferential length of each of the permanent magnets (253), whereas in the SPM bearingless motor (250) illustrated in FIG. 17, the spaces between the plurality of permanent magnets (253) in the circumferential direction of the rotor (251) are each smaller than the circumferential length of each of the permanent magnets (253), and the plurality of permanent magnets (253) cover almost the entire circumference of the rotor core (252).

As described above, the bearingless motor (250) configured as an SPM bearingless motor can generate a larger driving force (a force for rotationally driving the drive shaft (240)) than the bearingless motor (250) configured as a consequent-pole bearingless motor.

Fourth Embodiment of Invention

A fourth embodiment of the present invention will be described.
Air Conditioner

Figure 19:
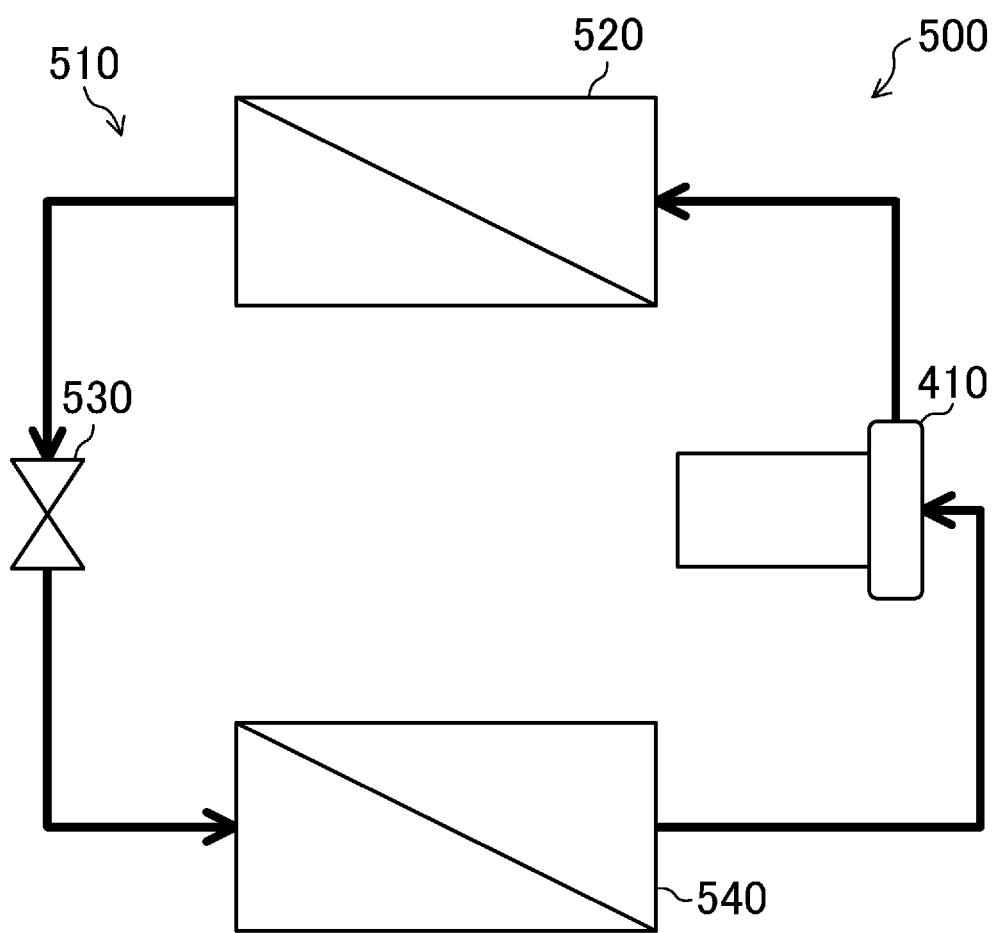
FIG. 19 is a schematic diagram exemplarily illustrating the configuration of an air conditioner according to a fourth embodiment of the present invention.
Figure 20:
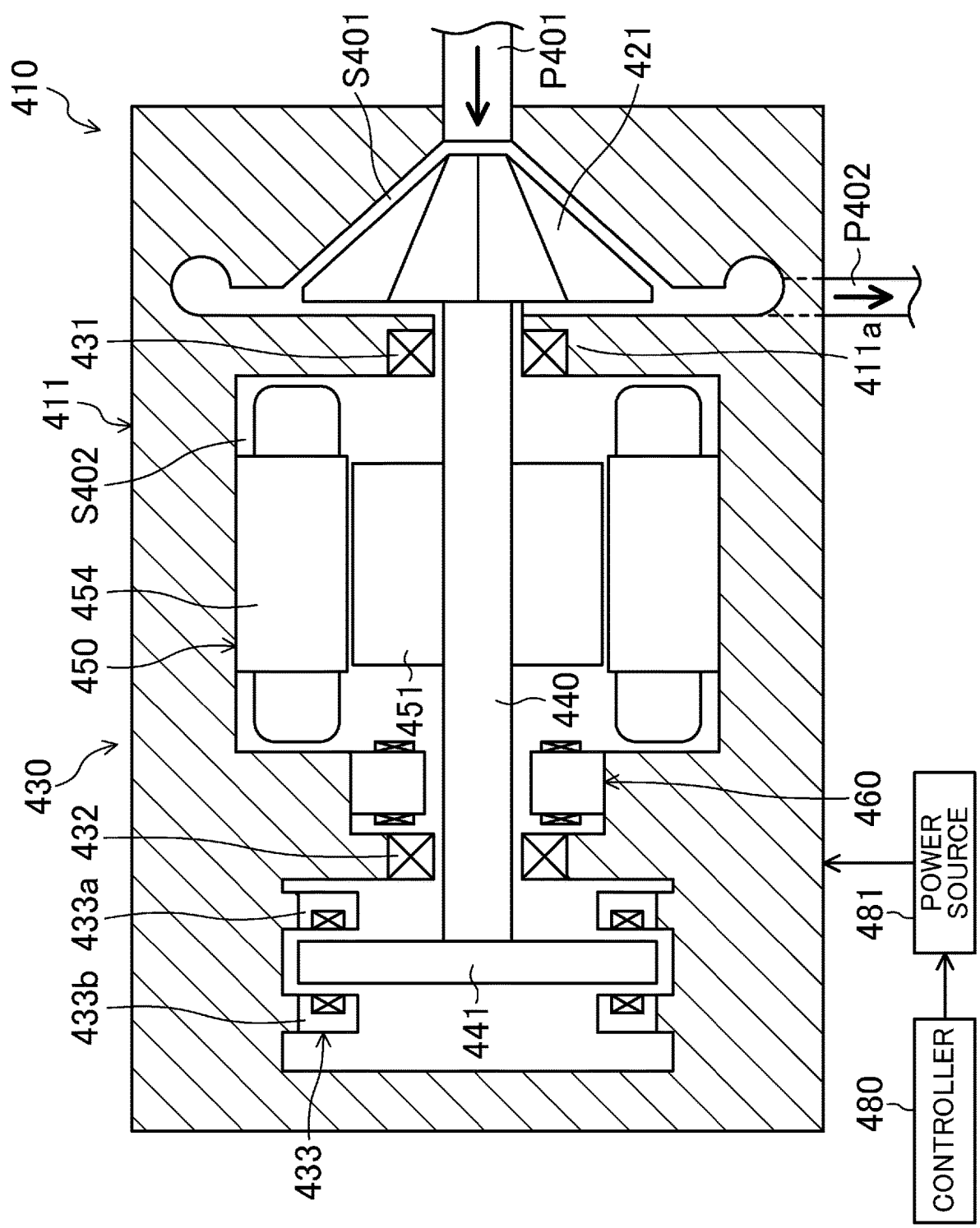
FIG. 20 is a longitudinal sectional view exemplarily illustrating the configuration of a turbo compressor.

FIG. 19 exemplarily illustrates the configuration of an air conditioner (500) according to an embodiment. The air conditioner (500) includes a refrigerant circuit (510). The refrigerant circuit (510) has a turbo compressor (410), a condenser (520), an expansion valve (530), and an evaporator (540), and is configured to perform a refrigeration cycle by circulating refrigerant therethrough. For example, the condenser (520) and the evaporator (540) are each configured as a cross-fin heat exchanger, and the expansion valve (530) is configured as an electrically powered valve.
Turbo Compressor FIG. 20 exemplarily illustrates the configuration of the turbo compressor (410) illustrated in FIG. 19. The turbo compressor (410) is disposed in the refrigerant circuit (510) and is configured to compress refrigerant. In the illustrated example, the turbo compressor (410) includes a casing (411), an impeller (421), and an electric motor system (430). The electric motor system (430) has a drive shaft (440), a bearingless motor (450), a radial magnetic bearing (460), a controller (480), and a power source (481). In the illustrated example, the electric motor system (430) further has a first touch-down bearing (431), a second touch-down bearing (432), and a thrust magnetic bearing (433).

In the following description, the term "axial direction" refers to a direction of an axis of rotation, which is a direction of an axis of the drive shaft (440), and the term "radial direction" refers to a direction perpendicular to the axial direction of the drive shaft (440). The term "outer circumferential side" refers to a side farther from the axis of the drive shaft (440), and the term "inner circumferential side" refers to a side closer to the axis of the drive shaft (440).
Casing The casing (411) is shaped into a cylinder having both ends closed and is arranged such that the axis line of the cylinder is directed horizontally. The inner space of the casing (411) is partitioned by a wall portion (411a), with the space to the right of the wall portion (411a) forming an impeller chamber (S401) that accommodates the impeller (421) and the space to the left of the wall portion (411a) forming an electric motor chamber (S402) that accommodates the bearingless motor (450). The electric motor chamber (S402) further accommodates the bearingless motor (450), the radial magnetic bearing (460), the first touch-down bearing (431), the second touch-down bearing (432), and the thrust magnetic bearing (433). The bearingless motor (450), the radial magnetic bearing (460), the first touch-down bearing (431), the second touch-down bearing (432), and the thrust magnetic bearing (433) are fixed to an inner circumferential wall of the electric motor chamber (S402).
Drive Shaft The drive shaft (440) is provided to rotationally drive the impeller (421). In the illustrated example, the drive shaft (440) extends in the axial direction through the casing (411) and couples the impeller (421) and the bearingless motor (450) to each other. Specifically, the impeller (421) is fixed to one end of the drive shaft (440), and the bearingless motor (450) is disposed in a middle portion of the drive shaft (440). A disk-shaped portion (hereinafter referred to as a "disk portion (441)") is disposed at the other end of the drive shaft (440) (that is, the end on the opposite side to the one end to which the impeller (421) is fixed). The disk portion (441) is formed of a magnetic material (for example, iron).
Impeller The impeller (421) is formed with a plurality of blades so as to have a substantially conical outer shape. The impeller (421) is accommodated in the impeller chamber (S401) in such a manner as to be fixed to one end of the drive shaft (440). A suction pipe (P401) and a discharge pipe (P402) are connected to the impeller chamber (S401). The suction pipe (P401) is provided to introduce refrigerant (fluid) into the impeller chamber (S401) from the outside. The discharge pipe (P402) is provided to return high-pressure refrigerant (fluid) compressed in the impeller chamber (S401) to the outside. That is, in the illustrated example, the impeller (421) and the impeller chamber (S401) constitute a compression mechanism.

Bearingless Motor

The bearingless motor (450) has a rotor-stator pair constituted by a rotor (451) and a stator (454), and is configured to rotationally drive the drive shaft (440) and to support the radial load of the drive shaft (440) in a contactless manner. The rotor (451) is fixed to the drive shaft (440), and the stator (454) is fixed to an inner circumferential wall of the casing (411).

As illustrated in FIG. 21, in the illustrated example, the bearingless motor (450) is configured as a consequent-pole bearingless motor.

The rotor (451) of the bearingless motor (450) has a rotor core (452) and a plurality of (in the illustrated example, four) permanent magnets (453) embedded in the rotor core (452). The rotor core (452) is formed of a magnetic material (for example, layered steel plates) and is formed into a columnar shape. The rotor core (452) has a shaft hole formed therein at a center portion thereof, through which the drive shaft (440) extends.

The plurality of permanent magnets (453) are arranged in the circumferential direction of the rotor (451) at predetermined pitch angles. In the illustrated example, the four permanent magnets (453) are arranged in the circumferential direction of the rotor (451) at pitch angles of 90°. In the illustrated example, furthermore, the permanent magnets (453) are embedded near the outer circumferential surface (outer circumferential portion) of the rotor core (452), and are formed into a shape (an arc shape) along the outer circumferential surface of the rotor core (452). The four permanent magnets (453) have the same shape. The side of each of the four permanent magnets (453) nearer the outer circumferential surface is the N pole, and portions of the outer circumferential surface of the rotor core (452) that are positioned between the four permanent magnets (453) in the circumferential direction of the rotor (451) are pseudo-S poles. The side of each of the four permanent magnets (453) nearer the outer circumferential surface may be the S pole. In this case, portions of the outer circumferential surface of the rotor core (452) that are positioned between the four permanent magnets (453) in the circumferential direction of the rotor (451) are pseudo-N poles.

The stator (454) of the bearingless motor (450) is formed of a magnetic material (for example, layered steel plates), and has a back yoke portion (455), a plurality of tooth portions (not illustrated), and drive coils (456b, 456b, 456c) and support coils (457a, 457b, 457c) that are wound around the tooth portions. The back yoke portion (455) is formed into a cylindrical shape. The drive coils (456b, 456b, 456c) and the support coils (457a, 457b, 457c) are wound around the respective tooth portions by using a distributed winding method. The drive coils (456b, 456b, 456c) and the support coils (457a, 457b, 457c) may be wound around the respective tooth portions by using a concentrated winding method.

The drive coils (456b, 456b, 456c) are coils wound on the inner circumferential side of the tooth portions. The drive coils (456b, 456b, 456c) are constituted by U-phase drive coils (456b) in portions enclosed by the thick solid line in FIG. 21, V-phase drive coils (456b) in portions enclosed by the thick broken line in FIG. 21, and W-phase drive coils (456c) in portions enclosed by the thin solid line in FIG. 21.

The support coils (457a, 457b, 457c) are coils wound on the outer circumferential side of the tooth portions. The support coils (457a, 457b, 457c) are constituted by U-phase support coils (457a) in portions enclosed by the thick solid line in FIG. 21, V-phase support coils (457b) in portions enclosed by the thick broken line in FIG. 21, and W-phase support coils (457c) in portions enclosed by the thin solid line in FIG. 21.

Figure 22:
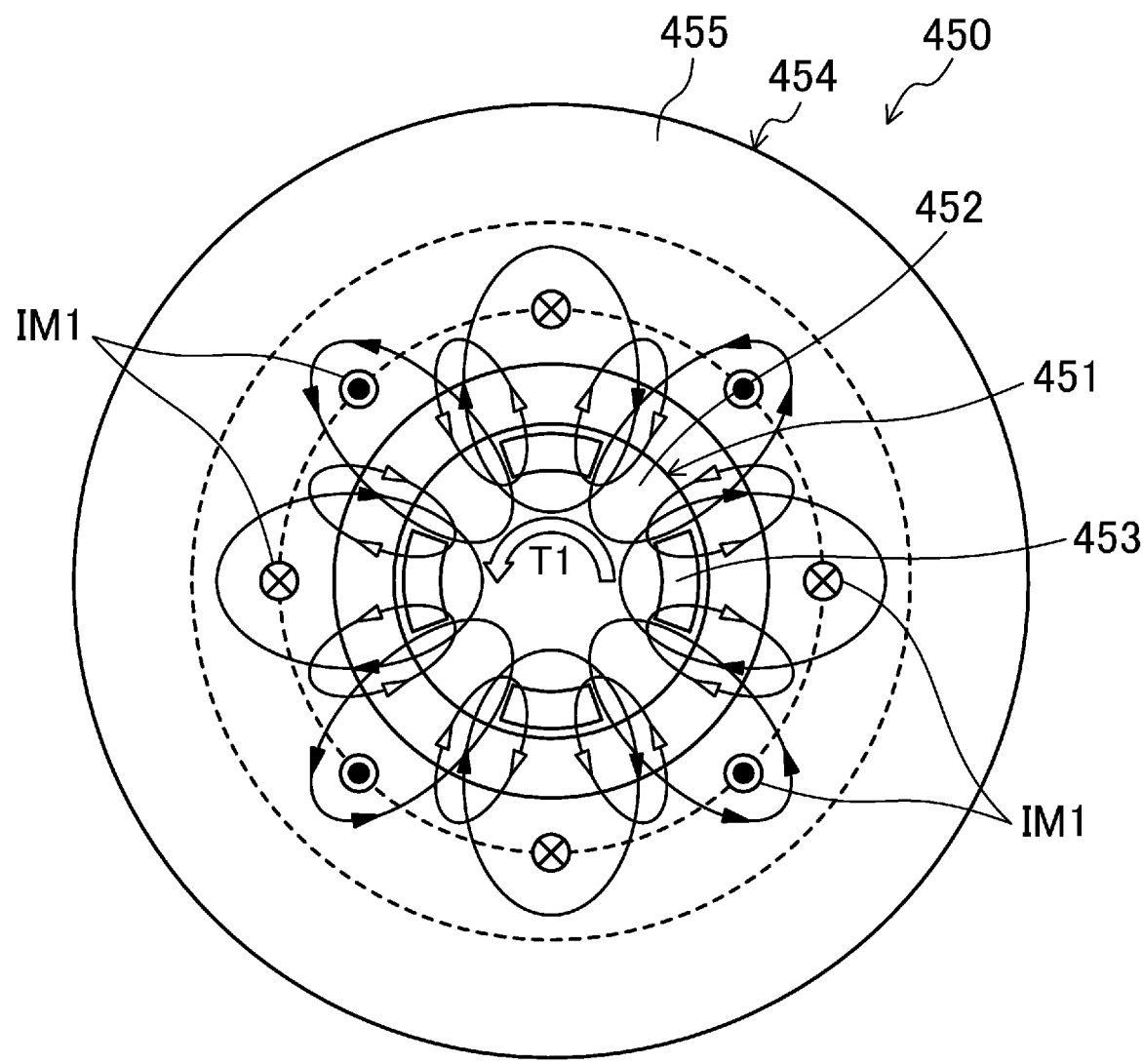
FIG. 22 is a cross-sectional view exemplarily illustrating a magnet magnetic flux and a driving magnetic flux that are generated in the bearingless motor.

FIG. 22 exemplarily illustrates a magnet magnetic flux (a magnet magnetic flux φ1 generated by the permanent magnets (453)) and a driving magnetic flux (a driving magnetic flux BM1 generated to rotationally drive the drive shaft (440)) generated in the bearingless motor (450). The driving magnetic flux BM1 is a magnetic flux generated in accordance with the current flowing through the drive coils (456b, 456b, 456c). The bearingless motor (450) is configured such that a driving torque for allowing the drive shaft (440) to rotate (a driving torque (T1) for allowing the drive shaft (440) to rotate in the counterclockwise direction in FIG. 22) is generated by interaction between the magnet magnetic flux φ1 and the driving magnetic flux BM1. In FIG. 22, current IM1 equivalent to the current flowing through the drive coils (456b, 456b, 456c) is illustrated.

Figure 23:
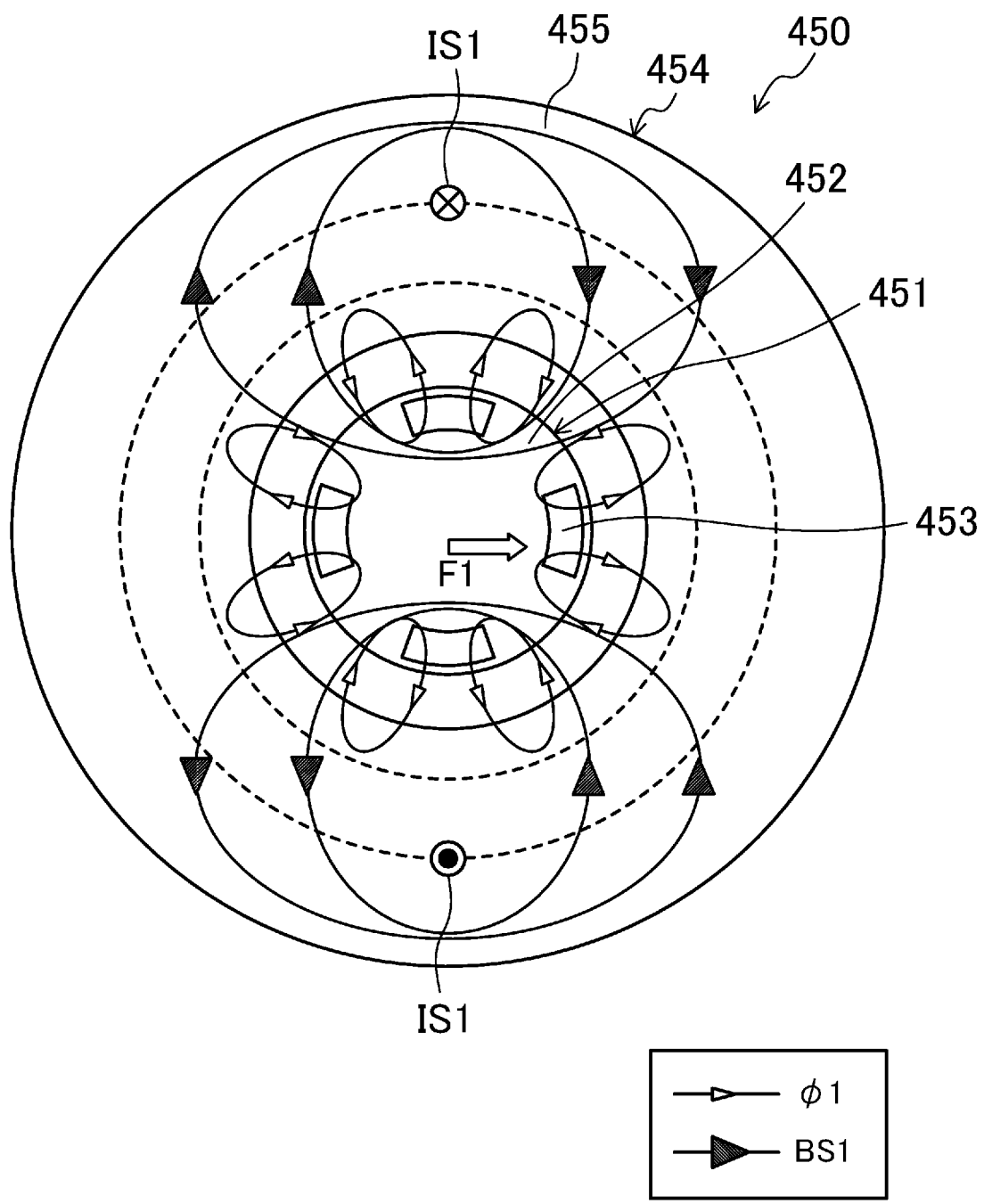
FIG. 23 is a cross-sectional view exemplarily illustrating the magnet magnetic flux and a supporting magnetic flux that are generated in the bearingless motor.

FIG. 23 exemplarily illustrates the magnet magnetic flux φ1 and a supporting magnetic flux (a supporting magnetic flux BS1 generated to support the radial load of the drive shaft (440) in a contactless manner) generated in the bearingless motor (450). The supporting magnetic flux BS1 is a magnetic flux generated in accordance with the current flowing through the support coils (457a, 457b, 457c). The bearingless motor (450) is configured such that a support force for supporting the radial load of the drive shaft (440) in a contactless manner (in FIG. 23, a support force (F1) that acts on the drive shaft (440) to the right) is generated by interaction between the magnet magnetic flux φ1 and the supporting magnetic flux BS1. In FIG. 23, current IS1 equivalent to the current flowing through the support coils (457a, 457b, 457c) is illustrated.

Figure 24:
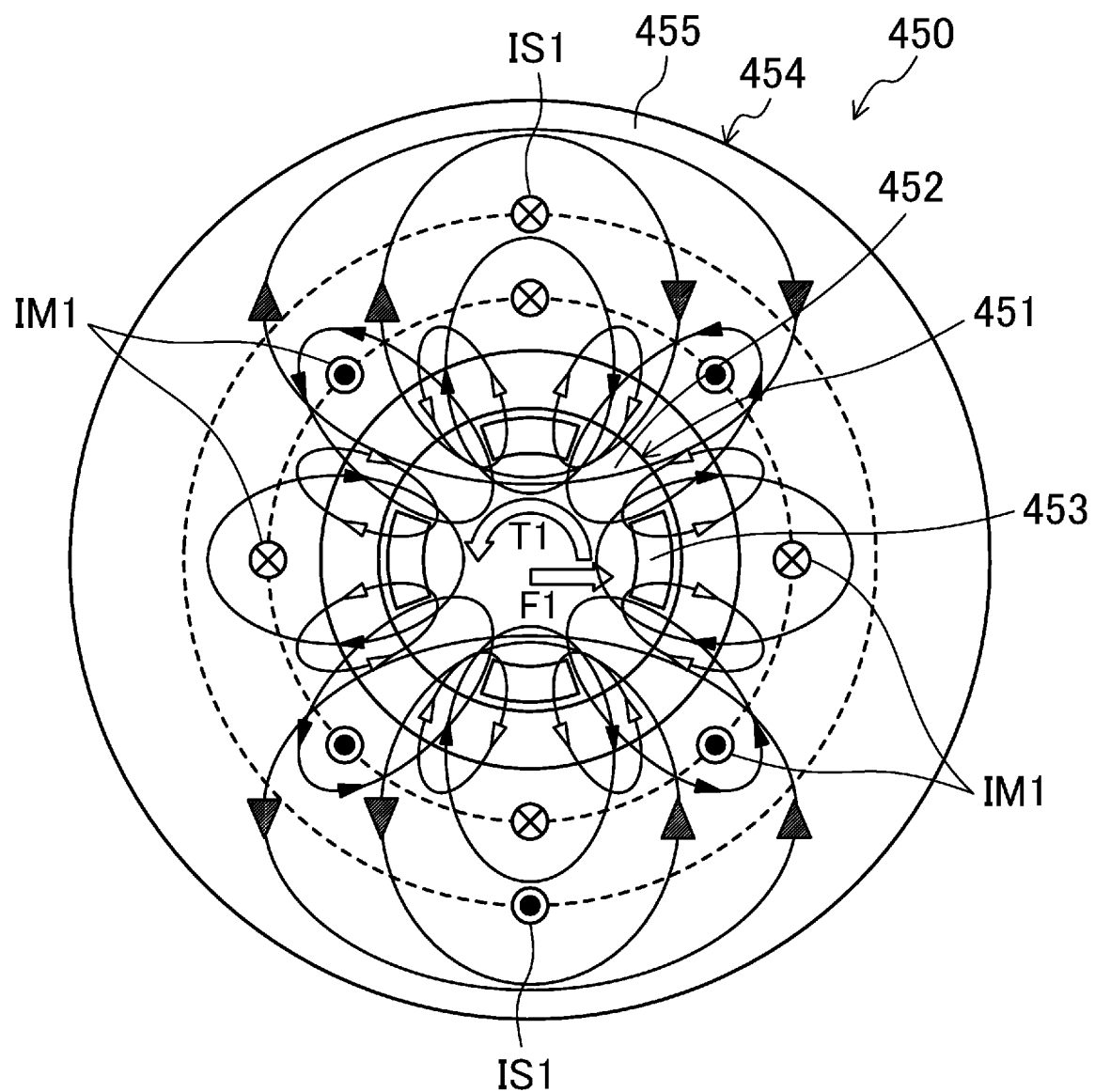
FIG. 24 is a cross-sectional view exemplarily illustrating the magnet magnetic flux, the driving magnetic flux, and the supporting magnetic flux that are generated in the bearingless motor.

FIG. 24 illustrates the magnet magnetic flux φ1, the driving magnetic flux BM1, and the supporting magnetic flux BS1, which are generated in the bearingless motor (450). The bearingless motor (450) is configured such that the driving torque (T1) and the support force (F1) are simultaneously generated by interaction among the magnet magnetic flux φ1, the driving magnetic flux BM1, and the supporting magnetic flux BS1. In FIG. 24, the current IM1 equivalent to the current flowing through the drive coils (456b, 456b, 456c), and the current IS1 equivalent to the current flowing through the support coils (457a, 457b, 457c) are illustrated.

Radial Magnetic Bearing (Magnetic Bearing)

The radial magnetic bearing (460) has a plurality of electromagnets (in the illustrated example, first to fourth electromagnets (461 to 464)), and is configured to support the radial load of the drive shaft (440) in a contactless manner.

Figure 25:
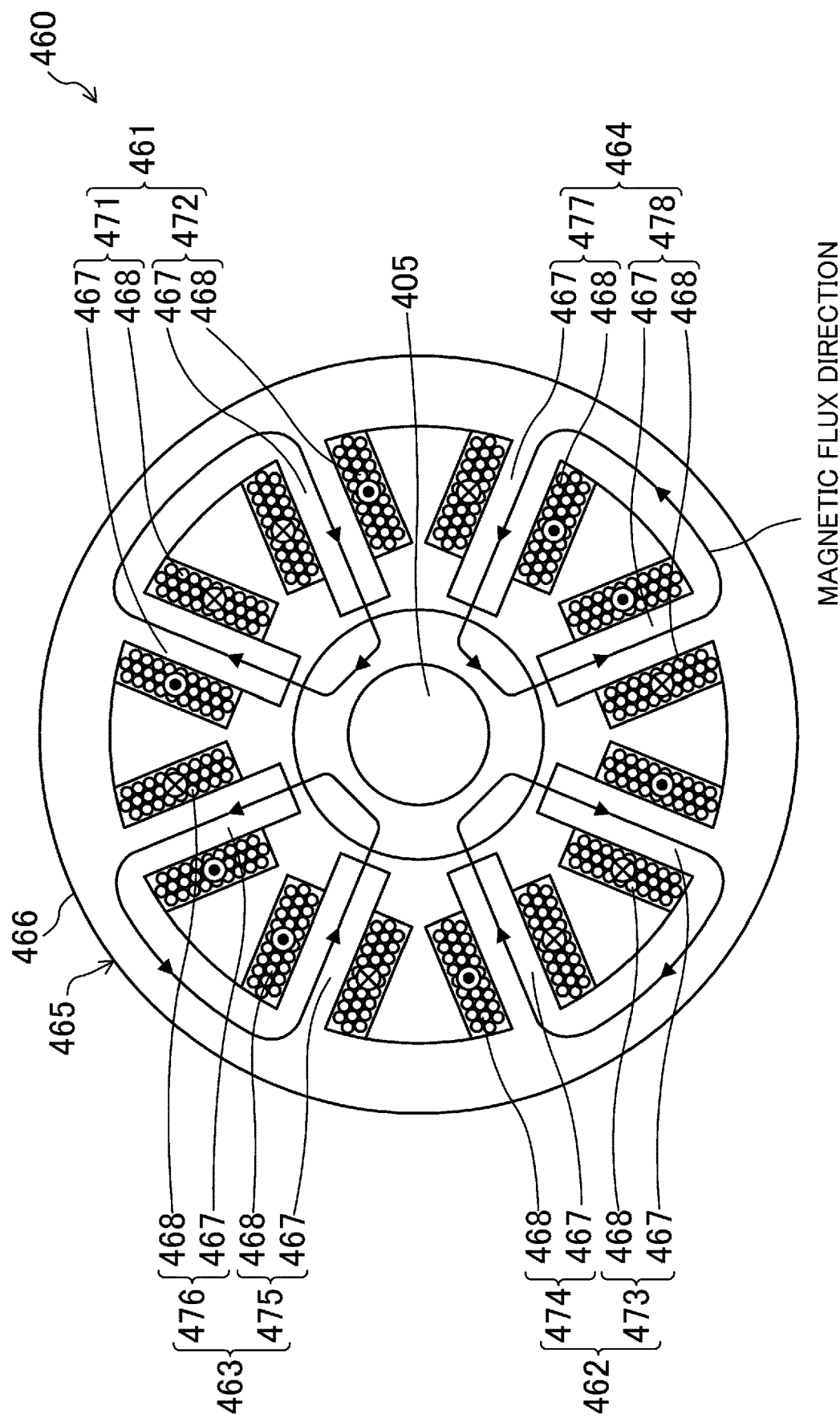
FIG. 25 is a cross-sectional view exemplarily illustrating the configuration of a radial magnetic bearing.

As illustrated in FIG. 25, in the illustrated example, the radial magnetic bearing (460) constitutes a heteropolar radial magnetic bearing. The first and second electromagnets (461, 462) face each other with the drive shaft (440) interposed therebetween, and support the drive shaft (440) in a contactless manner by using a combined electromagnetic force of the first and second electromagnets (461, 462). The third and fourth electromagnets (463, 464) face each other with the drive shaft (440) interposed therebetween, and support the drive shaft (440) in a contactless manner by using a combined electromagnetic force of the third and fourth electromagnets (463, 464). The direction in which the third and fourth electromagnets (463, 464) face each other (in FIG. 25, the lower right diagonal direction) is perpendicular to the direction in which the first and second electromagnets (461, 462) face each other (in FIG. 25, the upper right diagonal direction) in plan view.

Specifically, the radial magnetic bearing (460) includes a magnetic bearing core (465) and a plurality of (in the illustrated example, eight) coils (468). The magnetic bearing core (465) is formed by, for example, stacking a plurality of electromagnetic steel plates on top of each other, and has a back yoke (466) and a plurality of (in the illustrated example, eight) teeth (467). The back yoke (466) is formed into a cylindrical shape. The eight teeth (467) are arranged along an inner circumferential surface of the back yoke (466) at predetermined intervals (in the illustrated example, at intervals of 45°) in the circumferential direction. The teeth (467) project inward in the radial direction from the inner circumferential surface of the back yoke (466), and each have an inner circumferential surface (projecting end surface) that faces an outer circumferential surface of the drive shaft (440) with a predetermined gap interposed therebetween.

The eight coils (468) are wound around the eight teeth (467) of the magnetic bearing core (465), respectively. In the illustrated example, accordingly, eight electromagnet units (first to eighth electromagnet units (471 to 478)) are formed. Specifically, the first electromagnet unit (471), the second electromagnet unit (472), the seventh electromagnet unit (477), the eighth electromagnet unit (478), the third electromagnet unit (473), the fourth electromagnet unit (474), the fifth electromagnet unit (475), and the sixth electromagnet unit (476) are arranged in the clockwise direction in FIG. 25 in this order.

The respective coils (468) of the first and second electromagnet units (471, 472) are connected in series with each other to form the first electromagnet (461). The respective coils (468) of the third and fourth electromagnet units (473, 474) are connected in series with each other to form the second electromagnet (462). The current flowing through the coils of the first electromagnet (461) (that is, the coils (468) of the first and second electromagnet units (471, 472)) and the current flowing through the coils of the second electromagnet (462) (that is, the coils (468) of the third and fourth electromagnet units (473, 474)) are controlled to control the combined electromagnetic force of the first and second electromagnets (461, 462), thereby controlling the position of the drive shaft (440) in the direction in which the first and second electromagnets (461, 462) face each other (that is, the radial direction, or the upper right diagonal direction in FIG. 25).

The respective coils (468) of the fifth and sixth electromagnet units (475, 476) are connected in series with each other to form the third electromagnet (463). The respective coils (468) of the seventh and eighth electromagnet units (477, 478) are connected in series with each other to form the fourth electromagnet (464). The current flowing through the coils of the third electromagnet (463) (that is, the coils (468) of the fifth and sixth electromagnet units (475, 476)) and the current flowing through the coils of the fourth electromagnet (464) (that is, the coils (468) of the seventh and eighth electromagnet units (477, 478)) are controlled to control the combined electromagnetic force of the third and fourth electromagnets (463, 464), thereby controlling the position of the drive shaft (440) in the direction in which the third and fourth electromagnets (463, 464) face each other (that is, the radial direction perpendicular to the direction in which the first and second electromagnets (461, 462) face each other, or the lower right diagonal direction in FIG. 25).

The winding direction of the coils (468) and the direction of current flowing through the coils (468) are set so as to generate a suction force (that is, an electromagnetic force acting in a direction in which the drive shaft (440) is attracted) in each of the first to fourth electromagnets (461 to 464). Specifically, the winding direction of the coils (468) and the direction of current flowing through the coils (468) are set so that magnetic fluxes are generated in directions indicated by arrows in FIG. 25.

Touch-Down Bearings

The first touch-down bearing (431) is disposed near one end (the right end in FIG. 20) of the drive shaft (440), and the second touch-down bearing (432) is disposed near the other end (the left end in FIG. 20) of the drive shaft (440). The first and second touch-down bearings (431, 432) are configured to support the drive shaft (440) when the bearingless motor (450) and the radial magnetic bearing (460) are not energized (that is, when the drive shaft (440) is not levitated).

Thrust Magnetic Bearing

The thrust magnetic bearing (433) has a first and second thrust electromagnets (433a, 433b), and is configured to support the disk portion (441) of the drive shaft (440) in a contactless manner by using an electromagnetic force. Specifically, the first and second thrust electromagnets (433a, 433b) are each formed into an annular shape. The first and second thrust electromagnets (433a, 433b) face each other with the disk portion (441) of the drive shaft (440) interposed therebetween, and support the disk portion (441) of the drive shaft (440) in a contactless manner by using a combined electromagnetic force of the first and second thrust electromagnets (433a, 433b). That is, the current flowing through the first and second thrust electromagnets (433a, 433b) is controlled to control the combined electromagnetic force of the first and second thrust electromagnets (433a, 433b), thereby controlling the position of the drive shaft (440) in the direction in which the first and second thrust electromagnets (433a, 433b) face each other (that is, in the axial direction, or the left-right direction in FIG. 20).

Various Sensors

The components of the electric motor system (430) are provided with various sensors (not illustrated) such as a position sensor, a current sensor, and a rotational speed sensor. For example, the bearingless motor (450) is provided with a position sensor (not illustrated) that outputs a detection signal corresponding to the position of the rotor (451) in the radial direction, the radial magnetic bearing (460) is provided with a position sensor (not illustrated) that outputs a detection signal corresponding to the position of the drive shaft (440) in the radial direction, and the thrust magnetic bearing (433) is provided with a position sensor (not illustrated) that outputs a detection signal corresponding to the position of the drive shaft (440) in the thrust direction (axial direction). These position sensors are each constituted by, for example, an eddy-current displacement sensor that detects a gap (distance) between the sensor and the object being measured.

Controller

The controller (480) is configured to generate and output, a motor voltage command value, a radial voltage command value, and a thrust voltage command value on the basis of detection signals from the various sensors disposed in the components of the electric motor system (430) and information such as the target rotational speed of the drive shaft (440), so that the rotational speed of the drive shaft (440) becomes equal to a predetermined target rotational speed, with the drive shaft (440) being supported in a contactless manner. The motor voltage command value is a command value for controlling the voltage to be supplied to the coils (not illustrated) of the stator (454) of the bearingless motor (450). The radial voltage command value is a command value for controlling the voltage to be supplied to the coils (468) of the first to fourth electromagnets (461 to 464) of the radial magnetic bearing (460). The thrust voltage command value is a command value for controlling the voltage to be supplied to the coils (not illustrated) of the first and second thrust electromagnets (433a, 433b) of the thrust magnetic bearing (433). The controller (480) is constituted by, for example, a computational unit such as a CPU, a storage unit such as a memory that stores a program for activating the computational unit or information, and so on.

Power Source

The power source (481) is configured to supply a voltage to the coils of the stator (454) of the bearingless motor (450) (specifically, the drive coils (456b, 456b, 456c) and the support coils (457a, 457b, 457c)), the coils (468) of the first to fourth electromagnets (461 to 464) of the radial magnetic bearing (460), and the coils (not illustrated) of the first and second thrust electromagnets (433a, 433b) of the thrust magnetic bearing (433) in accordance with the motor voltage command value, the radial voltage command value, and the thrust voltage command value output from the controller (480), respectively. The power source (481) is constituted by, for example, a PWM amplifier.

By controlling the voltage to be applied to the coils of the stator (454) of the bearingless motor (450) (specifically, the drive coils (456b, 456b, 456c) and the support coils (457a, 457b, 457c)), it is possible to control the current flowing through the coils of the stator (454) to control the magnetic fluxes generated in the bearingless motor (450) (specifically, the driving magnetic flux BM1 and the supporting magnetic flux BS1). In addition, by controlling the voltage to be supplied to the coils (468) of the first to fourth electromagnets (461 to 464) of the radial magnetic bearing (460), it is possible to control the current flowing through the coils (468) of the first to fourth electromagnets (461 to 464) to control the combined electromagnetic force of the first to fourth electromagnets (461 to 464). Likewise, by controlling the voltage to be supplied to the coils (not illustrated) of the first and second thrust electromagnets (433a, 433b) of the thrust magnetic bearing (433), it is possible to control the current flowing through the coils of the first and second thrust electromagnets (433a, 433b) to control the combined electromagnetic force of the first and second thrust electromagnets (433a, 433b).

Operating Region of Turbo Compressor

Next, an operating region of the turbo compressor (410) will be described with reference to FIG. 7. In FIG. 7, the horizontal axis represents refrigerant volumetric flow rate, and the vertical axis represents head. As illustrated in FIG. 7, the operating region of the turbo compressor (410) roughly includes a steady operating region (A), a high-load torque region (B), a turbulence region (C), and a surging region (D). The steady operating region (A), the high-load torque region (B), and the turbulence region (C) are located inside a surge line indicated by a bold line in FIG. 7, and the surging region (D) is located outside the surge line. That is, in cases of emergency such as a blackout, the turbo compressor (410) may sometimes temporarily operate in the surging region (D). The turbulence region (C) is a region in which rotating stall of the turbo compressor (410) occurs.

In the steady operating region (A), the load torque of the drive shaft (440) (a torque necessary to rotationally drive the drive shaft (440)) is relatively small, and the radial load of the drive shaft (440) is relatively small. In the high-load torque region (B), the load torque of the drive shaft (440) is relatively large, and the radial load of the drive shaft (440) is also relatively large. The load torque of the drive shaft (440) is maximum at a predetermined point in the high-load torque region (B) (specifically, the upper right vertex of the high-load torque region (B) in FIG. 7). In the turbulence region (C), the load torque of the drive shaft (440) is relatively small, whereas the radial load of the drive shaft (440) is relatively large. In the surging region (D), the load torque of the drive shaft (440) is relatively small, whereas the radial load of the drive shaft (440) is relatively large. The radial load of the drive shaft (440) is maximum at a predetermined point in the surging region (D).

As described above, in the turbo compressor (410) disposed in the refrigerant circuit (510) and configured to compress refrigerant, the operating region in which the load torque of the drive shaft (440) is maximum (in the illustrated example, the high-load torque region (B)) and the operating region in which the radial load of the drive shaft (440) is maximum (in the illustrated example, the surging region (D)) are different. In the operating region in which the radial load of the drive shaft (440) is relatively large (in the illustrated example, the turbulence region (C) and the surging region (D)), the load torque of the drive shaft (440) is relatively small. That is, since the load torque of the drive shaft (440) is relatively small in an operating region in which the radial load of the drive shaft (440) is relatively large (in particular, the operating region in which the radial load of the drive shaft (440) is maximum), the electromagnetic force of the bearingless motor (450) can be sufficiently distributed as a support force (a force for supporting the drive shaft (440) in a contactless manner). The findings described above have been obtained as a result of intensive studies made by the inventors of the present invention.

Arrangement of Bearingless Motor and Radial Magnetic Bearing

The bearingless motor (450) is arranged at a position on which a larger radial load than the radial load supported by the radial magnetic bearing (460) is exerted in the axial direction of the drive shaft (440). In the illustrated example, the impeller (421) is connected to one end of the drive shaft (440). The bearingless motor (450) is arranged at a position closer to the impeller (421) than the radial magnetic bearing (460) in the axial direction of the drive shaft (440). As the position in the axial direction of the drive shaft (440) becomes closer to the one end of the drive shaft (440) (that is, the impeller (421)), the radial load of the drive shaft (440) at this position tends to increase. The bearingless motor (450) is arranged at a position closer to the impeller (421) than the radial magnetic bearing (460) in the axial direction of the drive shaft (440). With this configuration, in the turbo compressor (410) in which the impeller (421) is connected to one end of the drive shaft (440), the bearingless motor (450) can be arranged at a position at which the radial load of the drive shaft (440) is relatively large, and the radial magnetic bearing (460) can be arranged at a position at which the radial load of the drive shaft (440) is relatively small.

Advantages of Fourth Embodiment

As described above, in the turbo compressor (410) according to this embodiment, rotational driving and contactless supporting of the drive shaft (440) are performed using the bearingless motor (450) and magnetic bearing (460). This configuration can reduce the size of the turbo compressor (410), compared to a case where a motor that performs only rotational driving of the drive shaft (440) and two magnetic bearings that perform only contactless supporting of the drive shaft (440) are provided in place of the bearingless motor (450).

In the turbo compressor (410) according to this embodiment, furthermore, the bearingless motor (450) is arranged at a position at which the radial load of the drive shaft (440) is relatively large, and the magnetic bearing (460) is arranged at a position at which the radial load of the drive shaft (440) is relatively small. That is, the magnetic bearing (460) is arranged at a position on which a smaller radial load than the radial load supported by the bearingless motor (450) is exerted. The electromagnetic force generated in the magnetic bearing (460) depends on the size (in particular, the axial length or rotor diameter) of the magnetic bearing (460), and the electromagnetic force generated in the magnetic bearing (460) tends to increase as the size of the magnetic bearing (460) increases. Accordingly, arranging the magnetic bearing (460) at a position on which a smaller radial load than the radial load supported by the bearingless motor (450) is exerted can reduce the size (in particular, the axial length or rotor diameter) of the magnetic bearing (460), compared to arranging the magnetic bearing (460) at a position on which a larger radial load than the radial load supported by the bearingless motor (450) is exerted. Thus, the turbo compressor (410) can further be reduced in size.

In the turbo compressor (410) disposed in the refrigerant circuit (510) and configured to compress refrigerant, furthermore, the operating region in which the load torque of the drive shaft (440) (a torque necessary to rotationally drive the drive shaft (440)) is maximum and the operating region in which the radial load of the drive shaft (440) is maximum are different, and the load torque of the drive shaft (440) is relatively small in an operating region in which the radial load of the drive shaft (440) is relatively large (in particular, the operating region in which the radial load of the drive shaft (440) is maximum). Accordingly, in an operating region in which the radial load of the drive shaft (440) is relatively large, the electromagnetic force of the bearingless motor (450) can be sufficiently distributed as a support force (a force for supporting the drive shaft (440) in a contactless manner). This ensures that a support force for the drive shaft (440) can be maintained in an operating region in which the radial load of the drive shaft (440) is relatively large.

First Modification of Bearingless Motor

As illustrated in FIG. 26, the bearingless motor (450) may be configured as an SPM bearingless motor. In the SPM bearingless motor (450) illustrated in FIG. 26, the rotor (451) has a rotor core (452), a plurality of (in the illustrated example, eight) permanent magnets (453) disposed on an outer circumferential surface of the rotor core (452), and a protective member (458) that covers an outer circumference of the plurality of permanent magnets (453). The plurality of permanent magnets (453) are arranged in the circumferential direction of the rotor (451) at predetermined pitch angles. In the illustrated example, the eight permanent magnets (453) are arranged in the circumferential direction of the rotor (451) at pitch angles of 45°. Further, the permanent magnets (453) are formed into a shape (an arc shape) along the outer circumferential surface of the rotor core (452). The eight permanent magnets (453) have the same shape. Each of the eight permanent magnets (453) is configured to have magnetic pole surfaces (the S-pole surface/the N-pole surface) on an outer circumferential surface and an inner circumferential surface thereof such that different magnetic poles (the S pole/the N pole) are alternately arranged on the circumferential direction of the rotor (451). The protective member (458) is formed into a cylindrical shape and is disposed on the outer circumference of the plurality of permanent magnets (453).

Figure 27:
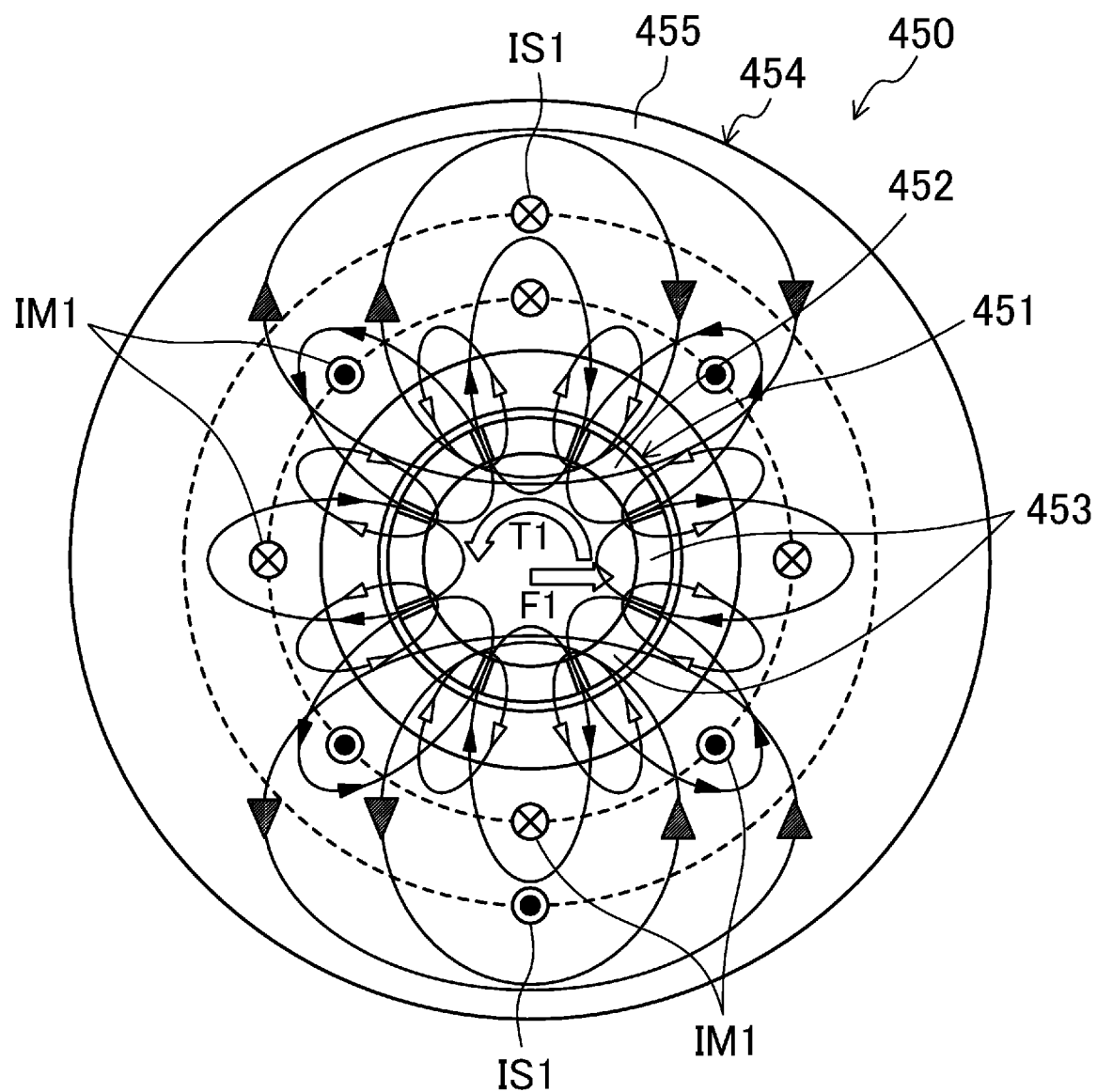
FIG. 27 is a cross-sectional view exemplarily illustrating a magnet magnetic flux, a driving magnetic flux, and a supporting magnetic flux that are generated in the bearingless motor according to the first modification.

FIG. 27 illustrates the magnet magnetic flux $\phi 1$, the driving magnetic flux BM1, and the supporting magnetic flux BS1, which are generated in the SPM bearingless motor (450) illustrated in FIG. 26. Like the consequent-pole bearingless motor (450) illustrated in FIG. 21, the SPM bearingless motor (450) illustrated in FIGS. 26 and 27 is configured such that the driving torque (T1) and the support force (F1) are simultaneously generated by interaction among the magnet magnetic flux $\phi 1$, the driving magnetic flux BM1, and the supporting magnetic flux BS1.

Second Modification of Bearingless Motor

Figure 28:
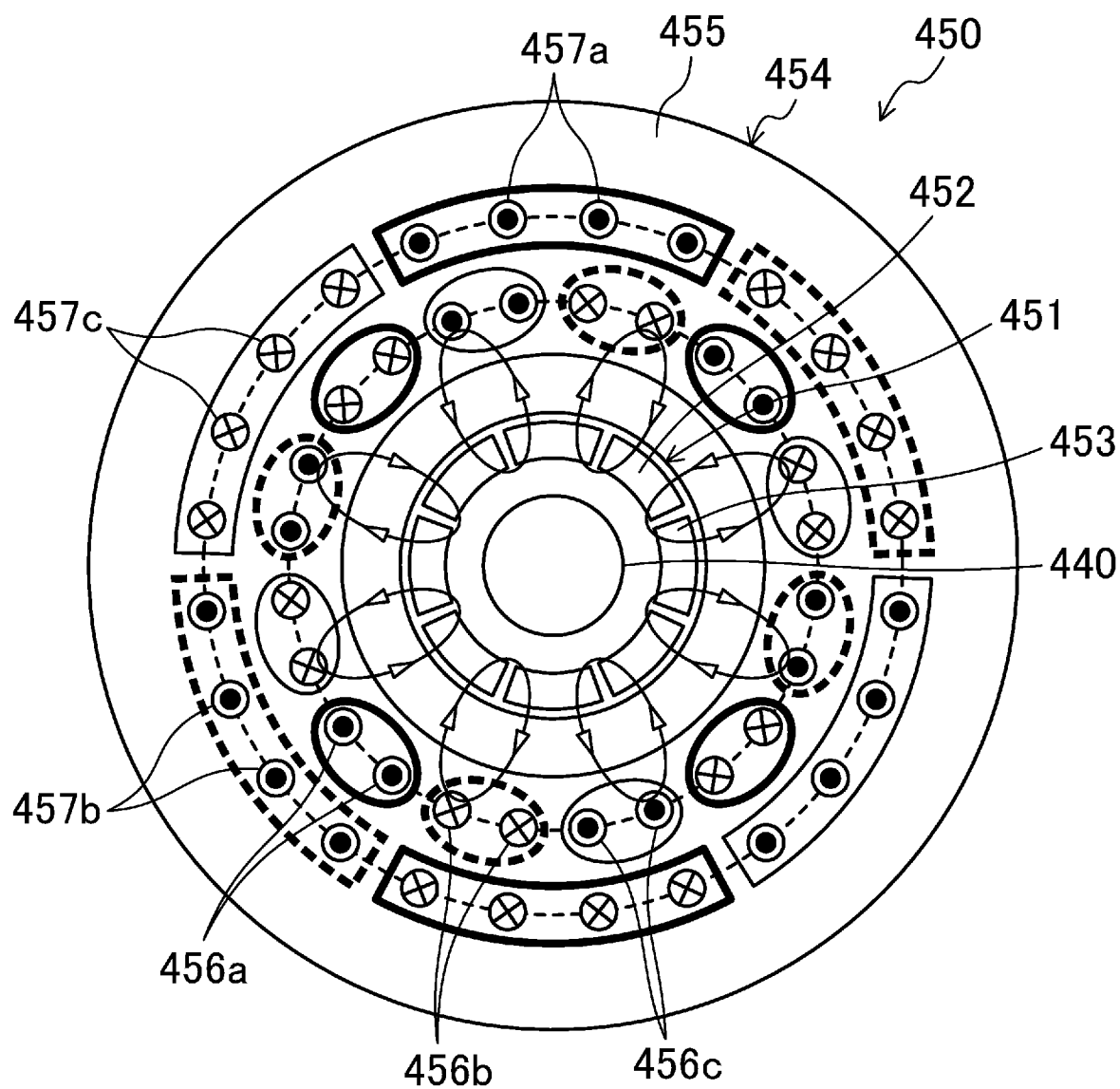
FIG. 28 is a cross-sectional view exemplarily illustrating a bearingless motor according to a second modification.

Alternatively, as illustrated in FIG. 28, the bearingless motor (450) may be configured as an IPM bearingless motor. In the IPM bearingless motor (450) illustrated in FIG. 28, a rotor (451) has a rotor core (452) and a plurality of (in the illustrated example, eight) permanent magnets (453) embedded in the rotor core (452). The plurality of permanent magnets (453) are arranged in the circumferential direction of the rotor (451) at predetermined pitch angles. In the illustrated example, the eight permanent magnets (453) are arranged in the circumferential direction of the rotor (451) at pitch angles of 45°. Further, the permanent magnets (453) are formed into a shape (an arc shape) along the outer circumferential surface of the rotor core (452). The eight permanent magnets (453) have the same shape. Each of the eight permanent magnets (453) is configured to have magnetic pole surfaces (the S-pole surface/the N-pole surface) on an outer circumferential surface and an inner circumferential surface thereof such that different magnetic poles (the S pole/the N pole) are alternately arranged on the circumferential direction of the rotor (451).

FIG. 29 illustrates the magnet magnetic flux $\phi 1$, the driving magnetic flux BM1, and the supporting magnetic flux BS1, which are generated in the IPM bearingless motor (450) illustrated in FIG. 28. Like the consequent-pole bearingless motor (450) illustrated in FIG. 21, the IPM bearingless motor (450) illustrated in FIGS. 28 and 29 is configured such that the driving torque (T1) and the support force (F1) are simultaneously generated by interaction among the magnet magnetic flux $41$, the driving magnetic flux BM1, and the supporting magnetic flux BS1.

Comparison Between Various Bearingless Motors

The bearingless motor (450) is preferably configured as a consequent-pole bearingless motor or an IPM bearingless motor.

The consequent-pole bearingless motor (450) and the SPM bearingless motor (450) are compared. In the SPM bearingless motor (450) illustrated in FIGS. 26 and 27, the magnetic path of the supporting magnetic flux BS1 is a path that passes through the permanent magnets (453), whereas in the consequent-pole bearingless motor (450) illustrated in FIGS. 21 to 24, the magnetic path of the supporting magnetic flux BS1 is a path that does not pass through the permanent magnets (453). The magnetic resistances of the permanent magnets (453) are greater than the magnetic resistance of the rotor core (452). Thus, the consequent-pole bearingless motor (450) has a lower magnetic resistance for the magnetic path of the supporting magnetic flux BS1 than the SPM bearingless motor (450). Accordingly, the consequent-pole bearingless motor (450) is capable of generating a larger support force (a force for supporting the drive shaft (440) in a contactless manner) than the SPM bearingless motor (450).

The IPM bearingless motor (450) and the SPM bearingless motor (450) are compared. The SPM bearingless motor (450) illustrated in FIGS. 26 and 27 is provided with the protective member (458), whereas the IPM bearingless motor (450) illustrated in FIGS. 28 and 29 is not provided with the protective member (458). Thus, the IPM bearingless motor (450) has a lower magnetic resistance for the magnetic path of the supporting magnetic flux BS1 than the SPM bearingless motor (450). Accordingly, the IPM bearingless motor (450) is capable of generating a larger support force (a force for supporting the drive shaft (440) in a contactless manner) than the SPM bearingless motor (450).

As described above, the bearingless motor (450) configured as a consequent-pole bearingless motor or an IPM bearingless motor can generate a larger support force (a force for supporting the drive shaft (440) in a contactless manner) than the bearingless motor (450) configured as an SPM bearingless motor.

Fifth Embodiment of Invention

Figure 30:
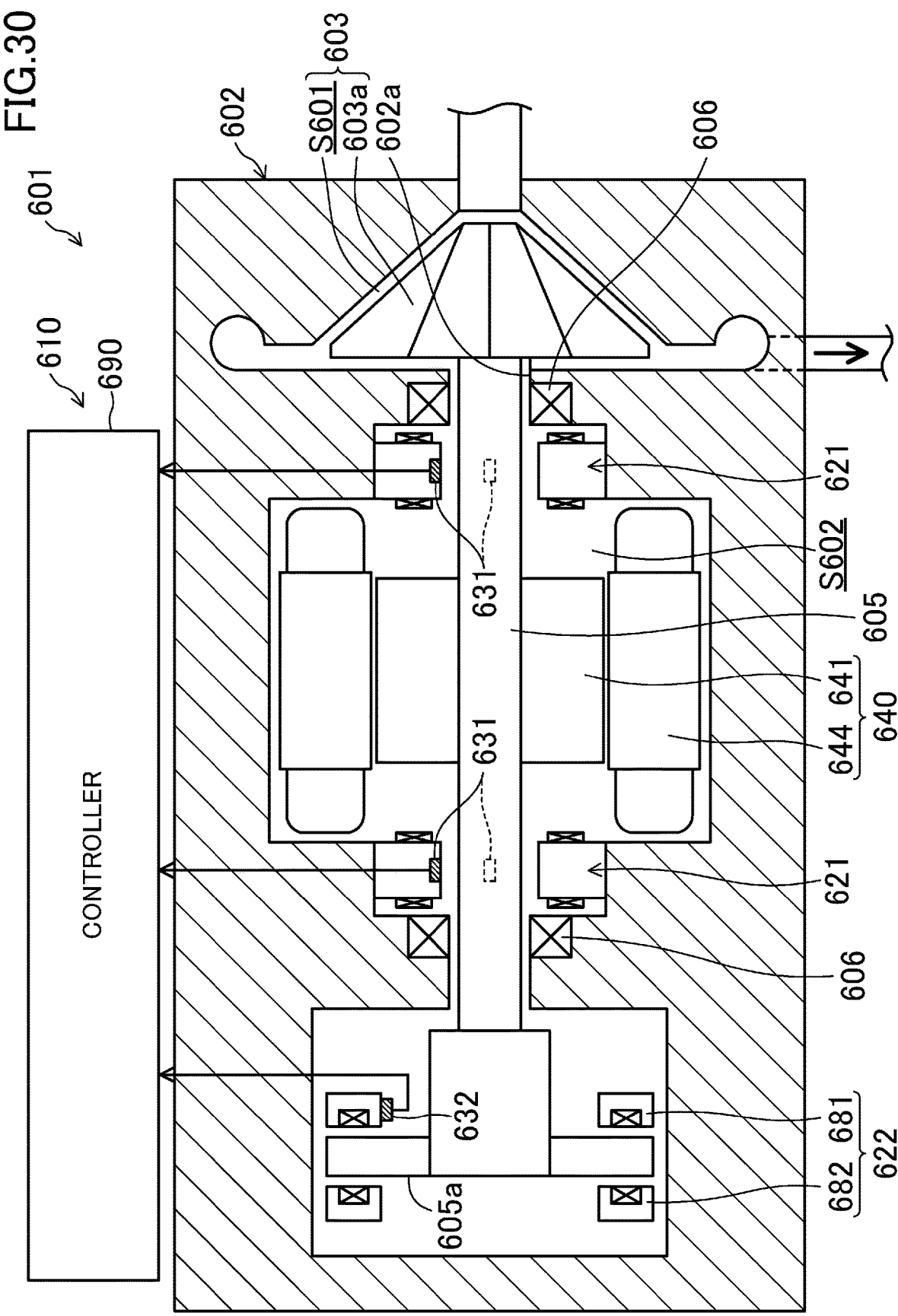
FIG. 30 illustrates an example configuration of a turbo compressor according to a fifth embodiment of the present invention.

A fifth embodiment of the present invention will be described. In this embodiment, a turbo compressor including a magnetic bearing will be described. FIG. 30 illustrates an example configuration of a turbo compressor (601) according to the fifth embodiment of the present invention. The turbo compressor (601) is connected to a refrigerant circuit (not illustrated) that performs a refrigeration cycle operation by circulating refrigerant therethrough, and compresses refrigerant (fluid). As illustrated in FIG. 30, the turbo compressor (601) includes a casing (602), a compression mechanism (603), and an electric motor system (610).

Casing

The casing (602) is shaped into a cylinder having both ends closed and is arranged such that the axis line of the cylinder is directed horizontally. The inner space of the casing (602) is partitioned by a wall portion (602a), with the space to the right of the wall portion (602a) forming an impeller chamber (S601) that accommodates an impeller (603a) (described below) and the space to the left of the wall portion (602a) forming an electric motor chamber (S602) that accommodates a bearingless motor (640) (described below). A drive shaft (605) extending in the axial direction through the casing (602) couples the compression mechanism (603) and the bearingless motor (640) to each other.

Compression Mechanism

The compression mechanism (603) is constituted by the impeller chamber (S601) and the impeller (603a). The compression mechanism (603) compresses fluid (in the illustrated example, refrigerant). The impeller (603a) is formed with a plurality of blades so as to have a substantially conical outer shape, and is fixed to an end of the drive shaft (605). The compression mechanism (603) is an example of a load of the present invention.

Electric Motor System

The electric motor system (610) includes touch-down bearings (606), the bearingless motor (640), a power source (635) (not illustrated in FIG. 30), two radial magnetic bearings (621), a thrust magnetic bearing (622), a plurality of (in the illustrated example, five) displacement sensors (631, 632), and a controller (690).

Bearingless Motor

The bearingless motor (640) is arranged in the electric motor chamber (S602). The bearingless motor (640) is configured to rotationally drive the drive shaft (605) by using an electromagnetic force and to support the radial load of the drive shaft (605) in a contactless manner by using the electromagnetic force. The bearingless motor (640) has a rotor-stator pair constituted by a rotor (641) and a stator (644). The rotor (641) is fixed to the drive shaft (605), and the stator (644) is fixed to an inner circumferential wall of the casing (602).

Figure 31:
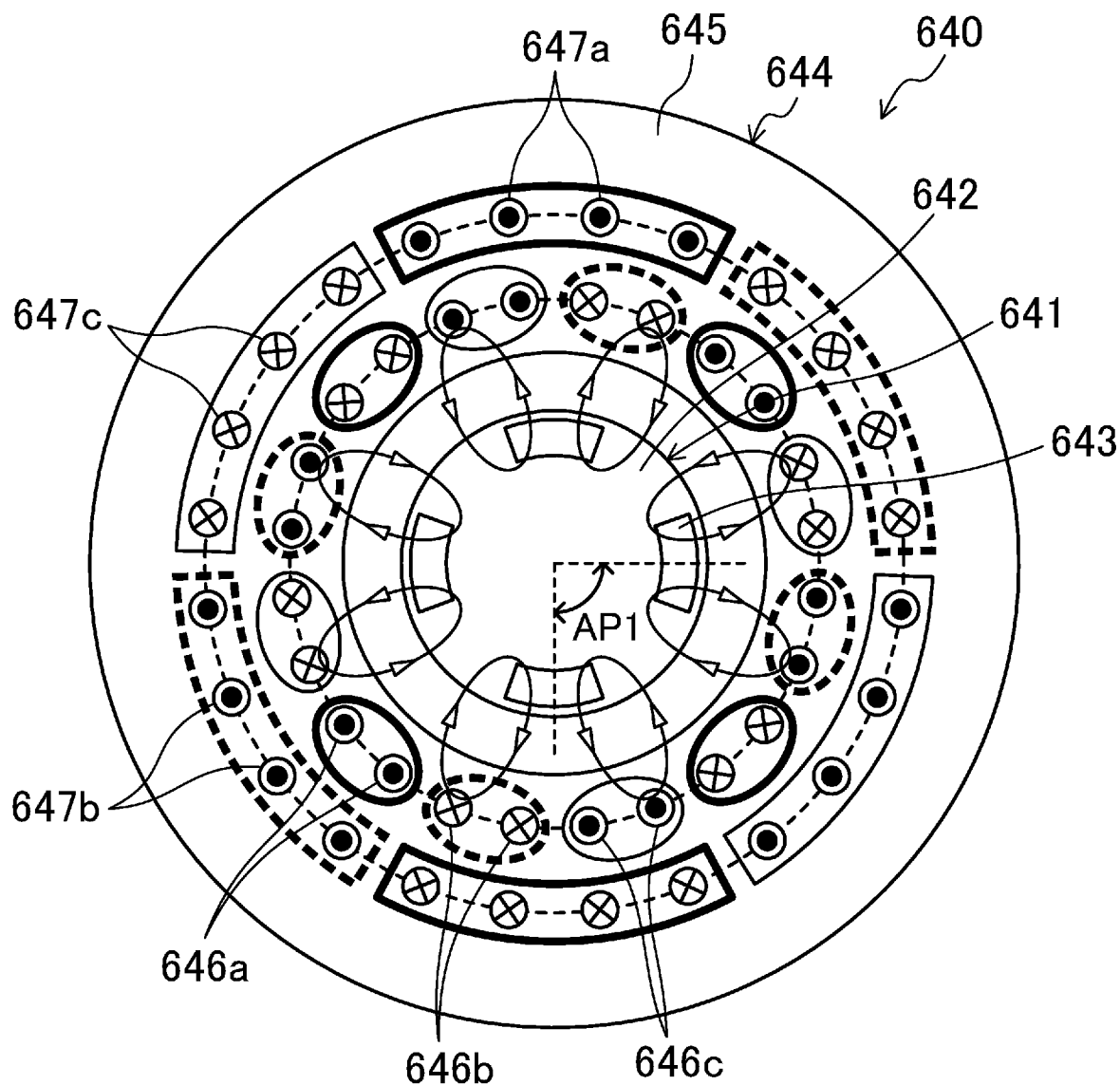
FIG. 31 is a cross-sectional view illustrating an example configuration of a bearingless motor.

FIG. 31 is a cross-sectional view illustrating an example configuration of the bearingless motor (640). As illustrated in FIG. 31, the bearingless motor (640) is a consequent-pole bearingless motor. The stator (644) of the bearingless motor (640) has a back yoke portion (645), a plurality of tooth portions (not illustrated), and drive coils (646a to 646c) and support coils (647a to 647c) that are wound around the tooth portions. The rotor (641) of the bearingless motor (640) has a core portion (642) and a plurality of (in the illustrated example, four) permanent magnets (643) embedded in the core portion (642).

The stator (644) is formed of a magnetic material (for example, layered steel plates). The back yoke portion (645) of the stator (644) is formed into a cylindrical shape. The drive coils (646a to 646c) and the support coils (647a to 647c) are wound around the respective tooth portions by using a distributed winding method. The drive coils (646a to 646c) and the support coils (647a to 647c) may be wound around the respective tooth portions by using a concentrated winding method.

The drive coils (646a to 646c) are coils wound on the inner circumferential side of the tooth portions. The drive coils (646a to 646c) are constituted by U-phase drive coils (646a) in portions enclosed by the thick solid line in FIG. 31, V-phase drive coils (646b) in portions enclosed by the thick broken line, and W-phase drive coils (646c) in portions enclosed by the thin solid line.

The support coils (647a to 647c) are coils wound on the outer circumferential side of the tooth portions. The support coils (647a to 647c) are constituted by U-phase support coils (647a) in portions enclosed by the thick solid line in FIG. 31, V-phase support coils (647b) in portions enclosed by the thick broken line, and W-phase support coils (647c) in portions enclosed by the thin solid line.

The core portion (642) of the rotor (641) is formed into a cylindrical shape. The core portion (642) has a shaft hole (not illustrated) formed therein at a center portion thereof, through which the drive shaft (605) extends. The core portion (642) is formed of a magnetic material (for example, layered steel plates). Near an outer circumferential surface of the core portion (642), the four permanent magnets (643) having a shape along the outer circumferential surface are embedded in the circumferential direction of the rotor (641) at pitch angles (AP1) of 90°. The four permanent magnets (643) have the same shape. The side of each of the permanent magnets (643) nearer the outer circumferential surface is the N pole, and the S pole is formed in a pseudo manner on the outer circumferential surface of the core portion (642) between the permanent magnets (643). The side of each of the permanent magnets (643) nearer the outer circumferential surface may be the S pole.

FIG. 32 illustrates a magnet magnetic flux $\phi 1$ generated by the permanent magnets (643) and a driving magnetic flux BM1 generated to rotationally drive the impeller (603a) and the drive shaft (605) in the bearingless motor (640). The bearingless motor (640) is configured such that a driving torque T1 illustrated in FIG. 32 (that is, a torque that allows the drive shaft (605) to rotate in the counterclockwise direction in FIG. 32) is generated by interaction between the magnet magnetic flux φ1 and the driving magnetic flux BM1. In FIG. 32, current IM1 equivalent to the current flowing through the drive coils (646a to 646c) is illustrated.

Figure 33:
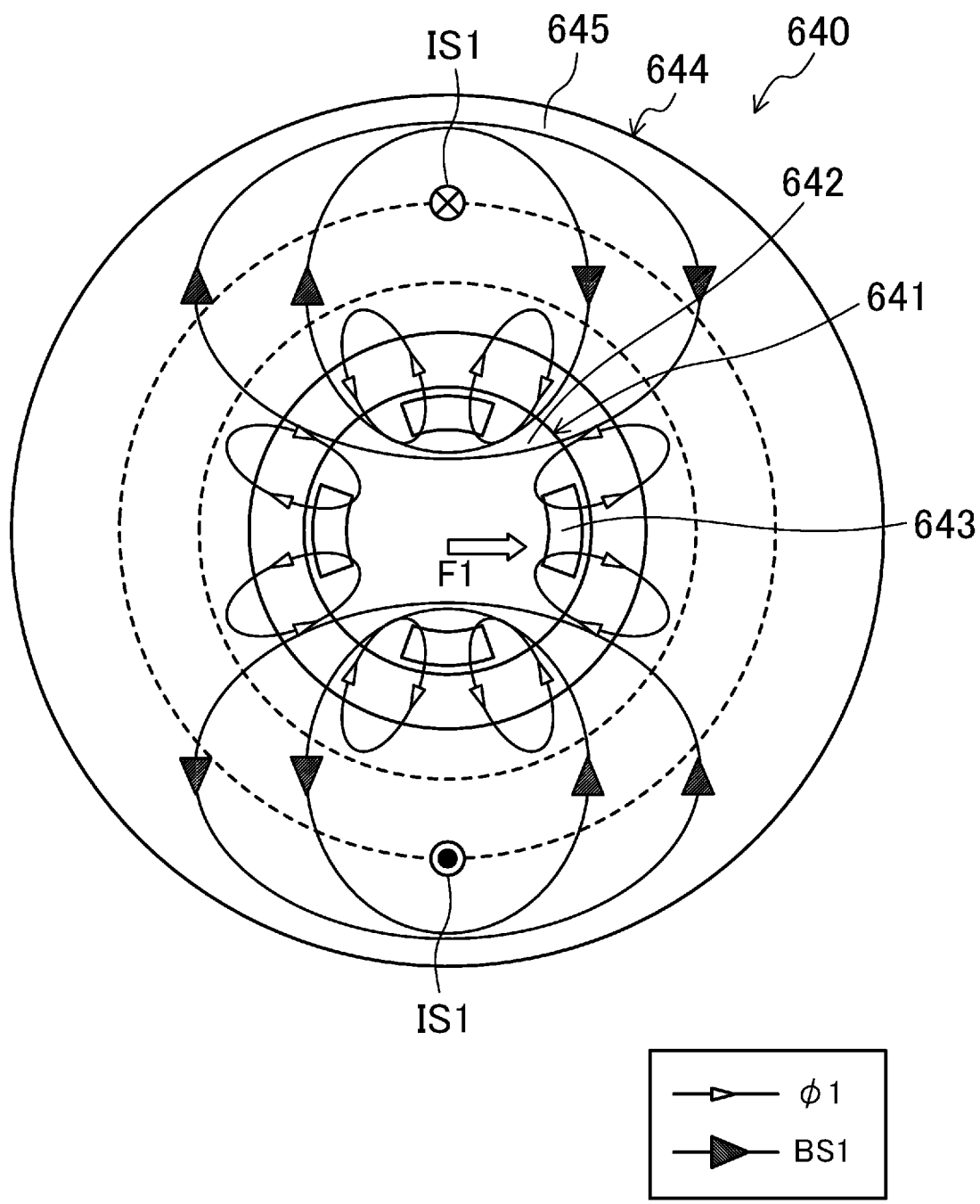
FIG. 33 is a cross-sectional view of the bearingless motor, and illustrates the magnet magnetic flux and a supporting magnetic flux.

FIG. 33 illustrates the magnet magnetic flux φ1 of generated by the permanent magnets (643) and a supporting magnetic flux BS1 generated to support the radial load of the drive shaft (605) in a contactless manner in the bearingless motor (640). The bearingless motor (640) is configured such that a support force F1 illustrated in FIG. 33 (that is, a force for pressing the drive shaft (605) to the right in FIG. 33) is generated by interaction between the magnet magnetic flux φ1 and the supporting magnetic flux BS1. In FIG. 33, current IS1 equivalent to the current flowing through the support coils (647a to 647c) is illustrated.

As can be seen from FIG. 33, the magnetic path of the supporting magnetic flux BS1 is a path that passes through the back yoke portion (645) and the tooth portions of the stator (644), air gaps, and the core portion (642) of the rotor (641). The magnetic resistances of the back yoke portion (645), the tooth portions, and the core portion (642) are smaller than the magnetic resistances of the permanent magnets (643).

FIG. 34 illustrates the magnet magnetic flux φ1 generated by the permanent magnets (643), the driving magnetic flux BM1 generated to rotationally drive the impeller (603a) and the drive shaft (605), and the supporting magnetic flux BS1 generated to support the radial load of the drive shaft (605) in a contactless manner in the bearingless motor (640). The bearingless motor (640) is configured such that the driving torque T1 and the support force F1 illustrated in FIG. 34 are simultaneously generated by interaction among the magnet magnetic flux φ1, the driving magnetic flux BM1, and the supporting magnetic flux BS1. In FIG. 34, the currents IM1 and IS1 equivalent to the currents flowing through the drive coils (646a to 646c) and the support coils (647a to 647c) are illustrated.

Radial Magnetic Bearing

The electric motor system (610) has the two radial magnetic bearings (621), and each of the radial magnetic bearings (621) is arranged on either side of the bearingless motor (640) in the axial direction. Each of the radial magnetic bearings (621) has electromagnets (671 to 678) that face each other with a supported body (specifically, the drive shaft (605)) interposed therebetween, and is configured such that the resultant of the electromagnetic forces (a combined electromagnetic force (F)) of the electromagnets (671 to 678) allows radial forces to act on the supported body. In each of the radial magnetic bearings (621), the current flowing through the electromagnets (671 to 678) is controlled to control the combined electromagnetic force (F) of the electromagnets (671 to 678), thereby controlling the position of the supported body in the directions in which the electromagnets (671 to 678) face each other. In the following description, if the two radial magnetic bearings (621) need to be distinguished from each other, they are sometimes identified from each other by using reference numerals suffixed by numeral classifiers (specifically, 621-1 and 621-2).

Figure 35:
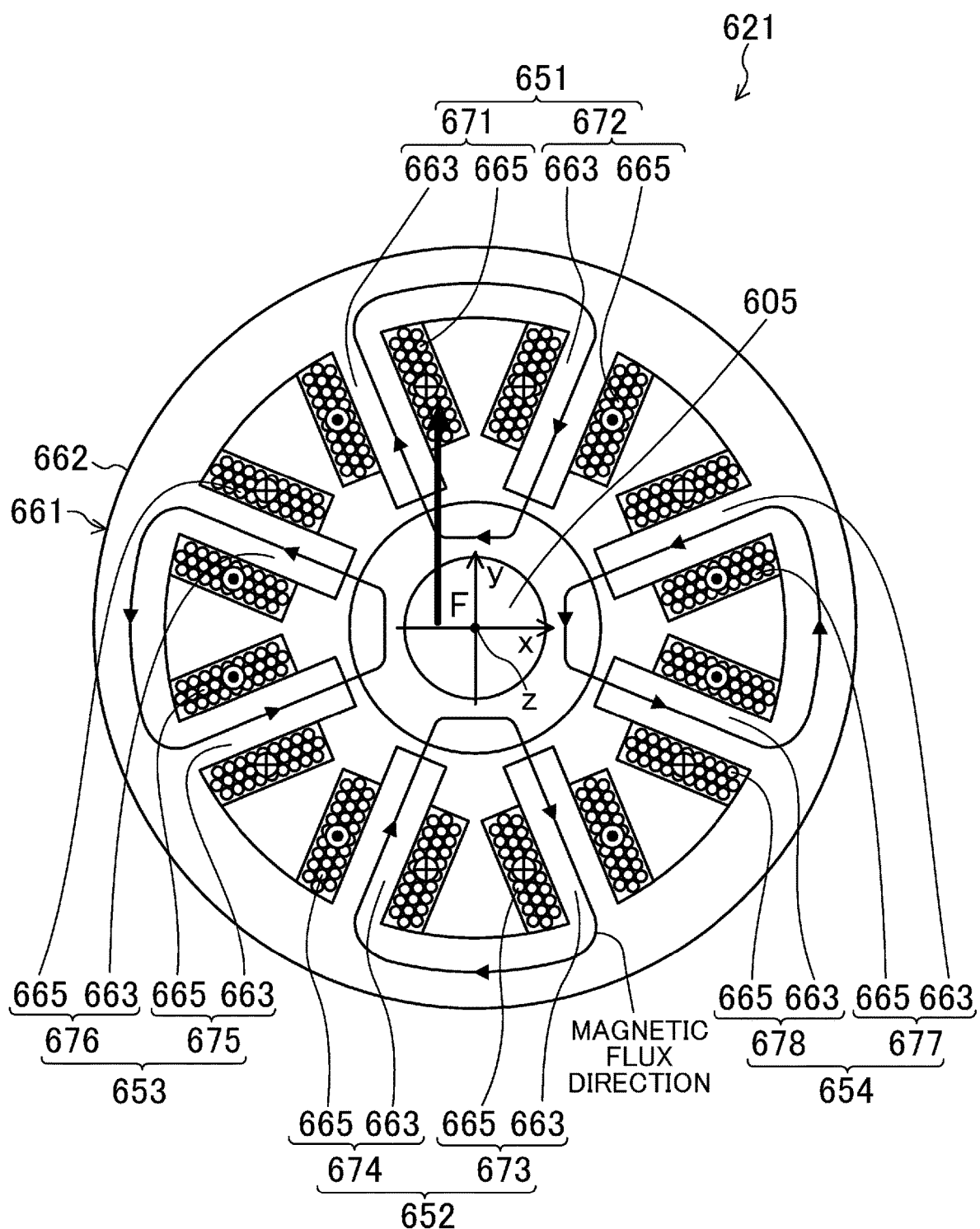
FIG. 35 is a cross-sectional view illustrating an example configuration of a radial magnetic bearing.
Figure 36:
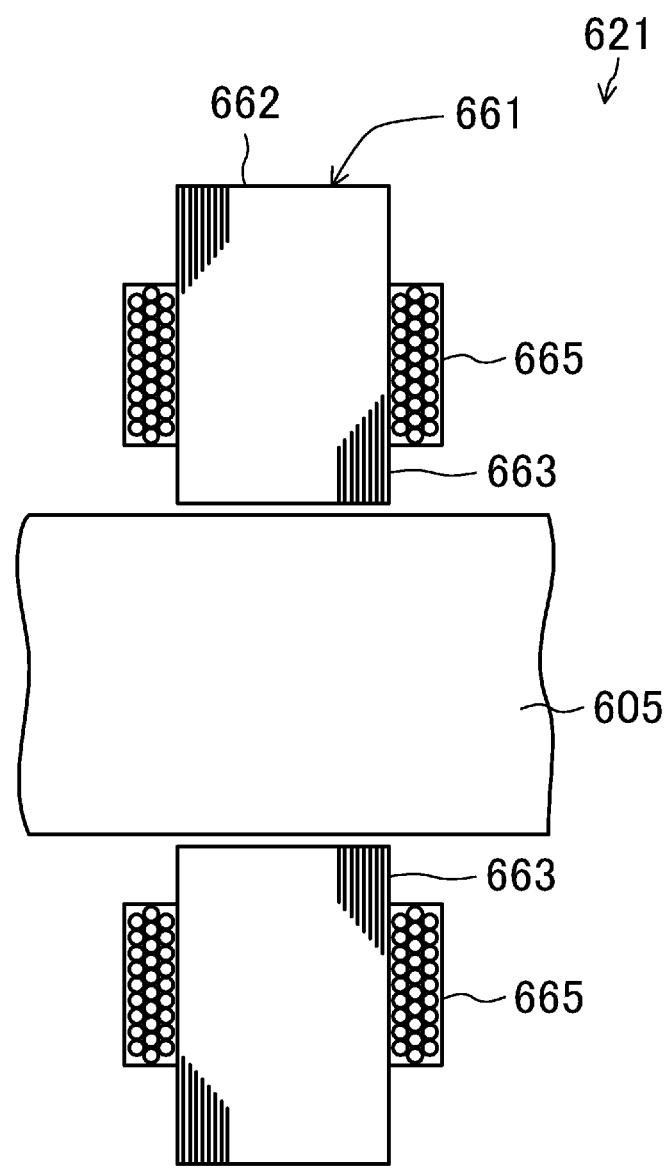
FIG. 36 is a longitudinal sectional view illustrating an example configuration of the radial magnetic bearing.

FIG. 35 is a cross-sectional view illustrating an example configuration of each of the radial magnetic bearings (621). FIG. 36 is a longitudinal sectional view illustrating an example configuration of each of the radial magnetic bearings (621). The illustrated radial magnetic bearing (621) is a heteropolar radial magnetic bearing, and includes a magnetic bearing core (661) and eight coils (665). The magnetic bearing core (661) is formed by, for example, stacking a plurality of electromagnetic steel plates on top of each other, and has a back yoke (662) and eight teeth (663). The back yoke (662) is formed into a cylindrical shape. The eight teeth (663) are arranged along an inner circumferential surface of the back yoke (662) at predetermined intervals (in the illustrated example, at intervals of 45°) in the circumferential direction. The teeth (663) project inward in the radial direction from the inner circumferential surface of the back yoke (662), and each have an inner circumferential surface (projecting end surface) that faces an outer circumferential surface of a supported portion of the drive shaft (605) with a predetermined gap interposed therebetween.

The eight coils (665) are wound around the eight teeth (663) of the magnetic bearing core (661), respectively. In the radial magnetic bearings (621), accordingly, eight electromagnets (the first to eighth electromagnets (671 to 678)) are formed. Specifically, in the radial magnetic bearings (621), the first electromagnet (671), the second electromagnet (672), the seventh electromagnet (677), the eighth electromagnet (678), the third electromagnet (673), the fourth electromagnet (674), the fifth electromagnet (675), and the sixth electromagnet (676) are arranged in the clockwise direction in FIG. 35 in this order. The winding direction of the coils (665) in the electromagnets (671 to 678) and the direction of current flowing through the coils (665) are set so that magnetic fluxes are generated in directions indicated by arrows in FIG. 35.

In each of the radial magnetic bearings (621), as illustrated in FIGS. 35 and 36, the first electromagnet (671) and the second electromagnet (672) are connected in series with each other to form a first electromagnet pair (651), and the third electromagnet (673) and the fourth electromagnet (674) are connected in series with each other to form a second electromagnet pair (652). Further, the fifth electromagnet (675) and the sixth electromagnet (676) are connected in series with each other to form a third electromagnet pair (653), and the seventh electromagnet (677) and the eighth electromagnet (678) are connected in series with each other to form a fourth electromagnet pair (654).

As illustrated in FIG. 35, the first and second electromagnet pairs (651, 652) face each other with the supported portion of the drive shaft (605) interposed therebetween, and support the supported portion of the drive shaft (605) in a contactless manner by using a combined electromagnetic force (F) of the first and second electromagnet pairs (651, 652). Likewise, the third and fourth electromagnet pairs (653, 654) also face each other with the supported portion of the drive shaft (605) interposed therebetween, and support the supported portion of the drive shaft (605) in a contactless manner by using a combined electromagnetic force (F) of the third and fourth electromagnet pairs (653, 654). The direction in which the third and fourth electromagnet pairs (653, 654) face each other (in FIG. 35, the left-right direction) is perpendicular to the direction in which the first and second electromagnet pairs (651, 652) face each other (in FIG. 35, the up-down direction) in plan view.

Figure 37:
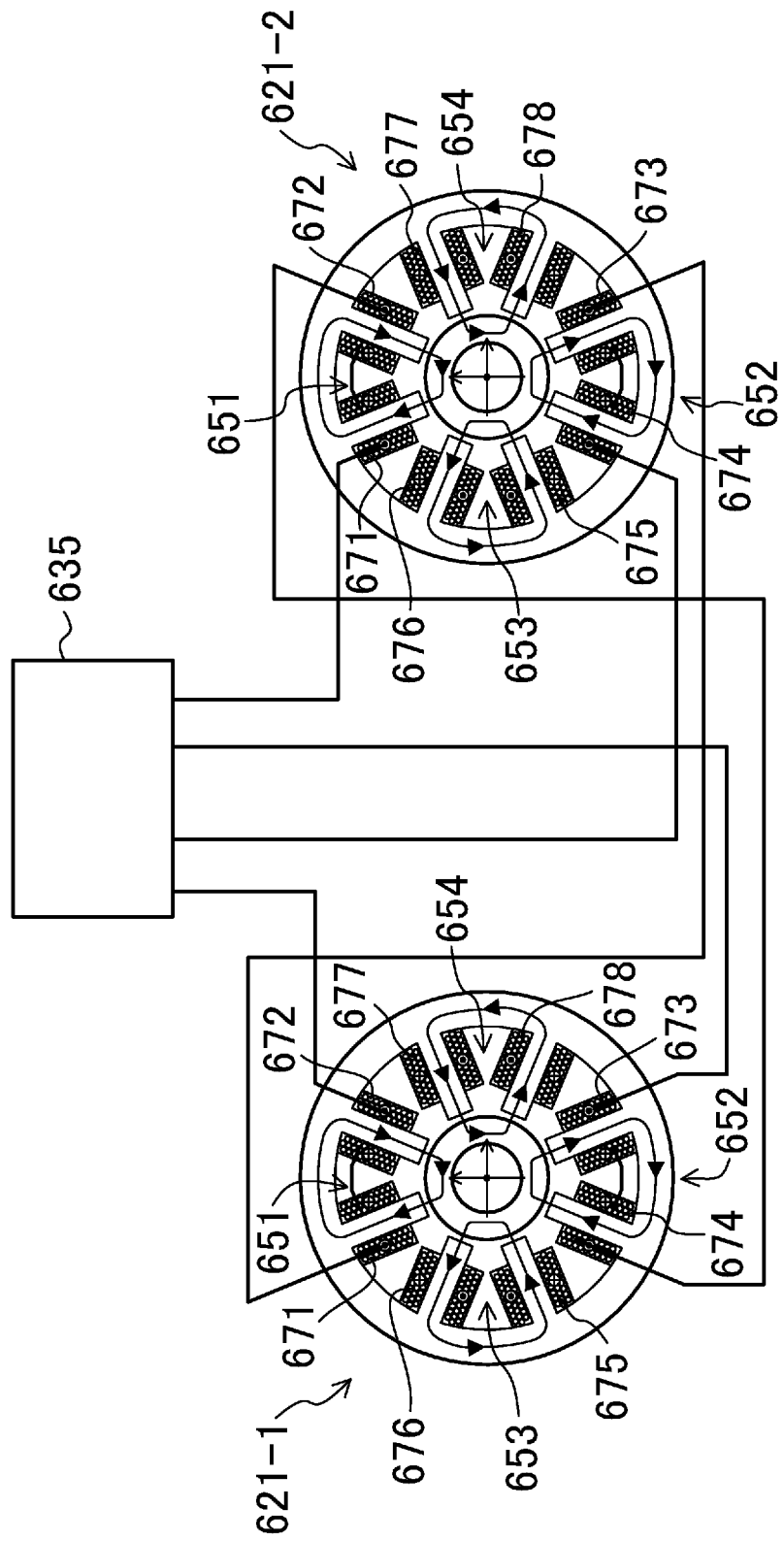
FIG. 37 illustrates the state of connections between two radial magnetic bearings.

In the electric motor system (610), the electromagnet pairs (651 to 654) of one of the two radial magnetic bearings (621) are connected to the electromagnet pairs (651 to 654) of the other of the two radial magnetic bearings (621). FIG. 37 illustrates the state of connections between the two radial magnetic bearings (621). In the electric motor system (610), as illustrated in FIG. 37, the first electromagnet pair (651) in one radial magnetic bearing (621-1) and the second electromagnet pair (652) in the other radial magnetic bearing (621-2) are connected in series with each other. The second electromagnet pair (652) in the one radial magnetic bearing (621-1) and the first electromagnet pair (651) in the other radial magnetic bearing (621-2) are connected in series with each other.

In the electric motor system (610), although not illustrated in FIG. 37, the third electromagnet pair (653) in the one radial magnetic bearing (621-1) and the fourth electromagnet pair (654) in the other radial magnetic bearing (621-2) are further connected in series with each other. The fourth electromagnet pair (654) in the one radial magnetic bearing (621-1) and the third electromagnet pair (653) in the other radial magnetic bearing (621-2) are further connected in series with each other. That is, the electric motor system (610) includes four series-connected pairs of electromagnet pairs (651 to 654). The four series-connected pairs of electromagnet pairs (651 to 654) are supplied with direct current from separate output channels (described below) of the power source (635). In FIG. 37, only two output channels of the power source (635) are illustrated.

Thrust Magnetic Bearing

The electric motor system (610) is provided with one thrust magnetic bearing (622). The thrust magnetic bearing (622) has a pair of electromagnets that face each other with a supported body (specifically, a disk portion (605a) described below) interposed therebetween, and is configured to support the supported body in a contactless manner by using a combined electromagnetic force (F) of the pair of electromagnets.

Specifically, as illustrated in FIG. 30, the thrust magnetic bearing (622) includes a first and second electromagnets (681, 682). The drive shaft (605) has a disk-shaped portion (hereinafter referred to as the disk portion (605a)) at the other end thereof (the end on the opposite side to the one end to which the impeller (603a) is fixed). The first and second electromagnets (681, 682) face each other with the disk portion (605a), which is the supported portion of the drive shaft (605), interposed therebetween, and support the supported portion (the disk portion (605a)) of the drive shaft (605) in a contactless manner by using a combined electromagnetic force of the first and second electromagnets (681, 682). That is, by controlling the current flowing through the first and second electromagnets (681, 682), the thrust magnetic bearing (622) can control the position of the supported portion (the disk portion (605a)) of the drive shaft (605) in the direction in which the first and second electromagnets (681, 682) face each other (that is, in the axial direction (hereinafter also referred to as the thrust direction), or the left-right direction in FIG. 30).

Power Source

The power source (635) supplies direct current to the electromagnets (671 to 678, 681, 682) of the magnetic bearings (621, 622). In the illustrated example, the power source (635) includes four output channels for the radial magnetic bearings (621). That is, the power source (635) separately supplies direct current to the four series-connected pairs of electromagnet pairs (651 to 654). The power source (635) further includes two output channels for the thrust magnetic bearing (622). Specifically, the power source (635) includes an output channel for the first electromagnet (681) and an output channel for the second electromagnet (682). The power source (635) is configured to be capable of separately controlling the voltages of the respective output channels. The power source (635) is not limited to any specific type, and may be implemented as a power source device having any of a variety of configurations.

Touch-Down Bearings

The touch-down bearings (606) are configured to support the drive shaft (605) in the radial direction and the thrust direction when the electric motor system (610) is not energized (that is, when the drive shaft (605) is not levitated).

Displacement Sensors

As illustrated in FIG. 30, the turbo compressor (601) is provided with two types of displacement sensors, namely, radial displacement sensors (631) and a thrust displacement sensor (632). In the illustrated example, the radial displacement sensors (631) and the thrust displacement sensor (632) are each an eddy-current displacement sensor. The displacement sensors (631, 632) are provided in association with (or adjacent to) two electromagnet pairs (for example, the pairs of first and second electromagnet pairs (651, 652)) that face each other with a supported body (in the illustrated example, the drive shaft (605)) interposed therebetween. The displacement sensors (631, 632) are configured to detect gaps (g) between the drive shaft (605) and the displacement sensors (631, 632) at the positions at which the displacement sensors (631, 632) are placed.

In the electric motor system (610), two radial displacement sensors (631) are provided for each of the radial magnetic bearings (621). That is, the turbo compressor (601) includes four radial displacement sensors (631). The radial displacement sensors (631) detect gaps (g) between the drive shaft (605) and the radial displacement sensors (631). In each of the radial magnetic bearings (621), one of the radial displacement sensors (631) detects the gap (g) in the direction in which the first electromagnet pair (651) and the second electromagnet pair (652) face each other (hereinafter referred to as the Y direction). The Y direction is the radial direction of the radial magnetic bearings (621) and is the up-down direction in FIG. 35. The other radial displacement sensor (631) detects the gap (g) in the direction in which the third electromagnet pair (653) and the fourth electromagnet pair (654) face each other (that is, a radial direction perpendicular to the Y direction (this radial direction is hereinafter referred to as the X direction) and is the left-right direction in FIG. 35).

The turbo compressor (601) is provided with one thrust displacement sensor (632). The thrust displacement sensor (632) detects a gap (g) at the thrust magnetic bearing (622) in the direction in which the first electromagnet (681) and the second electromagnet (682) face each other (that is, the axial direction of the drive shaft (605), or the left-right direction in FIG. 30). In the following, the axial direction of the drive shaft (605) is referred to sometimes as the Z direction.

Controller

The controller (690) controls the bearingless motor (640) and the magnetic bearings (621, 622) so that a supported body (in the illustrated example, the supported portion of the drive shaft (605)) can be supported in a contactless manner. Specifically, the controller (690) controls the electromagnetic forces of the bearingless motor (640) and the magnetic bearings (621, 622) to control the levitation of the drive shaft (605). The controller (690) can be constituted by, specifically, a microcomputer, a memory device that stores software for activating the microcomputer, and so on.

Position Control of Drive Shaft

In this embodiment, the bearingless motor (640) mainly serves to control displacement in the radial direction of the drive shaft (605) (the X direction and the Y direction, hereinafter also referred to sometimes as the translational direction) (this control is hereinafter referred to as radial direction control), and the two radial magnetic bearings (621) mainly serve to control displacement in a tilt direction of the drive shaft (605) (displacement in the rotational direction about the X axis or the Y axis) (this control is hereinafter referred to as tilt direction control). As used here, the X axis is an axis extending in the X direction and passing through the center of gravity of the entire rotating system including the bearingless motor (640), and the Y axis is an axis extending in the Y direction and passing through the center of gravity. The center of rotation when a displacement occurs in the tilt direction can be considered to be the center of gravity of the entire rotating system including the bearingless motor (640).

In the radial direction control according to this embodiment, the controller (690) reads the gap (g) in the X direction and the gap (g) in the Y direction from the radial displacement sensors (631). For example, the controller (690) calculates a displacement of the drive shaft (605) in the radial direction (here, an X-direction displacement) at the position of the rotor (641) of the bearingless motor (640) from the detection values of the radial displacement sensors (631) for the X direction, which correspond to one of the radial magnetic bearings (621), and the detection values of the radial displacement sensors (631) for the X direction, which correspond to the other radial magnetic bearing (621). The controller (690) also calculates a Y-direction displacement of the drive shaft (605).

Further, the controller (690) controls the electromagnetic force of the bearingless motor (640) in the X direction (more specifically, the supporting magnetic flux BS1) by using an algorithm such as a feedback control (for example, so-called Proportional-Integral-Derivative (PID) control) algorithm in accordance with the determined X-direction displacement to control the position of the drive shaft (605) in the X direction (radial direction) to a target position. The target position is, for example, the center of the stator (644) of the bearingless motor (640) in the X direction. The controller (690) also performs control for the Y direction (radial direction) to control the electromagnetic force of the bearingless motor (640) in the Y direction in a similar way to control the position of the drive shaft (605) in the Y direction (radial direction) to the target position.

The controller (690) also controls a displacement of the drive shaft (605) in the tilt direction. For tilt direction control, the controller (690) determines a displacement in the tilt direction. A displacement in the tilt direction represents a displacement angle about the center of rotation, and is hereinafter referred to also as the tilt displacement angle. The controller (690) determines a tilt displacement angle (θx) about the X axis using Equation (1) as follows.

$$\theta x = (g1 - g2)/L \quad \text{Equation (1)}$$

In Equation (1), g1 denotes a detection value of a radial displacement sensor (631) for the Y direction, which corresponds to one of the radial magnetic bearings (621), g2 denotes a detection value of a radial displacement sensor (631) for the Y direction, which corresponds to the other radial magnetic bearing (621), and L denotes the distance between the two radial displacement sensors (631) for the Y direction in the Z direction (called a total length L).

Figure 38:
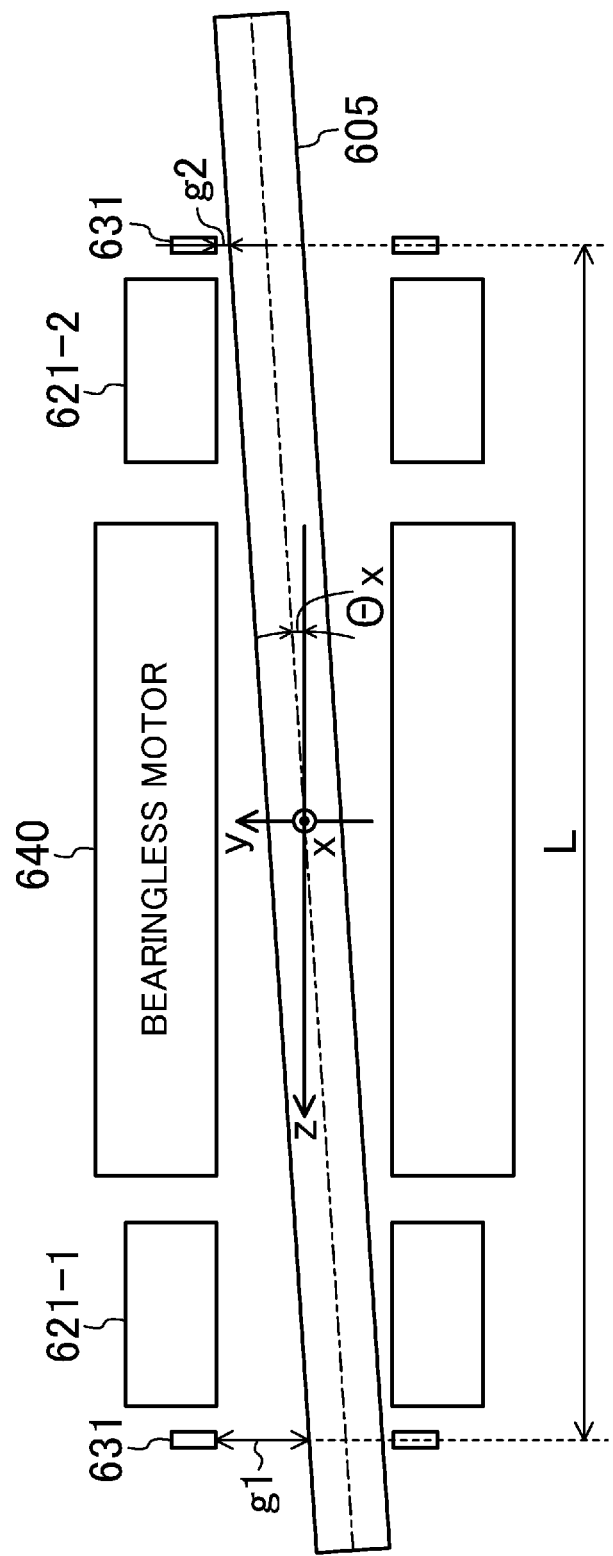
FIG. 38 illustrates a relationship among a tilt displacement angle, gaps detected by respective sensors, and a total length.

FIG. 38 illustrates a relationship among the tilt displacement angle (θx), the gaps (g1, g2) detected by the respective sensors, and the total length L. As can be seen from FIG. 38, when g1 and g2 are much smaller than L, it is possible to approximate to tan(θx)=θx, for which Equation (1) holds true. Likewise, the controller (690) also calculates a tilt displacement angle (θy) about the Y axis. The tilt displacement angle (θy) about the Y axis can be determined using the detection values of the radial displacement sensors (631) for the X direction, which correspond to one of the radial magnetic bearings (621), the detection values of the radial displacement sensors (631) for the X direction, which correspond to the other radial magnetic bearing (621), and the distance between the two radial displacement sensors (631) for the X direction in the Z direction (that is, the total length L). The tilt displacement angle (θy) can also be calculated by using an approximate expression similar to that for Equation (1).

When the tilt displacement angle (θx) is determined, the controller (690) controls the first and second electromagnet pairs (651, 652) of each of the radial magnetic bearings (621), more specifically, the first to fourth electromagnets (671, 672, 673, 674), in accordance with the deviation of the determined tilt displacement angle (θx) from the target value (for example, zero degrees) of the tilt displacement angle (θx) by using an algorithm such as a feedback control (for example, so-called PID control) algorithm. In the electric motor system (610), as illustrated in FIG. 37, the first electromagnet pair (651) in one of the radial magnetic bearings (621) and the second electromagnet pair (652) in the other radial magnetic bearing (621) are connected in series with each other. Accordingly, during feedback control, the two radial magnetic bearings (621) generate combined electromagnetic forces (F) having phases opposite to each other for the Y direction. That is, the Y-direction displacement of the drive shaft (605) for one of the radial magnetic bearings (621) and the Y-direction displacement of the drive shaft (605) for the other radial magnetic bearing (621) are opposite to each other, and the drive shaft (605) is displaced (rotated) in the tilt direction (about the X axis).

Likewise, the controller (690) controls the third and fourth electromagnet pairs (653, 654), that is, the fifth to eighth electromagnets (675, 676, 677, 678), in accordance with the deviation of the determined tilt displacement angle (θy) from the target value (for example, zero degrees) of the tilt displacement angle (θy) by using a feedback control algorithm, for example. In the electric motor system (610), the third electromagnet pair (653) in the other radial magnetic bearing (621) and the fourth electromagnet pair (654) in the one radial magnetic bearing (621) are connected in series with each other. Accordingly, during feedback control, the two radial magnetic bearings (621) generate combined electromagnetic forces (F) having phases opposite to each other for the X direction. Hence, the X-direction displacement of the drive shaft (605) for the one radial magnetic bearing (621) and the X-direction displacement of the drive shaft (605) for the other radial magnetic bearing (621) are opposite to each other, and the drive shaft (605) is displaced (rotated) in the tilt direction (about the Y axis).

In the electric motor system (610), the controller (690) controls the thrust magnetic bearing (622) and also perform displacement control in the thrust direction, which will not be described here.

Advantages of Fifth Embodiment

As described above, in this embodiment, the bearingless motor (640) serves to perform displacement control in the radial direction. This reduces the load in the radial direction imposed on the radial magnetic bearings (621). In this embodiment, accordingly, the radial magnetic bearings (621) can be reduced in size, compared to an apparatus in which only radial magnetic bearings support a drive shaft. The reduction in the size of the radial magnetic bearings (621) can increase the distance from the center of gravity of the entire rotating system including the bearingless motor (640) to each of the radial magnetic bearings (621) without increasing the size of the electric motor system (610). The increase in the distance from the center of gravity to the radial magnetic bearings (621) (that is, the distance from the point of application of force to the center of gravity) is advantageous for tilt displacement control. That is, in this embodiment, it is possible to reduce a displacement of the drive shaft (605) in the tilt direction without increasing the size of the electric motor system (610).

If the distances from the load (the compression mechanism (603)) to the radial magnetic bearings (621) are different, the electromagnets (671 to 678) are preferably configured such that the radial magnetic bearing (621) closer to the load can generate a larger combined electromagnetic force (F) than the other radial magnetic bearing (621). With this configuration, forces for reducing the tilt displacement angle can be generated in a well-balance manner.

Various Modifications of Fifth Embodiment

In this embodiment, the magnitudes of combined electromagnetic forces (F) of both the radial magnetic bearings (621) can be made different by, for example, changing at least one of the number of turns of each of the coils (665), the magnitude of the current flowing through each of the coils (665), the magnitude of the magnetic resistance of a magnetic circuit, and the size of each electromagnet and adjusting the magnetomotive forces of the electromagnets (671 to 678). For example, the number of turns of the coils (665) of the electromagnets (671 to 678) of the radial magnetic bearing (621) closer to the load (603) may be made larger than the number of turns of the coils (665) of the electromagnets (671 to 678) of the other radial magnetic bearing (621). Alternatively, to change the magnitude of the magnetic resistance of the magnetic circuit, the width of the magnetic path may be changed.

In this embodiment, furthermore, the axial length of the radial magnetic bearing (621) closer to the load (603) may be longer than the axial length of the other radial magnetic bearing (621). This allows the combined electromagnetic force (F) of the radial magnetic bearing (621) closer to the load (603) to be larger.

Alternatively, in this embodiment, the diameter of a portion of the drive shaft (605) facing the radial magnetic bearing (621) closer to the load (603) may be larger than the diameter of a portion of the drive shaft (605) facing the other radial magnetic bearing (621). This allows the combined electromagnetic force (F) of the radial magnetic bearing (621) closer to the load (603) to be larger.

In this embodiment, furthermore, the radial magnetic bearings (621) may also generate a support force for the radial direction.

In this embodiment, furthermore, the electric motor system (610) may be used to drive a load other than the compression mechanism (603).

In this embodiment, furthermore, separate controllers may be provided for the bearingless motor (640) and for the magnetic bearings (621).

Sixth Embodiment of Invention

Figure 39:
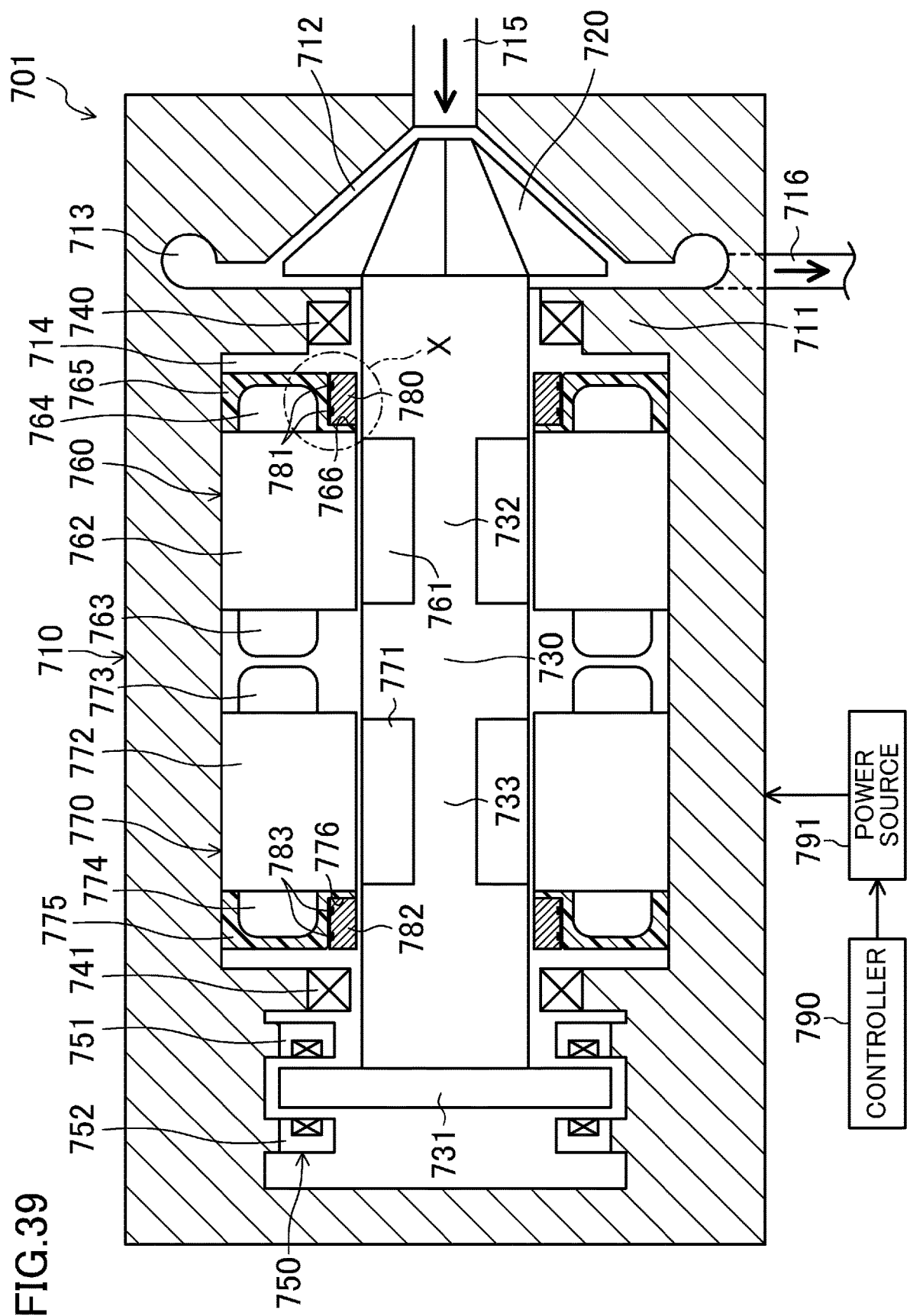
FIG. 39 is a front view illustrating an example configuration of a turbo compressor according to a sixth embodiment of the present invention.

A sixth embodiment of the present invention will be described. A turbo compressor (701) according to this embodiment is disposed in a refrigerant circuit (not illustrated) that performs a refrigeration cycle, and is configured to compress refrigerant. As illustrated in FIG. 39, the turbo compressor (701) includes a casing (710), an impeller (720), a drive shaft (730), touch-down bearings (740, 741), a thrust magnetic bearing (750), a controller (790), a power source (791), a first bearingless motor (760), a second bearingless motor (770), a first dynamic-pressure gas bearing (780), and a second dynamic-pressure gas bearing (782). The first bearingless motor (760) and the second bearingless motor (770) are arranged side-by-side in the axial direction of the drive shaft (730). The first and second bearingless motors (760, 770) and the first and second dynamic-pressure gas bearings (780, 782) constitute a drive support unit.

As used herein, the term "axial direction" refers to a direction of an axis of rotation, which is a direction of an axis of the drive shaft (730), and the term "radial direction" refers to a direction perpendicular to the axial direction of the drive shaft (730). The term "outer circumferential side" refers to a side farther from the axis of the drive shaft (730), and the term "inner circumferential side" refers to a side closer to the axis of the drive shaft (730).

Casing

The casing (710) is shaped into a cylinder having both ends closed and is arranged such that the axis line of the cylinder is directed horizontally. The inner space of the casing (710) is partitioned by a wall portion (711), with the space to the right of the wall portion (711) forming an impeller chamber (712) that accommodates the impeller (720) and the space to the left of the wall portion (711) forming an electric motor chamber (714) that accommodates the first and second bearingless motors (760, 770). The drive shaft (730) extending in the axial direction through the casing (710) couples the impeller (720) and the first and second bearingless motors (760, 770) to each other. The first and second bearingless motors (760, 770) constitute a drive support unit.

Impeller

The impeller (720) is formed with a plurality of blades so as to have a substantially conical outer shape. The impeller (720) is accommodated in the impeller chamber (712) in such a manner as to be fixed to one end of the drive shaft (730). A suction pipe (715) and a discharge pipe (716) are connected to the impeller chamber (712), and a compression space (713) is formed in an outer circumferential portion of the impeller chamber (712). The suction pipe (715) is provided to introduce refrigerant into the impeller chamber (712) from the outside, and the discharge pipe (716) is provided to return high-pressure refrigerant compressed in the impeller chamber (712) to the outside.

Touch-Down Bearings

The turbo compressor (701) is provided with the two touch-down bearings (740, 741). One touch-down bearing (740) is disposed near one end (the right-side end in FIG. 39) of the drive shaft (730), and the other touch-down bearing (741) is disposed near the other end of the drive shaft (730). The touch-down bearings (740, 741) are configured to support the drive shaft (730) when the first and second bearingless motors (760, 770) are not energized (that is, when the drive shaft (730) is not levitated).

Thrust Magnetic Bearing

As illustrated in FIG. 39, the thrust magnetic bearing (750) includes a first and second electromagnets (751, 752), and is configured to support a disk-shaped portion (hereinafter referred to as a disk portion (731)) disposed at the other end of the drive shaft (730) (that is, the end on the opposite side to the one end to which the impeller (720) is fixed) in a contactless manner by using an electromagnetic force. By controlling the current flowing through the first and second electromagnets (751, 752), the thrust magnetic bearing (750) can control the position of a supported portion (the disk portion (731)) of the drive shaft (730) in the direction in which the first and second electromagnets (751, 752) face each other (that is, in the axial direction, or the left-right direction in FIG. 39).

Controller

The controller (790) outputs a voltage command value (thrust voltage command value) for controlling a voltage to be supplied to the thrust magnetic bearing (750) or a voltage command value (motor voltage command value) for controlling a voltage to be supplied to the first and second bearingless motors (760, 770) in accordance with a detection value of a gap sensor (not illustrated) capable of detecting a gap between the disk portion (731) and the thrust magnetic bearing (750), a detection value of a gap sensor (not illustrated) capable of detecting a gap between stators (764, 774) and rotors (761, 771) of the first and second bearingless motors (760, 770), and information on target rotational speeds of the impeller (720) and the drive shaft (730) so as to position the drive shaft (730) at a desired position. For example, the controller (790) can be constituted by a microcomputer (not illustrated) and a program that allows the microcomputer to operate.

Power Source

The power source (791) supplies a voltage to the thrust magnetic bearing (750) and the first and second bearingless motors (760, 770) in accordance with the thrust voltage command value and the motor voltage command value from the controller (790). For example, the power source (791) can be constituted by a PWM amplifier. The power source (791) constitutes an electric circuit.

First Bearingless Motor

The first bearingless motor (760) is arranged in a portion of the electric motor chamber (714) closer to the impeller (720). The first bearingless motor (760) is configured to rotationally drive the drive shaft (730) by using an electromagnetic force and to support the radial load of the drive shaft (730) in a contactless manner by using the electromagnetic force. The first bearingless motor (760) has a rotor-stator pair constituted by the rotor (761) and the stator (764). The rotor (761) is fixed to the drive shaft (730), and the stator (764) is fixed to an inner circumferential wall of the casing (710).

The rotor (761) is formed into a cylindrical shape having a plurality of permanent magnets (not illustrated) embedded therein. The diameter of the rotor (761) is substantially equal to the diameter of the drive shaft (730). The rotor (761) is fixed to a first small-diameter portion (732) that is formed in the drive shaft (730) (that is, a portion of the drive shaft (730) having a smaller diameter than the remaining portion). The diameter of the rotor (761) may be different from the diameter of the drive shaft (730).

The stator (762) is arranged on the outer circumferential side of the rotor (761) and is formed into a cylindrical shape. The stator (762) has wound therearound a coil (763) through which a current in a predetermined current range flows. The coil (763) may be wound by using a distributed winding method or a concentrated winding method.

The stator (762) has a coil end portion (764) (that is, a portion in which the coil (763) projects from a core portion of the stator (762) in the axial direction) that is molded with a first molding resin (765). For example, a ring-shaped first concave portion (766) is formed in an inner circumferential surface of the first molding resin (765) on the side farther from a center portion of the stator (762) in such a manner that the first concave portion (766) opens toward the side farther from the center portion of the stator (762).

First Dynamic-Pressure Gas Bearing

Figure 40:
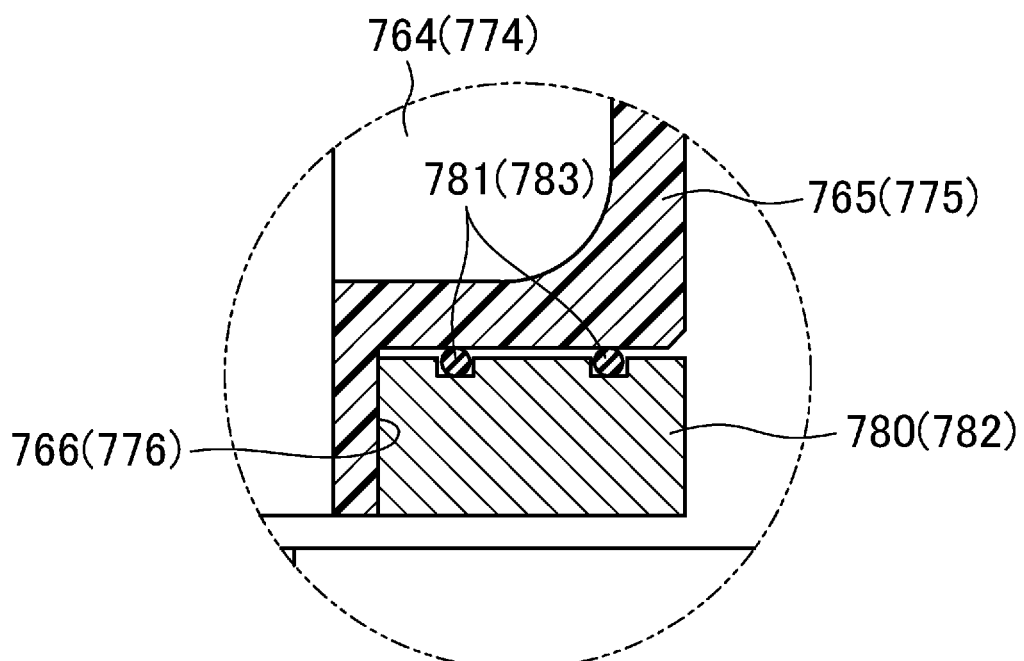
FIG. 40 is an enlarged view of part X in FIG. 39.

As illustrated in FIGS. 39 and 40, the first dynamic-pressure gas bearing (780) fits into the first concave portion (766). The first dynamic-pressure gas bearing (780) is constituted by, for example, a cylindrical sleeve (780) formed of a resin with relatively high thermal conductivity. For example, two O-rings (781) are attached to an outer circumferential portion of the first dynamic-pressure gas bearing (780). The first dynamic-pressure gas bearing (780) is fixed to the first molding resin (765) via the O-rings (781). The entire portion of the first dynamic-pressure gas bearing (780) overlaps the coil end portion (764) in the radial direction of the drive shaft (730). A portion of the first dynamic-pressure gas bearing (780) may overlap the coil end portion (764) in the radial direction of the drive shaft (730).

During the rotation of the impeller (720) and the drive shaft (730), the first dynamic-pressure gas bearing (780) supports the radial load of the drive shaft (730) in a contactless manner. In this case, the support force increases with an increase in the rotational speed of the impeller (720) and the drive shaft (730).

Second Bearingless Motor

The second bearingless motor (770) is arranged in a portion of the electric motor chamber (714) farther from the impeller (720). The second bearingless motor (770) is configured to rotationally drive the drive shaft (730) by using an electromagnetic force and to support the radial load of the drive shaft (730) in a contactless manner by using the electromagnetic force. The second bearingless motor (770) has a rotor-stator pair constituted by the rotor (771) and the stator (772). The rotor (771) is fixed to the drive shaft (730), and the stator (772) is fixed to the inner circumferential wall of the casing (710).

The rotor (771) is formed into a cylindrical shape having a plurality of permanent magnets (not illustrated) embedded therein. The diameter of the rotor (771) is substantially equal to the diameter of the drive shaft (730). The rotor (771) is fixed to a second small-diameter portion (733) that is formed in the drive shaft (730) (that is, a portion of the drive shaft (730) having a smaller diameter than the remaining portion). The diameter of the rotor (771) may be different from the diameter of the drive shaft (730).

The stator (772) is arranged on the outer circumferential side of the rotor (771) and is formed into a cylindrical shape. The stator (772) has wound therearound a coil (773) through which a current in a predetermined current range flows. The coil (773) may be wound by using a distributed winding method or a concentrated winding method.

The stator (772) has a coil end portion (774) (that is, a portion in which the coil (773) projects from a core portion of the stator (772) in the axial direction) that is molded with a second molding resin (775). For example, a ring-shaped second concave portion (776) is formed in an inner circumferential surface of the second molding resin (775) on the side farther from a center portion of the stator (772) in such a manner that the second concave portion (776) opens toward the side farther from the center portion of the stator (772).

Second Dynamic-Pressure Gas Bearing

As illustrated in FIGS. 39 and 40, the second dynamic-pressure gas bearing (782) fits into the second concave portion (776). In FIG. 40, the second dynamic-pressure gas bearing (782) illustrated in FIG. 39 is flipped from side to side. The second dynamic-pressure gas bearing (782) is constituted by, for example, a cylindrical sleeve (782) formed of a resin with relatively high thermal conductivity. For example, two O-rings (783) are attached to an outer circumferential portion of the second dynamic-pressure gas bearing (782). The second dynamic-pressure gas bearing (782) is fixed to the second molding resin (775) via the O-rings (783). The entire portion of the second dynamic-pressure gas bearing (782) overlaps the coil end portion (774) in the radial direction of the drive shaft (730). A portion of the second dynamic-pressure gas bearing (782) may overlap the coil end portion (774) in the radial direction of the drive shaft (730).

During the rotation of the impeller (720) and the drive shaft (730), the second dynamic-pressure gas bearing (782) supports the radial load of the drive shaft (730) in a contactless manner. In this case, the support force increases with an increase in the rotational speed of the impeller (720) and the drive shaft (730).

Advantages of Sixth Embodiment

In this embodiment, the first and second dynamic-pressure gas bearings (780, 782) support at least a portion of the radial load of the drive shaft (730). This can reduce the radial load imposed on the first and second bearingless motors (760, 770). Thus, it is possible to increase the driving torque output of the first and second bearingless motors (760, 770).

In this embodiment, furthermore, the axial length of a rotating system including the first and second bearingless motors (760, 770), the first and second dynamic-pressure gas bearings (780, 782), and the drive shaft (730) can be set to be small. Thus, it is possible to expand a region in which the turbo compressor (701) can be operated safely.

In this embodiment, furthermore, the entireties of the first and second dynamic-pressure gas bearings (780, 782) overlap the coil end portions (764, 774) of the stators (762, 772) in the radial direction of the drive shaft (730). With this configuration, the axial length of the rotating system can be reduced, compared to a case where the gas bearings (780, 782) are provided on a stand-alone basis, and therefore the region in which the turbo compressor (701) can be operated safely can be expanded.

Seventh Embodiment of Invention

A seventh embodiment of the present invention will be described. A turbo compressor (701) according to this embodiment is different from the turbo compressor (701) according to the sixth embodiment in the configuration of gas bearings. The following description mainly focuses on differences from the sixth embodiment.

Figure 41:
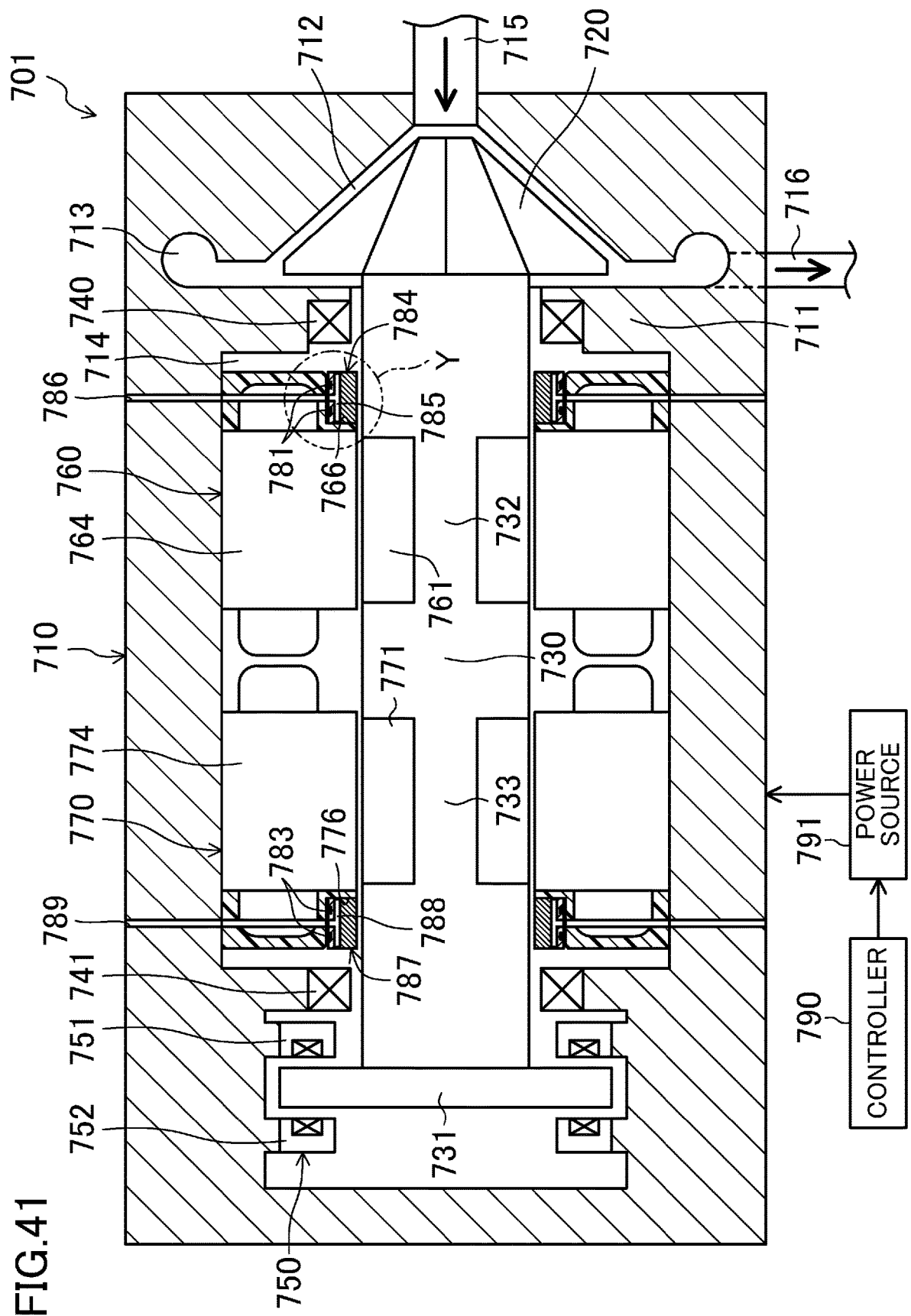
FIG. 41 is a front view illustrating an example configuration of a turbo compressor according to a seventh embodiment of the present invention.
Figure 42:
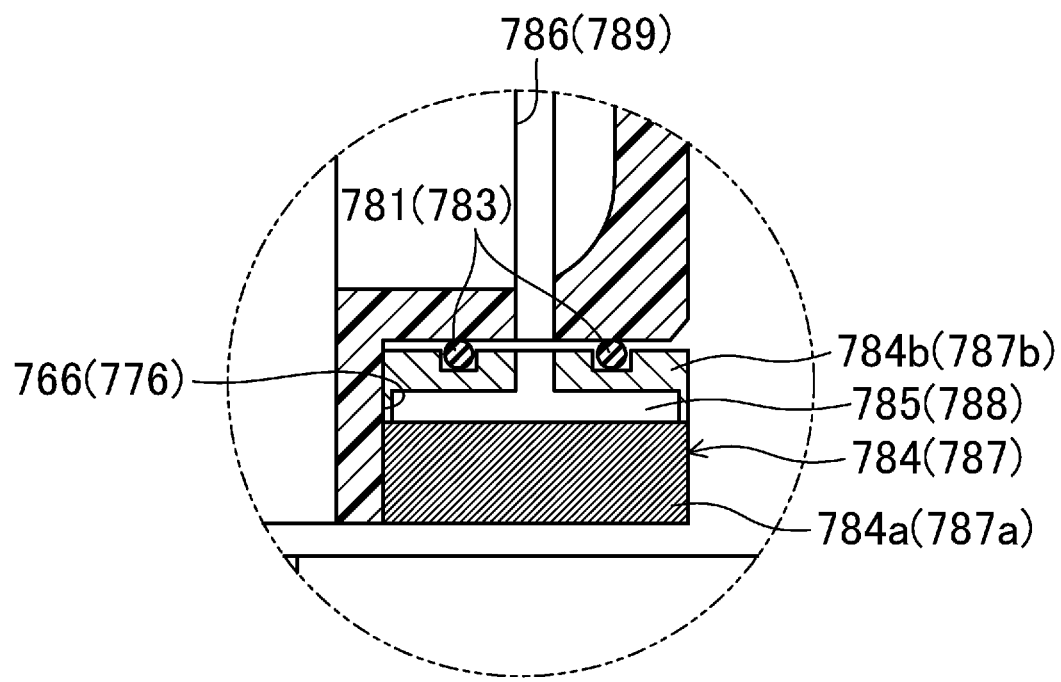
FIG. 42 is an enlarged view of part Y in FIG. 41.

As illustrated in FIGS. 41 and 42, a first static-pressure gas bearing (784) fits into the first concave portion (766) in the stator (762) of the first bearingless motor (760). The first static-pressure gas bearing (784) is constituted by, for example, a cylindrical sleeve (784) formed of a resin with relatively high thermal conductivity. The first static-pressure gas bearing (784) has an inner circumferential portion formed of a porous body (784a), and an outer circumferential portion formed of a solid body (784b). Preferably, a first refrigerant cavity (785) is formed between the inner circumferential portion and the outer circumferential portion so as to extend around the entire circumference.

A first refrigerant introduction path (786) is connected to the first refrigerant cavity (785) via a through-hole that passes through the outer circumferential portion of the first static-pressure gas bearing (784) in the radial direction. The first refrigerant introduction path (786) passes through the casing (710) and the coil end portion (764) of the first bearingless motor (760) in the radial direction. The first refrigerant introduction path (786) is communicated with, for example, a condenser in a refrigerant circuit (not illustrated) that includes the turbo compressor (701), and introduces high-pressure gas refrigerant into the first refrigerant cavity (785).

For example, two O-rings (781) are attached to the outer circumferential portion of the first static-pressure gas bearing (784). The first static-pressure gas bearing (784) is fixed to the first molding resin (765) via the O-rings (781). The entire portion of the first static-pressure gas bearing (784) overlaps the coil end portion (764) in the radial direction of the drive shaft (730). A portion of the first static-pressure gas bearing (784) may overlap the coil end portion (764) in the radial direction of the drive shaft (730).

Likewise, as illustrated in FIGS. 41 and 42, a second static-pressure gas bearing (787) fits into the second concave portion (776) in the stator (772) of the second bearingless motor (770). In FIG. 42, the second static-pressure gas bearing (787) illustrated in FIG. 41 is flipped from side to side. The second static-pressure gas bearing (787) is constituted by, for example, a cylindrical sleeve (787) formed of a resin with relatively high thermal conductivity. The second static-pressure gas bearing (787) has an inner circumferential portion formed of a porous body (787a), and an outer circumferential portion formed of a solid body (787b). Preferably, a second refrigerant cavity (788) is formed between the inner circumferential portion and the outer circumferential portion so as to extend around the entire circumference.

A second refrigerant introduction path (789) is connected to the second refrigerant cavity (788) via a through-hole that passes through the outer circumferential portion of the second static-pressure gas bearing (787) in the radial direction. The second refrigerant introduction path (789) passes through the casing (710) and the coil end portion (774) of the second bearingless motor (770) in the radial direction. The second refrigerant introduction path (789) is communicated with, for example, the condenser in the refrigerant circuit that includes the turbo compressor (701), and introduces high-pressure gas refrigerant into the second refrigerant cavity (788).

For example, two O-rings (783) are attached to the outer circumferential portion of the second static-pressure gas bearing (787). The second static-pressure gas bearing (787) is fixed to the second molding resin (775) via the O-rings (783). The entire portion of the second static-pressure gas bearing (787) overlaps the coil end portion (774) in the radial direction of the drive shaft (730). A portion of the second static-pressure gas bearing (787) may overlap the coil end portion (774) in the radial direction of the drive shaft (730).

The first and second static-pressure gas bearings (784, 787) support the radial load of the drive shaft (730) in a contactless manner by utilizing the pressure of the gas refrigerant introduced into the first and second refrigerant cavities (785, 788).

This embodiment can also achieve advantages similar to those of the sixth embodiment.

Eighth Embodiment of Invention

An eighth embodiment of the present invention will be described.

Air Conditioner

Figure 43:
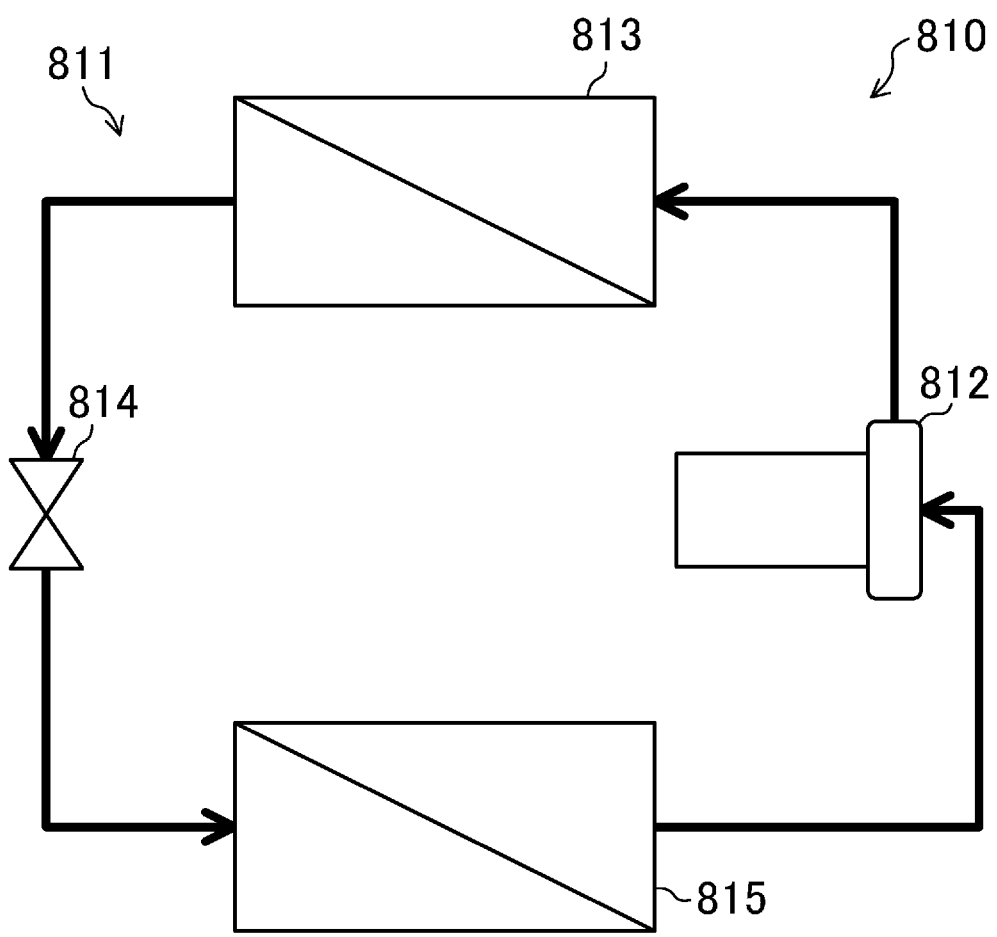
FIG. 43 is a schematic diagram exemplarily illustrating the configuration of an air conditioner according to an eighth embodiment of the present invention.

FIG. 43 exemplarily illustrates the configuration of an air conditioner (810) according to the eighth embodiment. The air conditioner (810) includes a refrigerant circuit (811). The refrigerant circuit (811) has a turbo compressor (812), a condenser (813), an expansion valve (814), and an evaporator (815), and is configured to perform a refrigeration cycle by circulating refrigerant therethrough. For example, the condenser (813) and the evaporator (815) are each configured as a cross-fin heat exchanger, and the expansion valve (814) is configured as an electrically powered valve.

Turbo Compressor

Figure 44:
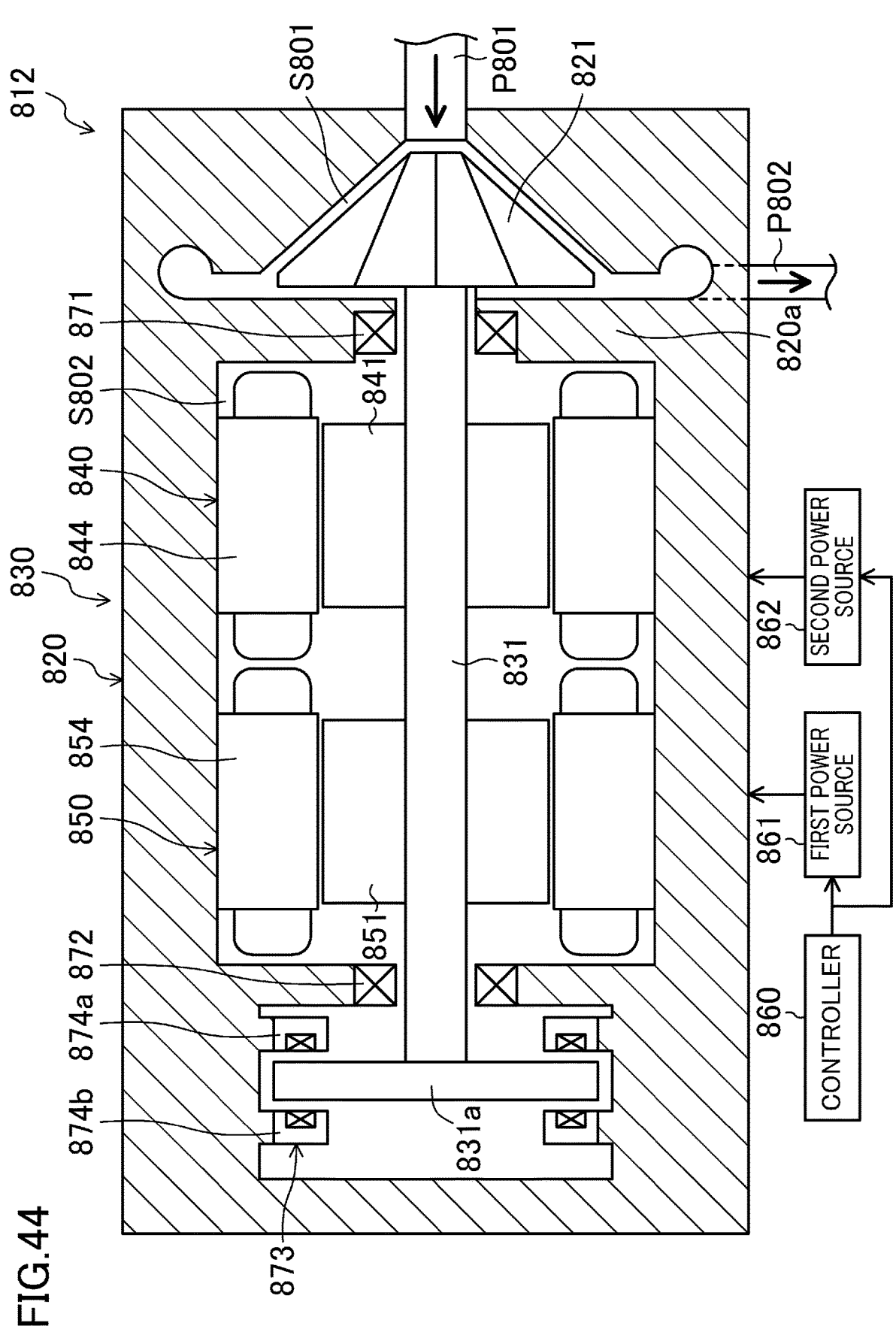
FIG. 44 is a longitudinal sectional view exemplarily illustrating the configuration of a turbo compressor.

FIG. 44 exemplarily illustrates the configuration of the turbo compressor (812) illustrated in FIG. 43. The turbo compressor (812) is disposed in the refrigerant circuit (811) and is configured to compress refrigerant by using an impeller (821) described below. In the illustrated example, the turbo compressor (812) includes a casing (820), the impeller (821), and an electric motor system (830). The electric motor system (830) has a drive shaft (831), a first and second bearingless motors (840, 850), a controller (860), and a first and second power sources (861, 862). In the illustrated example, the electric motor system (830) further has a first and second touch-down bearings (871, 872) and a thrust magnetic bearing (873).

In the following description, the term "axial direction" refers to a direction of an axis of rotation, which is a direction of an axis of the drive shaft (831), and the term "radial direction" refers to a direction perpendicular to the axial direction of the drive shaft (831). The term "outer circumferential side" refers to a side farther from the axis of the drive shaft (831), and the term "inner circumferential side" refers to a side closer to the axis of the drive shaft (831).

Casing

The casing (820) is shaped into a cylinder having both ends closed and is arranged such that the axis line of the cylinder is directed horizontally. The inner space of the casing (820) is partitioned by a wall portion (820a), with the space to the right of the wall portion (820a) forming an impeller chamber (S801) that accommodates the impeller (821) and the space to the left of the wall portion (820a) forming an electric motor chamber (S802) that accommodates the first and second bearingless motors (840, 850). The electric motor chamber (S802) further accommodates the first and second bearingless motors (840, 850), the first and second touch-down bearings (871, 872), and the thrust magnetic bearing (873). The first and second bearingless motors (840, 850), the first and second touch-down bearings (871, 872), and the thrust magnetic bearing (873) are fixed to an inner circumferential wall of the electric motor chamber (S802).

Drive Shaft

The drive shaft (831) is provided to rotationally drive a load (821) (in the illustrated example, the impeller (821)). In the illustrated example, the drive shaft (831) extends in the axial direction through the casing (820) and couples the impeller (821) and the first and second bearingless motors (840, 850) to each other. Specifically, the impeller (821) is fixed to one end of the drive shaft (831), and the first and second bearingless motors (840, 850) are arranged in a middle portion of the drive shaft (831). A disk-shaped portion (hereinafter referred to as a disk portion (831a)) is disposed at the other end of the drive shaft (831) (that is, the end on the opposite side to the one end to which the impeller (821) is fixed). The disk portion (831a) is formed of a magnetic material (for example, iron).

Impeller (Load)

The impeller (821) is formed with a plurality of blades so as to have a substantially conical outer shape. The impeller (821) is accommodated in the impeller chamber (S801) in such a manner as to be fixed to one end of the drive shaft (831). A suction pipe (P801) and a discharge pipe (P802) are connected to the impeller chamber (S801). The suction pipe (P801) is provided to introduce refrigerant (fluid) into the impeller chamber (S801) from the outside. The discharge pipe (P802) is provided to return high-pressure refrigerant (fluid) compressed in the impeller chamber (S801) to the outside. That is, in the illustrated example, the impeller (821) and the impeller chamber (S801) constitute a compression mechanism.

Bearingless Motors

The first and second bearingless motors (840, 850) have the same configuration. The following describes only the configuration of the first bearingless motor (840).

The first bearingless motor (840) has a rotor-stator pair constituted by a rotor (841) and a stator (844), and is configured to rotationally drive the drive shaft (831) and to support the radial load of the drive shaft (831) in a contactless manner. The rotor (841) is fixed to the drive shaft (831), and the stator (844) is fixed to an inner circumferential wall of the casing (820).

Figure 45:
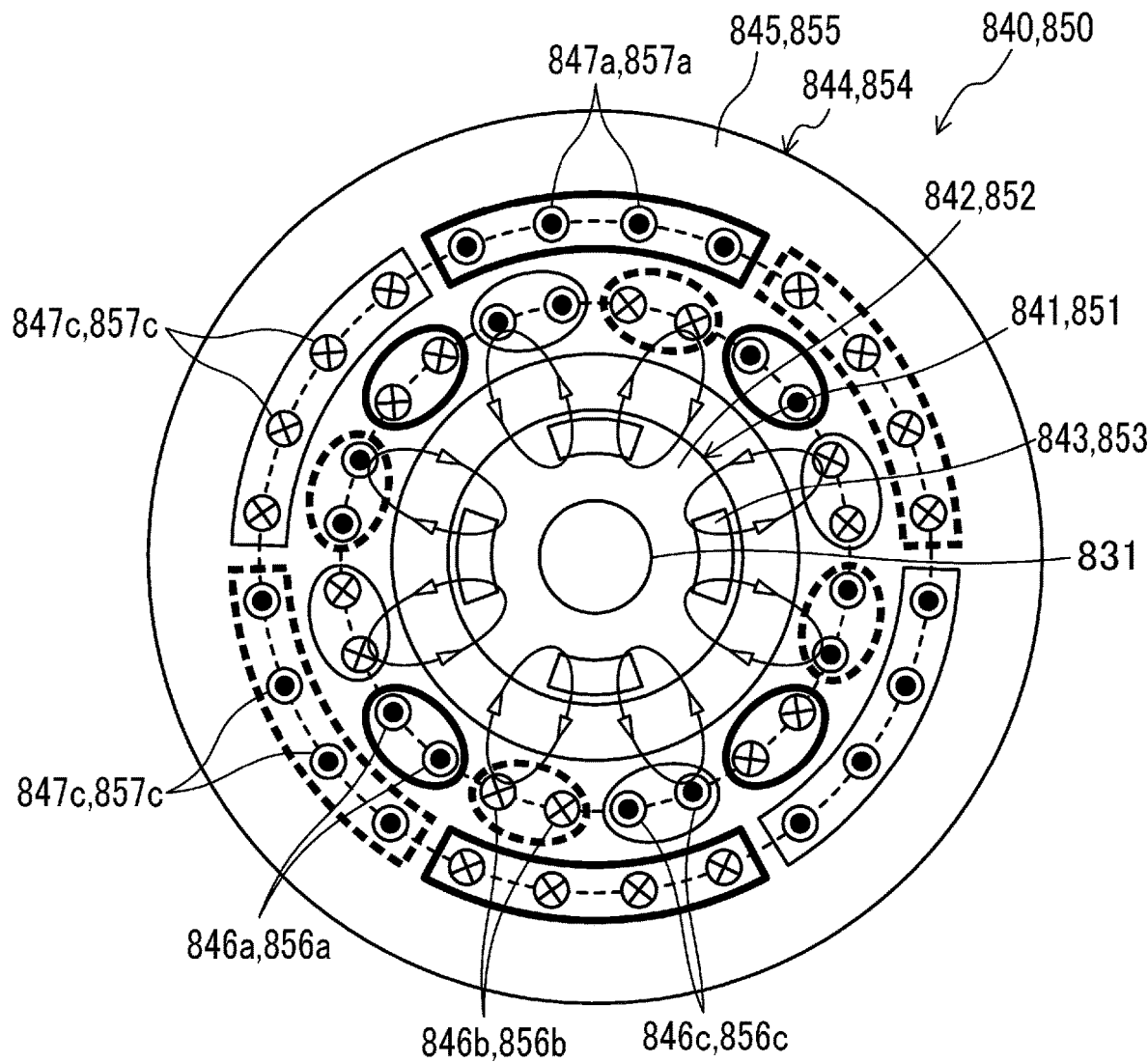
FIG. 45 is a cross-sectional view exemplarily illustrating the configuration of a bearingless motor.

As illustrated in FIG. 45, in the illustrated example, the first bearingless motor (840) is configured as a consequent-pole bearingless motor.

The rotor (841) of the first bearingless motor (840) has a rotor core (842) and a plurality of (in the illustrated example, four) permanent magnets (843) embedded in the rotor core (842). The rotor core (842) is formed of a magnetic material (for example, layered steel plates) and is formed into a columnar shape. The rotor core (842) has a shaft hole formed therein at a center portion thereof, through which the drive shaft (831) extends.

The plurality of permanent magnets (843) are arranged in the circumferential direction of the rotor (841) at predetermined pitch angles (in the illustrated example, at pitch angles of 90°). The side of each of the four permanent magnets (843) nearer the outer circumferential surface is the N pole, and portions of the outer circumferential surface of the rotor core (842) that are positioned between the four permanent magnets (843) in the circumferential direction of the rotor (841) are pseudo-S poles. The side of each of the four permanent magnets (843) nearer the outer circumferential surface may be the S pole.

The stator (844) of the first bearingless motor (840) is formed of a magnetic material (for example, layered steel plates), and has a back yoke portion (845), a plurality of tooth portions (not illustrated), and armature windings (846a to 846c) and support windings (847a to 847c) that are wound around the tooth portions. The back yoke portion (845) is formed into a cylindrical shape. The armature windings (846a to 846c) and the support windings (847a to 847c) are wound around the respective tooth portions by using a distributed winding method. The armature windings (846a to 846c) and the support windings (847a to 847c) may be wound around the respective tooth portions by using a concentrated winding method.

The armature windings (846a to 846c) are windings wound on the inner circumferential side of the tooth portions. The armature windings (846a to 846c) are constituted by U-phase armature windings (846a) in portions enclosed by the thick solid line in FIG. 45, V-phase armature windings (846b) in portions enclosed by the thick broken line in FIG. 45, and W-phase armature windings (846c) in portions enclosed by the thin solid line in FIG. 45.

The support windings (847a to 847c) are windings wound on the outer circumferential side of the tooth portions. The support windings (847a to 847c) are constituted by U-phase support windings (847a) in portions enclosed by the thick solid line in FIG. 45, V-phase support windings (847b) in portions enclosed by the thick broken line in FIG. 45, and W-phase support windings (847c) in portions enclosed by the thin solid line in FIG. 45.

Touch-Down Bearings

The first touch-down bearing (871) is disposed near one end (the right end in FIG. 44) of the drive shaft (831), and the second touch-down bearing (872) is disposed near the other end of the drive shaft (831). The first and second touch-down bearings (871, 872) are configured to support the drive shaft (831) when the first and second bearingless motors (840, 850) are not energized (that is, when the drive shaft (831) is not levitated).

Thrust Magnetic Bearing

The thrust magnetic bearing (873) has a first and second thrust electromagnets (874a, 874b), and is configured to support the disk portion (831a) of the drive shaft (831) in a contactless manner by using an electromagnetic force. Specifically, the first and second thrust electromagnets (874a, 874b) are each formed into an annular shape. The first and second thrust electromagnets (874a, 874b) face each other with the disk portion (831a) of the drive shaft (831) interposed therebetween, and support the disk portion (831a) of the drive shaft (831) in a contactless manner by using a combined electromagnetic force of the first and second thrust electromagnets (874a, 874b).

Various Sensors

The components of the electric motor system (830) are provided with various sensors (not illustrated) such as a position sensor, a current sensor, and a rotational speed sensor. For example, the first and second bearingless motors (840, 850) are provided with position sensors (not illustrated) that output detection signals corresponding to the positions of the rotors (841, 851) in the radial direction, and the thrust magnetic bearing (873) is provided with a position sensor (not illustrated) that outputs a detection signal corresponding to the position of the drive shaft (831) in the thrust direction (axial direction). These position sensors are each constituted by, for example, an eddy-current displacement sensor that detects a gap (distance) between the sensor and the object being measured.

Controller

The controller (860) is configured to generate and output an armature voltage command value, a support voltage command value, and a thrust voltage command value on the basis of detection signals from the various sensors disposed in the components of the electric motor system (830) and information such as the target rotational speed of the drive shaft (831), so that the rotational speed of the drive shaft (831) becomes equal to a predetermined target rotational speed, with the drive shaft (831) being supported in a contactless manner. The armature voltage command value is a command value for controlling the voltage to be supplied to the armature windings (846a to 846c, 856a to 856c) of the first and second bearingless motors (840, 850). The support voltage command value is a command value for controlling the voltage to be supplied to the support windings (847a to 847c, 857a to 857c) of the first and second bearingless motors (840, 850). The thrust voltage command value is a command value for controlling the voltage to be supplied to windings (not illustrated) of the first and second thrust electromagnets (874a, 874b) of the thrust magnetic bearing (873). The controller (860) is constituted by, for example, a computational unit such as a CPU, a storage unit such as a memory that stores a program for activating the computational unit or information, and so on.

Power Sources

The first power source (861) is configured to supply a voltage to the armature windings (846a to 846c, 856a to 856c) of the first and second bearingless motors (840, 850) in accordance with the armature voltage command value output from the controller (860). The second power source (862) is configured to supply a voltage to the support windings (847a to 847c, 857a to 857c) of the first and second bearingless motors (840, 850) in accordance with the support voltage command value output from the controller (860). By controlling the voltage to be applied to the armature windings (846a to 846c, 856a to 856c) and the support windings (847a to 847c, 857a to 857c) of the first and second bearingless motors (840, 850), it is possible to control the current flowing through the windings (846a to 846c, 856a to 856c, 847a to 847c, 857a to 857c) to control the torque and support force generated by the first and second bearingless motors (840, 850). The first and second power sources (861, 862) are each constituted by, for example, a PWM amplifier. The first and second power sources (861, 862) constitute a power source.

Operating Region of Turbo Compressor

FIG. 7 is a diagram describing an operating region of the turbo compressor (812). In FIG. 7, the horizontal axis represents refrigerant volumetric flow rate, and the vertical axis represents head. The turbo compressor (812) can operate in a predetermined operating region upon being supplied with power by the first and second power sources (861, 862).

The predetermined operating region mainly includes regions located inside a surge line indicated by a bold line in FIG. 7, which include a steady operating region (A), a high-load torque region (B), and a turbulence region (C), and a surging region (D) located outside the surge line. As used herein, the high-load torque region (B) is referred to also as a "region in which the maximum driving torque of the turbo compressor (812) is required". The turbulence region (C) is referred to also as a "rotating-stall generation region".

The steady operating region (A) is a region indicated by symbol A in FIG. 7. In the steady operating region (A), the load torque of the impeller (821) and the drive shaft (831) (that is, a torque for rotationally driving the impeller (821) and the drive shaft (831)) is relatively small, and the radial load of the drive shaft (831) is also relatively small.

The high-load torque region (B) is a region indicated by symbol B in FIG. 7. In the high-load torque region (B), the load torque of the impeller (821) and the drive shaft (831) is relatively large, and the radial load of the drive shaft (831) is also relatively large. The load torque of the impeller (821) and the drive shaft (831) in the turbo compressor (812) are maximum at the uppermost-rightmost point of the high-load torque region (B) in FIG. 7. Note that the radial load of the drive shaft (831) in the turbo compressor (812) is not maximum in the high-load torque region (B).

The turbulence region (C) is a region indicated by symbol C in FIG. 7. In the turbulence region (C), the load torque of the impeller (821) and the drive shaft (831) is relatively small, whereas the radial load of the drive shaft (831) is relatively large.

The surging region (D) is a region indicated by symbol D in FIG. 7. In cases of emergency such as a blackout, the turbo compressor (812) may sometimes temporarily operate in the surging region (D). The surging region (D) is a region in which the load torque of the impeller (821) and the drive shaft (831) is relatively small whereas the radial load of the drive shaft (831) is relatively large. The radial load of the drive shaft (831) in the turbo compressor (812) is maximum at a predetermined point in the surging region (D).

Operation of Controller and Power Sources

The operation of the controller (860) and the first and second power sources (861, 862) will be described. The controller (860) supplies a voltage to and allows an armature current IA and a support current IS to flow through the armature windings (846a to 846c, 856a to 856c) and the support windings (847a to 847c, 857a to 857c) of the first and second bearingless motors (840, 850) so as to output a radial support force for supporting the radial load in accordance with the state of the turbo compressor (812).

The radial support force is the sum of a radial support force caused by the support current IS and a radial support force caused by both the armature current IA and the support current IS (referred to herein also as the radial support force caused by the armature current IA). The radial support force caused by both the armature current IA and the support current IS increases with an increase in the d-axis component of the armature current IA (hereinafter referred to as the d-axis current), decreases with a decrease in the d-axis current, increases with an increase in the absolute value of the q-axis component of the armature current IA (hereinafter referred to as the q-axis current), and decreases with a decrease in the absolute value of the q-axis current.

The controller (860) controls the first power source (861) so that, for example, in the steady operating region (A), the armature windings (846a to 846c, 856a to 856c) can most efficiently generate a torque for the armature current IA (so-called maximum torque/current control), and controls the second power source (862) so that the support windings (847a to 847c, 857a to 857c) can output a radial support force corresponding to the state of the turbo compressor (812). The method for controlling the first power source (861) in the steady operating region (A) is not limited to maximum torque/current control, and, for example, maximum efficiency control (control to achieve the minimum loss) or power-factor-one control (control to achieve substantially one power factor) may be employed.

Further, the controller (860) controls the first and second power sources (861, 862) so that, for example, in a region other than the steady operating region (A), one of an armature voltage VA, which is a voltage applied to the armature windings (846a to 846c, 856a to 856c) of the first and second bearingless motors (840, 850), and the support current IS, which is a current flowing through the support windings (847a to 847c, 857a to 857c), is increased and the other of the armature voltage VA and the support current IS is decreased. The following describes several examples of the control described above.

Flux-Strengthening Control

The controller (860) performs flux-strengthening control of the armature windings (846a to 846c, 856a to 856c) (that is, control to allow a positive d-axis current to flow), for example, in the turbulence region (C) and the surging region (D) in which the load torque is relatively small whereas the radial load is large, when the operation of the turbo compressor (812) is finished, and when the operation of the turbo compressor (812) is started.

The controller (860) increases the armature voltage command value for the first power source (861) to increase the armature voltage VA across the first and second bearingless motors (840, 850), and decreases the support voltage command value for the second power source (862) to decrease the support current IS in the first and second bearingless motors (840, 850). Further, the controller (860) controls the first and second power sources (861, 862) so that the support current IS in the first and second bearingless motors (840, 850) does not exceed a predetermined first upper limit (that is determined by, for example, the power supply capacity of the second power source (862)). This does not increase the support current IS, but can increase the armature current IA, which is a current flowing through the armature windings (846a to 846c, 856a to 856c), to increase the radial support force. Thus, the power supply capacity of the second power source (862) can be set to be relatively low for the maximum radial support force that can be generated by the first and second bearingless motors (840, 850).

Furthermore, for example, when the temperature of the support windings (847a to 847c, 857a to 857c) becomes greater than or equal to a predetermined reference value, the controller (860) may cause the first power source (861) to perform flux-strengthening control and cause the second power source (862) to decrease the support current IS. This can reduce copper loss in the support windings (847a to 847c, 857a to 857c) to prevent an excessive temperature increase while maintaining the radial support force. Thus, the reliability of the turbo compressor (812) can be improved.

Furthermore, for example, when the rotational speed of the first and second bearingless motors (840, 850) is relatively low and the armature voltage VA is relatively small accordingly, the controller (860) may cause the first power source (861) to perform flux-strengthening control and cause the second power source (862) to decrease the support current IS. This can increase the armature voltage VA while maintaining the radial support force. With an increase in the accuracy of output of the armature voltage VA, the controllability of the first and second bearingless motors (840, 850) can be improved.

Furthermore, when an air gap between the rotors (841, 851) and the stators (844, 854) of the first and second bearingless motors (840, 850) is filled with oil, the controller (860) may cause the first power source (861) to perform flux-strengthening control and cause the second power source (862) to decrease the support current IS. This can increase copper loss and iron loss in the armature windings (846a to 846c, 856a to 856c) to generate heat that warms the oil in the air gap to reduce the viscosity of the oil. This results in a reduction in the rotational loss of the first and second bearingless motors (840, 850).

Furthermore, when the air conditioner (810) performs a heating operation, the controller (860) may cause the first power source (861) to perform flux-strengthening control and cause the second power source (862) to decrease the support current IS. This can increase copper loss and iron loss in the armature windings (846a to 846c, 856a to 856c) to generate heat that heats the refrigerant present in the electric motor chamber (S802). The heating of the refrigerant results in the refrigerant accumulating heat which is discharged into air in the target space by the condenser (813). Thus, the heating performance of the air conditioner (810) can be improved.

Furthermore, when the demagnetization resistance of the permanent magnets (843, 853) of the first and second bearingless motors (840, 850) is small, the controller (860) may cause the first power source (861) to perform flux-strengthening control and cause the second power source (862) to decrease the support current IS. Although the magnetic flux generated with the support current IS may cause demagnetization of the permanent magnets (843, 853), the control described above can make demagnetization less likely to occur. Thus, the permanent magnets (843, 853) having low coercivity can be used, leading to a reduction in cost, and, additionally, the design flexibility of the first and second bearingless motors (840, 850) can be enhanced.

Flux-Weakening Control

The controller (860) performs flux-weakening control of the armature windings (846a to 846c, 856a to 856c) (that is, control to allow a negative d-axis current to flow), for example, in a high-speed operating region. The high-speed operating region is a region in which an operation is performed at a rotational speed higher than a rotational speed at which the armature voltage VA reaches a predetermined second upper limit (that is determined by, for example, the power supply capacity of the first power source (861)) when flux-weakening control is not performed. When flux-weakening control is performed, the armature current IA is larger than that obtained otherwise.

The controller (860) increases the support voltage command value for the second power source (862) to increase the support current IS in the first and second bearingless motors (840, 850), and decreases the armature voltage command value for the first power source (861) to decrease the armature voltage VA across the first and second bearingless motors (840, 850). Further, the controller (860) controls the first and second power sources (861, 862) so that the armature voltage VA across the first and second bearingless motors (840, 850) does not exceed the second upper limit described above. This enables the turbo compressor (812) to operate in the high-speed operating region without increasing the armature voltage VA, and allows the reduction in radial support force caused by flux-weakening control to be compensated for by the increase in the support current IS. Thus, the power supply capacity of the first power source (861) can be set to be relatively low with respect to the size of the high-speed operating region of the turbo compressor (812).

Furthermore, the controller (860) may perform flux-weakening control, for example, when the operation of the turbo compressor (812) is started. When the operation of the turbo compressor (812) is started, the drive shaft (831) is supported by the first and second touch-down bearings (871, 872), and thus a relatively large radial support force is required due to the magnetic force of the permanent magnets (843, 853) of the first and second bearingless motors (840, 850). However, as a result of flux-weakening control, the pseudo-weakening of the magnetic force of the permanent magnets (843, 853) is obtained, and the required radial support force is reduced. Thus, the controllability of the first and second bearingless motors (840, 850) can be improved.

Furthermore, when an air gap between the rotors (841, 851) and the stators (844, 854) of the first and second bearingless motors (840, 850) is filled with oil, the controller (860) may perform flux-weakening control and increase the support current IS. This can increase copper loss in the support windings (847a to 847c, 857a to 857c) to generate heat that warms the oil in the air gap to reduce the viscosity of the oil. This results in a reduction in the rotational loss of the first and second bearingless motors (840, 850).

Furthermore, when the air conditioner (810) performs a heating operation, the controller (860) may perform flux-weakening control and increase the support current IS. This can increase copper loss in the support windings (847a to 847c, 857a to 857c) to generate heat that heats the refrigerant present in the electric motor chamber (S802). The heating of the refrigerant results in the refrigerant accumulating heat which is discharged into air in the target space by the condenser (813). Thus, the heating performance of the air conditioner (810) can be improved.

Regenerative Control

The controller (860) performs regenerative control (that is, control to allow a negative q-axis current to flow), for example, at the end of the operation at which the radial load is increased.

The controller (860) increases the armature voltage command value for the first power source (861) to increase the armature voltage VA across the first and second bearingless motors (840, 850), and decreases the support voltage command value for the second power source (862) to decrease the support current IS in the first and second bearingless motors (840, 850). Further, the controller (860) controls the first and second power sources (861, 862) so that the support current IS in the first and second bearingless motors (840, 850) does not exceed the first upper limit described above. This does not increase the support current IS, but can increase the armature current IA to increase the radial support force. Thus, the power supply capacity of the second power source (862) can be set to be relatively low for the maximum radial support force that can be generated by the first and second bearingless motors (840, 850). In addition, the regeneration of the rotational energy can increase energy saving of the turbo compressor (812) and can reduce the time taken to stop rotation.

Furthermore, in response to a sudden increase in radial load when the controller (860) controls the first and second bearingless motors (840, 850) while the first power source (861) allows a positive q-axis current to flow, the controller (860) may perform regenerative control in which a negative q-axis current flows whose absolute value is larger than the positive q-axis current. This can increase the radial support force without causing the second power source (862) to increase the support current IS. To achieve a similar advantage, the absolute value of the positive q-axis current may be increased without polarity inversion.

Advantages of Eighth Embodiment

The electric motor system (830) according to this embodiment includes the controller (860) that controls the first and second power sources (861, 862) so that one of the armature voltage VA, which is a voltage applied to the armature windings (846a to 846c, 856a to 856c), and the support current IS, which is a current flowing through the support windings (847a to 847c, 857a to 857c), is increased and the other of the armature voltage VA and the support current IS is decreased. Thus, increasing one of the armature voltage VA and the support current IS and decreasing the other of the armature voltage VA and the support current IS can adjust the armature voltage VA and the support current IS within the respective ranges of the power source capacities of the first and second power sources (861, 862) in accordance with the operating status of an application to which the electric motor system (830) is applied. That is, if, due to the limited power supply capacities of the first power source (861) and the second power source (862), the power supply capacity of one of the first and second power sources (861, 862) is insufficient to obtain desired output in the first and second bearingless motors (840, 850), the capacity insufficiency can be compensated for by the other power source (861, 862).

In the electric motor system (830) according to this embodiment, furthermore, the controller (860) controls the first and second power sources (861, 862) so that the armature voltage VA is increased and the support current IS is decreased or so that the support current IS is increased and the armature voltage VA is decreased. This control can expand the operating region of the electric motor system (830).

In the electric motor system (830) according to this embodiment, furthermore, the controller (860) controls the first and second power sources (861, 862) so that the armature voltage VA is increased and the support current IS does not exceed the predetermined first upper limit. Thus, it is possible to increase the radial support force caused by the armature current IA, which is a current flowing through the armature windings (846a to 846c, 856a to 856c), while preventing the support current IS from exceeding the first upper limit. This corresponds to, for example, causing the first power source (861) to perform flux-strengthening control. This is effective particularly when the radial support force is increased with the support current IS reaching the first upper limit or reaching near the first upper limit.

In the electric motor system (830) according to this embodiment, furthermore, the controller (860) controls the first and second power sources (861, 862) so that the support current IS is increased and the armature voltage VA does not exceed a predetermined second upper limit. Accordingly, it is possible to prevent the armature voltage VA from exceeding the second upper limit. However, for example, an increase in the rotational speed of the first and second bearingless motors (840, 850) may reduce the radial support force caused by the armature current IA. This corresponds to, for example, causing the first power source (861) to perform flux-weakening control. To address this, the second power source (862) is caused to increase the support current IS, and a radial support force caused by the increased support current IS can compensate for the reduction in the radial support force.

In the electric motor system (830) according to this embodiment, furthermore, the controller (860) controls the first and second power sources (861, 862) so that the armature voltage VA is decreased and the support current IS is increased or so that the support current IS is decreased and the armature voltage VA is increased. With the control described above, for example, heat generated in the armature windings (846a to 846c, 856a to 856c) or the support windings (847a to 847c, 857a to 857c) can be utilized, as necessary.

In the electric motor system (830) according to this embodiment, furthermore, the controller (860) controls the first and second power sources (861, 862) so that the armature voltage VA is decreased and the support current IS exceeds the predetermined first lower limit. Accordingly, the support current IS can exceed the first lower limit. Thus, for example, heat generated in the support windings (847a to 847c, 857a to 857c) can be utilized, as necessary, or, with an increase in the accuracy of detection of the support current IS, the controllability of the first and second bearingless motors (840, 850) can be improved.

In the electric motor system (830) according to this embodiment, furthermore, the controller (860) controls the first and second power sources (861, 862) so that the support current IS is decreased and the armature voltage VA exceeds the predetermined second lower limit. Accordingly, the armature voltage VA can exceed the second lower limit. Thus, for example, heat generated in the armature windings (846a to 846c, 856a to 856c) can be utilized, as necessary, or, with an increase in the accuracy of output of the armature voltage VA, the controllability of the first and second bearingless motors (840, 850) can be improved.

The turbo compressor (812) according to this embodiment includes the electric motor system (830) according to this embodiment, and the impeller (821) serving as the load (821) coupled to the drive shaft (831) of the electric motor system (830). In the turbo compressor (812), accordingly, the impeller (821) is rotationally driven by the first and second bearingless motors (840, 850).

Further, the turbo compressor (812) according to this embodiment is disposed in the refrigerant circuit (811), which performs a refrigeration cycle, and is configured to compress refrigerant by using the impeller (821). When the turbo compressor (812) operates in the rotating-stall generation region (C) or the surging region (D), the controller (860) controls the first and second power sources (861, 862) so that the armature voltage VA is increased and the support current IS does not exceed the predetermined first upper limit. Accordingly, when the load torque of the first and second bearingless motors (840, 850) is small whereas the required radial support force is large, the radial support force caused by the armature current IA can be increased. Thus, even if the support current IS is kept less than or equal to the first upper limit, the increase in the armature current IA can increase the radial support force of the first and second bearingless motors (840, 850).

Ninth Embodiment of Invention

Figure 46:
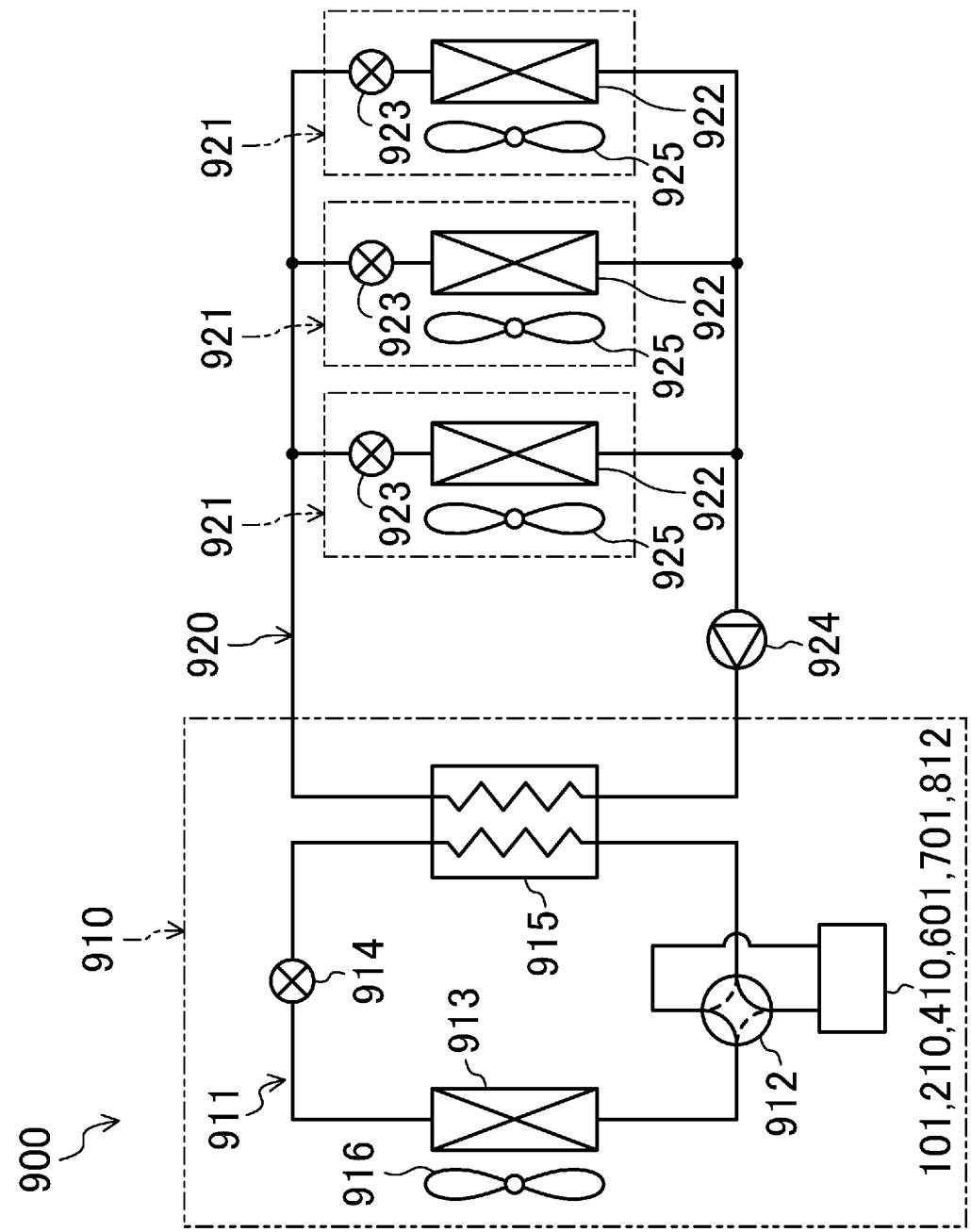
FIG. 46 is a schematic diagram exemplarily illustrating the configuration of a refrigeration apparatus according to a ninth embodiment of the present invention.

A ninth embodiment of the present invention will be described. As illustrated in FIG. 46, a refrigeration apparatus (900) according to this embodiment includes a refrigerant circuit (911) and a water circuit (920) that are connected to each other, and constitutes a device for air-conditioning equipment. The refrigerant circuit (911) is filled with refrigerant, and the water circuit (920) is filled with water (or antifreeze). The refrigeration apparatus (900) is capable of both cooling and heating an air-conditioning-target space by switching the state of a four-way switching valve (912) described below. The refrigeration apparatus (900) may be a cooling-only or heating-only apparatus that does not include the four-way switching valve (912).

Examples of the air-conditioning-target space include a plurality of partitioned rooms in a specific structure (for example, a building or a ship), and a portion of a relatively large space in a specific large facility (for example, a dome or a stadium). Each of the plurality of partitioned rooms may be provided with a single utilization unit (921) or two or more utilization units (921) described below. The number of utilization units (921) provided for the relatively large space can also be selected as desired. The refrigeration apparatus (900) is preferably configured to be capable of individually adjusting the temperature for each of the air-conditioning-target spaces corresponding to the respective utilization units (921).

The refrigerant circuit (911) is accommodated in a heat source unit (910). The refrigerant circuit (911) has the turbo compressor (101, 210, 410, 601, 701, 812) according to any of the first to eighth embodiments described above, the four-way switching valve (912), a heat-source-side heat exchanger (913), an expansion valve (914), and a water/refrigerant heat exchanger (915). A heat-source-side fan (916) is disposed near the heat-source-side heat exchanger (913) to deliver air to the heat-source-side heat exchanger (913). The refrigerant circuit (911) is configured such that the turbo compressor (101, 210, 410, 601, 701, 812), the four-way switching valve (912), the heat-source-side heat exchanger (913), the expansion valve (914), and the water/refrigerant heat exchanger (915) are connected to one another by a refrigerant pipe and the turbo compressor (101, 210, 410, 601, 701, 812) and the heat-source-side fan (916) are operated to perform a refrigeration cycle.

The water circuit (920) has a plurality of (in the illustrated example, three) utilization-side heat exchangers (922) that are connected in parallel with each other, flow rate adjustment valves (923), each of which is provided for one of the utilization-side heat exchangers (922) to adjust the flow rate of water to the utilization-side heat exchanger (922), and a pump (924) for circulating water through the water circuit (920). A utilization-side fan (925) is disposed near each of the utilization-side heat exchangers (922) to deliver air to the utilization-side heat exchanger (922). The utilization-side heat exchangers (922), the flow rate adjustment valves (923), and the utilization-side fans (925) are accommodated in respective utilization units (921) (for example, fan coil units). Each of the utilization units (921) is placed in an air-conditioning-target space. The water circuit (920) is configured such that the plurality of utilization-side heat exchangers (922), the pump (924), and the water/refrigerant heat exchanger (915) are connected to one another by a water pipe and the pump (924) and the utilization-side fans (925) are operated to perform air-conditioning of the respective air-conditioning-target spaces.

Operation of Refrigeration Apparatus

The refrigeration apparatus (900) is capable of performing both a heating operation and a cooling operation by switching the state of the four-way switching valve (912). The state of the four-way switching valve (912) to perform a heating operation is represented as a first state (a state indicated by a broken line in FIG. 46), and the state of the four-way switching valve (912) to perform a cooling operation is represented as a second state (a state indicated by a solid line in FIG. 46).

The refrigeration apparatus (900) performs a heating operation of the air-conditioning-target spaces by switching the four-way switching valve (912) to the first state and operating the turbo compressor (101, 210, 410, 601, 701, 812), the heat-source-side fan (916), the pump (924), and the utilization-side fans (925). At this time, in the water/refrigerant heat exchanger (915), heat is transferred to water from high-pressure gas refrigerant discharged from the turbo compressor (101, 210, 410, 601, 701, 812), and, in each of the utilization-side heat exchangers (922), water to which the heat is transferred heats the air in the air-conditioning-target space, which is delivered by the utilization-side fan (925). Accordingly, the air-conditioning-target spaces are heated. In the heat-source-side heat exchanger (913), heat is transferred to low-pressure liquid refrigerant from the air (for example, outdoor air) delivered by the heat-source-side fan (916).

The refrigeration apparatus (900) performs a cooling operation of the air-conditioning-target spaces by switching the four-way switching valve (912) to the second state and operating the turbo compressor (101, 210, 410, 601, 701, 812), the heat-source-side fan (916), the pump (924), and the utilization-side fans (925). At this time, in the water/refrigerant heat exchanger (915), low-pressure liquid refrigerant reduced in pressure by the expansion valve (914) removes heat from water, and, in each of the utilization-side heat exchangers (922), water from which heat is removed cools the air in the air-conditioning-target space, which is delivered by the utilization-side fan (925). Accordingly, the air-conditioning-target spaces are cooled. In the heat-source-side heat exchanger (913), heat is transferred to the air delivered by the heat-source-side fans (916) (for example, outdoor air) from high-pressure gas refrigerant.

In the refrigeration apparatus (900) according to this embodiment, for example, in some cases, the turbo compressor (101, 210, 410, 601, 701, 812) is operated with reduced refrigeration load when the condensation temperature (that is, outside air temperature) is relatively high. In some cases, the turbo compressor (101, 210, 410, 601, 701, 812) operates in the turbulence region (the area indicated by symbol C in FIG. 7). This operation is typically performed when only some rooms in a construction with multiple rooms, such as a building, are requested to be air-conditioned (that is, only some of the utilization units (921) are requested to adjust temperatures). In this embodiment, as in the first embodiment, the turbo compressor (101, 210, 410, 601, 701, 812) can be operated without failure even in the turbulence region (C). Accordingly, it is possible to reduce the entire size of the heat source unit (910) including the turbo compressor (101, 210, 410, 601, 701, 812) and to reduce the cost of the refrigeration apparatus (900). In addition, in the refrigeration apparatus (900) including a plurality of utilization units (921) and configured to perform air-conditioning of a plurality of air-conditioning-target spaces, only some of the utilization units (921) is operated, even when the turbo compressor (101, 210, 410, 601, 701, 812) can be operated without failure.

The refrigeration apparatus (900) is not limited to a device for air-conditioning equipment and may be a home air conditioner or a professional air conditioner, for example. Examples of applications of the refrigeration apparatus (900) include various structures such as residential homes, stores, commercial facilities, and ships.

Other Embodiments

In the embodiments described above, the turbo compressor (101, 210, 410, 601, 701, 812) includes one or two bearingless motors (160, 170, 250, 450, 640, 760, 770, 840, 850). Alternatively, three or more bearingless motors may be included.

In the embodiments described above, furthermore, each bearingless motor (160, 170, 250, 450, 640, 760, 770, 840, 850) is a consequent-pole bearingless motor or an IPM bearingless motor. However, each bearingless motor (160, 170, 250, 450, 640, 760, 770, 840, 850) is not limited to these types. For example, each bearingless motor (160, 170, 250, 450, 640, 760, 770, 840, 850) may be a bearingless motor such as an SPM bearingless motor having permanent magnets on a surface of a rotor, or an inset bearingless motor.

In the embodiments described above, furthermore, each bearingless motor (160, 170, 250, 450, 640, 760, 770, 840, 850) includes drive coils (166a to 166c, 176a to 176c, 256a to 256c, 456a to 456c, 646a to 646c) and support coils (167a to 167c, 177a to 177c, 257a to 257c, 457a to 457c, 647a to 647c). Alternatively, each bearingless motor (160, 170, 250, 450, 640, 760, 770, 840, 850) may include common coils having both the functions of the respective coils (166a to 166c, 176a to 176c, 256a to 256c, 456a to 456c, 646a to 646c, 167a to 167c, 177a to 177c, 257a to 257c, 457a to 457c, 647a to 647c).

In the embodiments described above, furthermore, the rotor (161, 171, 251, 451, 641, 761, 771, 841, 851) and the stator (164, 174, 254, 454, 644, 762, 772, 844, 854) are each formed of layered steel plates. Alternatively, the rotor (161, 171, 251, 451, 641, 761, 771, 841, 851) and the stator (164, 174, 254, 454, 644, 762, 772, 844, 854) may be each formed of a material other than layered steel plates.

In the embodiments described above, furthermore, the turbo compressor (101, 210, 410, 601, 701, 812) includes a single impeller (120, 221, 421, 603a, 720, 821). Alternatively, the turbo compressor (101, 210, 410, 601, 701, 812) may include two or more impellers (120, 221, 421, 603a, 720, 821). For example, one impeller (120, 221, 421, 603a, 720, 821) may be attached to either end of the drive shaft (130, 240, 440, 605, 730, 831).

The foregoing description has been made, taking an example in which the plurality of permanent magnets (163, 173, 253, 453, 643, 843, 853) on the rotor (161, 171, 251, 451, 641, 761, 771, 841, 851) of the bearingless motor (160, 170, 250, 450, 640, 760, 770, 840, 850) have the same shape.

Alternatively, the plurality of permanent magnets (163, 173, 253, 453, 643, 843, 853) may have different shapes.

As described above, the present invention is useful as a turbo compressor.

What is claimed is:

1. A turbo compressor for compressing refrigerant, the turbo compressor being disposed in a refrigerant circuit that performs a refrigeration cycle, comprising:
    an impeller;
    a drive shaft;
    a drive support unit through which currents in a predetermined current range flow to generate electromagnetic forces, the drive support unit being configured to rotationally drive the drive shaft by using one of the electromagnetic forces and to support a radial load of the drive shaft in a contactless manner by using another one of the electromagnetic forces,
    the drive support unit including one bearingless motor and one radial magnetic bearing;
    a power source that allows the currents to flow through the drive support unit; and
    a controller that controls the power source,
    wherein the bearingless motor includes a rotor-stator pair constituted by a rotor and a stator, and is configured to rotationally drive the drive shaft and to support the radial load of the drive shaft in the contactless manner,
    wherein the bearingless motor, the radial magnetic bearing, and a pair of touch-down bearings are housed within a compartment formed within a casing, with the bearingless motor being arranged side-by-side with the radial magnetic bearing in the casing,
    wherein the bearingless motor and the radial magnetic bearing are arranged in the compartment between the pair of touch-down bearings,
    wherein the radial magnetic bearing includes a plurality of electromagnets and is configured to support the radial load of the drive shaft in the contactless manner, and
    wherein the one radial magnetic bearing is the only radial magnetic bearing in the turbo compressor, and is arranged on only one side of the drive shaft in its axial direction as viewed from the bearingless motor,
    wherein a magnetic flux generated in the drive support unit to rotationally drive the impeller and the drive shaft is represented by a driving magnetic flux BM,
    wherein a magnetic flux generated in the drive support unit to support the radial load of the drive shaft is represented by a supporting magnetic flux BS,
    wherein respective sizes of the rotor and the stator of the bearingless motor impose an upper limit of Bmax on a magnetic flux generated in the drive support unit by a total current flowing through the drive support unit,
    wherein the controller issues motor power commands to the power source that limit a maximum value of a sum of the driving magnetic flux BM and the supporting magnetic flux BS in a predetermined operating region of the turbo compressor to (BM+BS)max,
    wherein the controller issues, as one of the motor power commands, a command causing a magnetic flux represented by BMmax to be generated in the drive support unit to generate a driving torque corresponding to a maximum torque load in the predetermined operating region,
    wherein the controller issues, as another one of the motor power commands, a command causing a magnetic flux represented by BSmax to be generated in the drive support unit to support a maximum radial load of the drive shaft in the predetermined operating region, and
    wherein the controller issues the respective motor power commands to control the power source such that a relationship given by (BM+BS)max≤Bmax<BMmax+BSmax is satisfied in the predetermined operating region of the turbo compressor.

2. The turbo compressor according to claim 1,
    wherein the controller controls the power source by issuing a motor power command, in response to the turbo compressor operating in a rotating-stall generation region and a surging region, that causes a ratio of current IS for generating the supporting magnetic flux BS to current IM for generating the driving magnetic flux BM to be increased, compared to during normal operation at a same rotational speed.

3. The turbo compressor according to claim 1,
    wherein the controller controls the power source by issuing a motor power command, in response to the turbo compressor operating in a rotating-stall generation region and a surging region, that causes a ratio of current IS for generating the supporting magnetic flux BS to current IM for generating the driving magnetic flux BM to be increased as a refrigerant volumetric flow rate decreases, when compared at a same rotational speed during normal operation.

4. The turbo compressor according to claim 1,
    wherein the drive support unit includes first and second coils through which respective first and second coil currents in the predetermined current range flow, and
    wherein
        the driving magnetic flux BM is generated in the drive support unit as a result of the flow of the first coil current through the first coil, the supporting magnetic flux BS is generated in the drive support unit as a result of the flow of the second coil current through the second coil,
        a value of the first coil current flowing through the first coil when the driving torque corresponding to the maximum torque load is generated is represented by a maximum torque current IBMmax,
        a value of the second coil current flowing through the second coil when the maximum radial load of the drive shaft is supported is represented by a maximum support force current IBSmax, and
        a combined magnetic flux generated in the drive support unit by causing a current obtained by adding together the maximum torque current IBMmax and the maximum support force current IBSmax to flow through the first and second coils, respectively, is represented by BMSmax,
    the drive support unit is configured such that a relationship given by BMSmax<BMmax+BSmax is satisfied.

5. The turbo compressor according to claim 1,
    wherein the controller controls the power source by issuing a motor power command, in response to the turbo compressor operating in a surging region or the rotation of the drive shaft being stopped under normal operation, that causes only a current for supporting the radial load of the drive shaft in the contactless manner flows through the drive support unit by stopping a current that contributes to a driving torque from flowing through the drive support unit.

6. The turbo compressor according to claim 1,
wherein the radial magnetic bearing is arranged at a position on the drive shaft at which a larger radial load than the radial load supported by the bearingless motor is exerted.

7. The turbo compressor according to claim 6,
wherein the impeller is connected to one end of the drive shaft, and
wherein the radial magnetic bearing is arranged at a position on the drive shaft that is closer to the impeller than the bearingless motor in the axial direction of the drive shaft.

8. The turbo compressor according to claim 6,
wherein the bearingless motor is configured as a surface permanent magnet bearingless motor.

9. The turbo compressor according to claim 1,
wherein the bearingless motor is arranged at a position on the drive shaft at which a larger radial load than the radial load supported by the radial magnetic bearing is exerted.

10. The turbo compressor according to claim 9,
wherein the impeller is connected to one end of the drive shaft, and
wherein the bearingless motor is arranged at a position on the drive shaft that is closer to the impeller than the radial magnetic bearing in the axial direction of the drive shaft.

11. The turbo compressor according to claim 9,
wherein the bearingless motor is configured as a consequent-pole bearingless motor or an interior permanent magnet bearingless motor.

12. A refrigeration apparatus comprising:
a heat source unit including the turbo compressor according to claim 1; and
at least one utilization unit.

13. The refrigeration apparatus according to claim 12,
wherein the at least one utilization unit comprises a plurality of utilization units, and
wherein the plurality of utilization units perform air-conditioning of a plurality of air-conditioning-target spaces.

14. The turbo compressor according to claim 1,
wherein the controller issues, as respective ones of the motor power commands,
a command controlling the power source to generate a voltage that increases the driving magnetic flux BM in the drive support unit to the magnetic flux represented by BMmax to generate the driving torque corresponding to the maximum torque load in the predetermined operating region and simultaneously decreasing the supporting magnetic flux BS in the drive support unit, and
a command issued in response to the turbo compressor operating in a surging region of the predetermined operating region that controls the power source to generate a voltage that increases the supporting magnetic flux BS in the drive support unit to the magnetic flux represented by BSmax to support the maximum radial load of the drive shaft in the predetermined operating region.

* * * * *